US012775363B2

(12) United States Patent
Kim et al.

(10) Patent No.: US 12,775,363 B2
(45) Date of Patent: Oct. 27, 2026

(54) ELECTRONIC DEVICE WITH A SENSOR LAYER COMPRISING THIRD ELECTRODES AND AN AUXILIARY LAYER COMPRISING CHARGING ELECTRODES

(71) Applicant: Samsung Display Co., Ltd., Yongin-si (KR)

(72) Inventors: Hyungbae Kim, Yongin-si (KR); Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/040,611

(22) Filed: Jan. 29, 2025

(65) Prior Publication Data

US 2025/0370576 A1 Dec. 4, 2025

(30) Foreign Application Priority Data

Jun. 4, 2024 (KR) ........................ 10-2024-0072788

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01)

(58) Field of Classification Search
CPC .... G06F 3/0412; G06F 3/0416; G06F 3/0445; G06F 3/0446
See application file for complete search history.

(56) References Cited

U.S. PATENT DOCUMENTS

| | | | |
|---|---|---|---|
| 8,674,967 B2 | 3/2014 | Fukushima et al. | |
| 10,379,694 B2 | 8/2019 | Park et al. | |
| 11,315,987 B2 | 4/2022 | Nakamura et al. | |
| 2023/0067179 A1* | 3/2023 | Kim | G06F 3/04164 |
| 2025/0355527 A1* | 11/2025 | Mizuhashi | G06F 3/0442 |

FOREIGN PATENT DOCUMENTS

| | | |
|---|---|---|
| KR | 10-2330968 B1 | 12/2021 |
| KR | 10-2022-0113198 | 8/2022 |
| KR | 10-2428274 B1 | 8/2022 |

* cited by examiner

*Primary Examiner* — Liliana Cerullo

(74) *Attorney, Agent, or Firm* — Womble Bond Dickinson (US) LLP

(57) ABSTRACT

An electronic device includes: a light emitting element layer including a light emitting element; a sensor layer on the light emitting element layer; a sensor driver to drive the sensor layer; and an auxiliary layer in a layer different from that of the sensor layer, the auxiliary layer including a plurality of first charging electrodes. The sensor layer includes: a plurality of first electrodes along a first direction; a plurality of second electrodes along a second direction crossing the first direction, and crossing the first electrodes; and a plurality of third electrodes along the first direction, and adjacent to the first electrodes. The sensor driver is to output a first signal having a first phase to the third electrodes, and output a second signal to the first charging electrodes, the second signal having a second phase having a phase difference from that of the first phase.

29 Claims, 43 Drawing Sheets

ELECTRONIC DEVICE WITH A SENSOR LAYER COMPRISING THIRD ELECTRODES AND AN AUXILIARY LAYER COMPRISING CHARGING ELECTRODES

CROSS-REFERENCE TO RELATED APPLICATION

The present application claims priority to and the benefit of Korean Patent Application No. 10-2024-0072788, filed on Jun. 4, 2024, in the Korean Intellectual Property Office, the entire disclosure of which is incorporated by reference herein.

BACKGROUND

Aspects of embodiments of the present disclosure relate to an electronic device for sensing an input by a pen.

Multimedia electronic devices, such as a television, a mobile phone, a tablet computer, a notebook computer, a car navigation unit, a game machine, and the like, include a display device for displaying an image. The electronic devices may include a sensor layer (e.g., an input sensor) capable of providing a touch-based input method that enables a user to intuitively and conveniently input information and/or instructions in an easy and simple manner, in addition to other input methods, such as a button, a keyboard, a mouse, or the like. The sensor layer may sense the user's touch or pressure. In addition, pens for users who may be accustomed to inputting information using writing instruments or pens for more accurate touch inputs in specific application programs (e.g., application programs for sketching or drawing) have been increasingly demanded.

The above information disclosed in this Background section is for enhancement of understanding of the background of the present disclosure, and therefore, it may contain information that does not constitute prior art.

SUMMARY

One or more embodiments of the present disclosure may be directed to an electronic device for sensing an input by a pen.

According to one or more embodiments of the present disclosure, an electronic device includes: a light emitting element layer including a light emitting element; a sensor layer on the light emitting element layer; a sensor driver configured to drive the sensor layer; and an auxiliary layer in a layer different from that of the sensor layer, the auxiliary layer including a plurality of first charging electrodes. The sensor layer includes: a plurality of first electrodes along a first direction; a plurality of second electrodes along a second direction crossing the first direction, and crossing the plurality of first electrodes; and a plurality of third electrodes along the first direction, and adjacent to the plurality of first electrodes. The sensor driver is configured to output a first signal having a first phase to the plurality of third electrodes, and output a second signal to the plurality of first charging electrodes, the second signal having a second phase having a phase difference from that of the first phase.

In an embodiment, in a plan view, the plurality of first charging electrodes may overlap with the plurality of third electrodes, respectively.

In an embodiment, a number of the plurality of first charging electrodes may be equal to a number of the plurality of third electrodes.

In an embodiment, a number of the plurality of first charging electrodes may be less than a number of the plurality of third electrodes.

In an embodiment, in a side view, each of the plurality of first charging electrodes may have a width smaller than a gap between central axes of two adjacent third electrodes from among the plurality of third electrodes.

In an embodiment, a width of each of the plurality of first charging electrodes may be equal to a width of each of the plurality of third electrodes.

In an embodiment, in a side view, central axes of the plurality of first charging electrodes may be aligned with central axes of the plurality of third electrodes, respectively.

In an embodiment, the first signal at the plurality of third electrodes and the second signal at the plurality of first charging electrodes may have the same phase as each other.

In an embodiment, the first signal may include a first-first sub-signal, and a first-second sub-signal having an inverse phase relationship with the first-first sub-signal. The sensor driver may be configured to transmit the first-first sub-signal to one of the plurality of third electrodes, and transmit the first-second sub-signal to another one of the plurality of third electrodes.

In an embodiment, the second signal may include a second-first sub-signal, and a second-second sub-signal having an inverse phase relationship with the second-first sub-signal. The sensor driver may be configured to transmit the second-first sub-signal to one of the plurality of first charging electrodes overlapping with the one of the plurality of third electrodes, and transmit the second-second sub-signal to another one of the plurality of first charging electrodes overlapping with the other one of the plurality of third electrodes.

In an embodiment, the first signal at the plurality of third electrodes and the second signal at the plurality of first charging electrodes may have a phase difference of 0 degrees to 90 degrees.

In an embodiment, the auxiliary layer may be located under the light emitting element layer.

In an embodiment, the auxiliary layer may further include an insulating layer.

In an embodiment, the auxiliary layer may further include a transistor configured to drive the light emitting element layer.

In an embodiment, the auxiliary layer may be located on the sensor layer.

In an embodiment, the plurality of first charging electrodes may include a transparent material.

In an embodiment, the plurality of third electrodes may be electrically connected with one another.

In an embodiment, the plurality of first charging electrodes may be electrically connected with one another.

In an embodiment, the auxiliary layer may further include a plurality of second charging electrodes electrically insulated from the plurality of first charging electrodes. In a plan view, the plurality of first charging electrodes may overlap with some of the plurality of third electrodes, respectively. The plurality of second charging electrodes may overlap with others of the plurality of third electrodes, respectively.

In an embodiment, a direction of a first current flowing through one of the plurality of third electrodes based on the first signal may be the same as a direction of a second current flowing through one of the plurality of first charging electrodes overlapping with the one of the plurality of third electrodes based on the second signal.

In an embodiment, a current of the second signal may be higher than a current of the first signal.

According to one or more embodiments of the present disclosure, an electronic device includes: a light emitting element layer including a light emitting element; a sensor layer on the light emitting element layer; a sensor driver configured to drive the sensor layer; and an auxiliary layer in a layer different from that of the sensor layer, the auxiliary layer including a plurality of charging electrodes. The sensor layer includes: a plurality of first electrodes along a first direction; a plurality of second electrodes along a second direction crossing the first direction, and crossing the plurality of first electrodes; and a plurality of third electrodes along the first direction, and adjacent to the plurality of first electrodes. In a side view, central axes of the plurality of charging electrodes are aligned with central axes of the plurality of third electrodes, respectively.

In an embodiment, in a plan view, the plurality of charging electrodes may overlap with the plurality of third electrodes, respectively.

In an embodiment, the sensor driver may be configured to transmit a first signal having a first phase to the plurality of third electrodes, and output a second signal to the plurality of charging electrodes, the second signal having a second phase having a phase difference from the first phase.

In an embodiment, the first signal at the plurality of third electrodes and the second signal at the plurality of charging electrodes may have the same phase as each other.

In an embodiment, the auxiliary layer may be located under the light emitting element layer, and may further include a plurality of insulating layers. The plurality of charging electrodes may be located between the plurality of insulating layers.

In an embodiment, the auxiliary layer may be located under the light emitting element layer, and may further include a transistor configured to drive the light emitting element layer.

In an embodiment, the auxiliary layer may be located on the sensor layer.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1A:
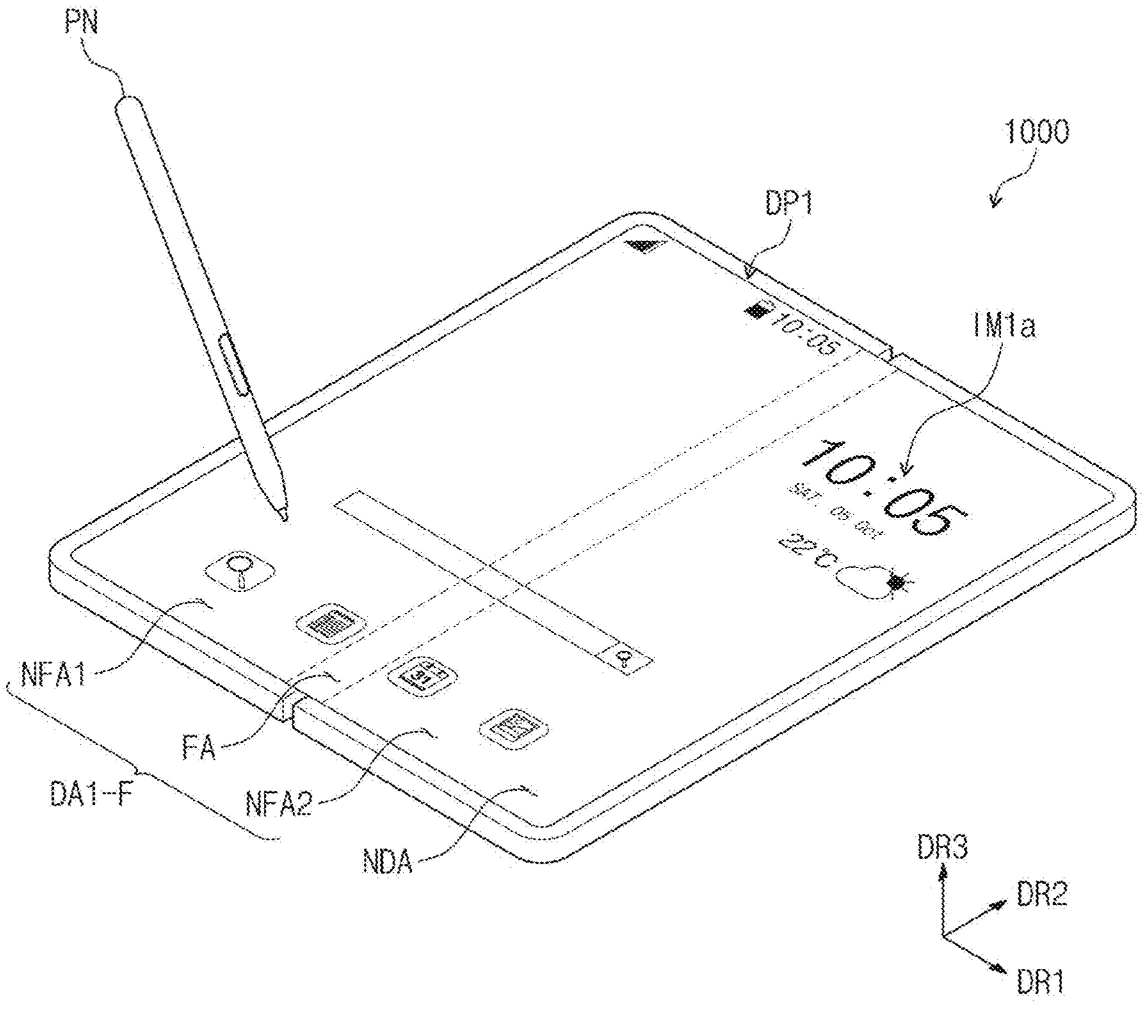
FIG. 1A is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being “between” two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms “a” and “an” are intended to include the plural forms as well, unless the context clearly indicates otherwise. It will be further understood that the terms “comprises,” “comprising,” “includes,” “including,” “has,” “have,” and “having,” when used in this specification, specify the presence of the stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. For example, the expression “A and/or B” denotes A, B, or A and B. Expressions such as “at least one of,” when preceding a list of elements, modify the entire list of elements and do not modify the individual elements of the list. For example, the expression “at least one of a, b, or c,” “at least one of a, b, and c,” and “at least one selected from the group consisting of a, b, and c” indicates only a, only b, only c, both a and b, both a and c, both b and c, all of a, b, and c, or variations thereof.

As used herein, the term “substantially,” “about,” and similar terms are used as terms of approximation and not as terms of degree, and are intended to account for the inherent variations in measured or calculated values that would be recognized by those of ordinary skill in the art. Further, the use of “may” when describing embodiments of the present disclosure refers to “one or more embodiments of the present disclosure.” As used herein, the terms “use,” “using,” and “used” may be considered synonymous with the terms “utilize,” “utilizing,” and “utilized,” respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
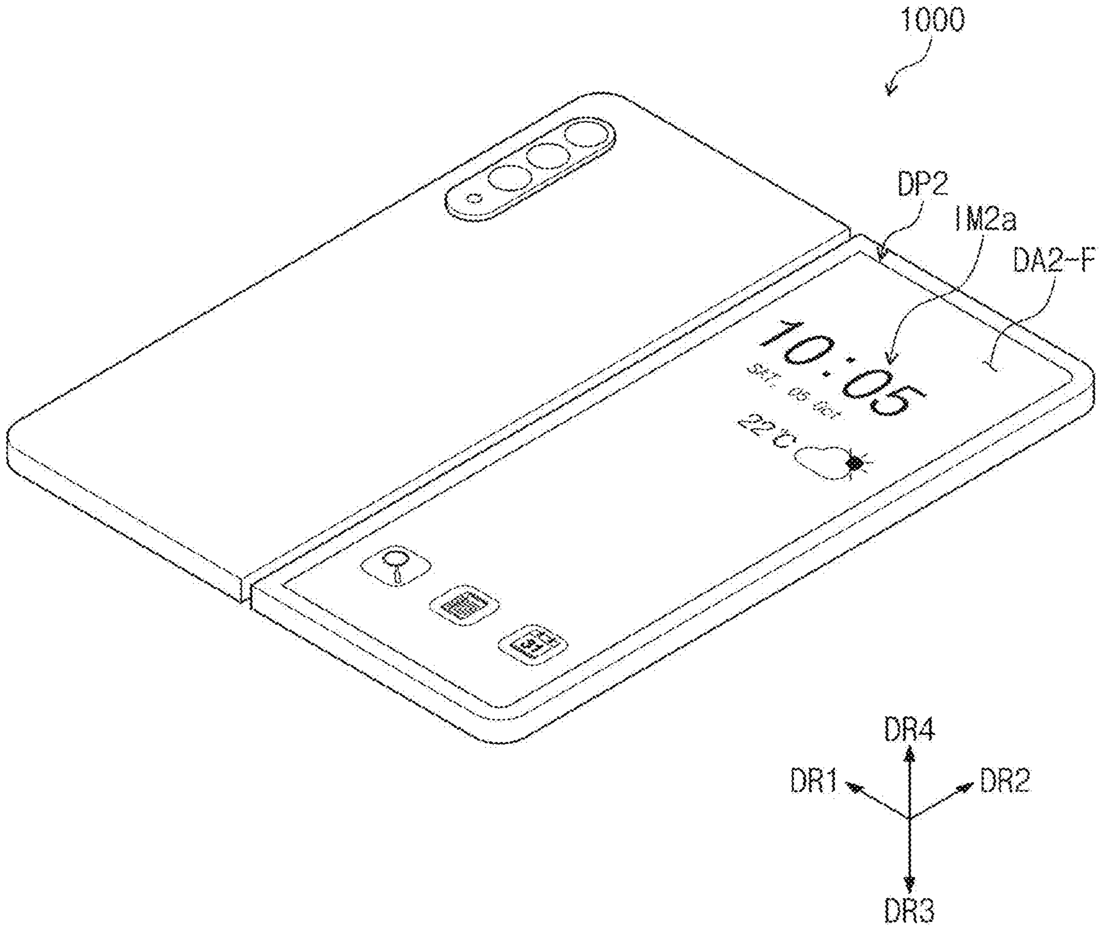
FIG. 1B is a rear perspective view of the electronic device according to an embodiment of the present disclosure.

FIG. 1A is a perspective view of an electronic device according to an embodiment of the present disclosure. FIG. 1B is a rear perspective view of the electronic device according to an embodiment of the present disclosure.

Referring to FIGS. 1A and 1B, the electronic device 1000 may be a device that is activated depending on an electrical signal. For example, the electronic device 1000 may display an image, and may sense an input (e.g., an external input) applied from the outside. The external input may be a user input. The user input may include various suitable kinds of external inputs, such as a part of a user's body, a pen PN, light, heat, or pressure.

The electronic device 1000 may include a first display panel DP1 and a second display panel DP2. The first display panel DP1 and the second display panel DP2 may be separate panels that are spaced apart (e.g., that are separated) from each other. The first display panel DP1 may be referred to as a main display panel, and the second display panel DP2 may be referred to as an auxiliary display panel or an external display panel.

The first display panel DP1 may include a first display part DA1-F, and the second display panel DP2 may include a second display part DA2-F. The second display panel DP2 may have a smaller area than that of the first display panel DP1. In correspondence to the sizes of the first display panel DP1 and the second display panel DP2, the area of the first display part DA1-F may be greater than the area of the second display part DA2-F.

In an unfolded state of the electronic device 1000, the first display part DA1-F may have a plane that is parallel to or substantially parallel to a first direction DR1 and a second direction DR2. The thickness direction of the electronic device 1000 may be parallel to or substantially parallel to a third direction DR3 that crosses the first direction DR1 and the second direction DR2. Accordingly, front surfaces (e.g., upper surfaces) and rear surfaces (e.g., lower surfaces) of the members constituting the electronic device 1000 may be defined based on the third direction DR3.

The first display panel DP1 or the first display part DA1-F may include a folding area FA that may be folded and unfolded, and a plurality of non-folding areas NFA1 and NFA2 that are spaced apart from each other with the folding area FA therebetween. The second display panel DP2 may overlap with one of the plurality of non-folding areas NFA1 and NFA2. For example, the second display panel DP2 may overlap with the first non-folding area NFA1 as shown in FIG. 1B.

The display direction of a first image IM1*a* displayed on a portion of the first display panel DP1, for example, such as on the first non-folding area NFA1, may be opposite to the display direction of a second image IM2*a* displayed on the second display panel DP2. For example, the first image IM1*a* may be displayed in the third direction DR3, and the second image IM2*a* may be displayed in a fourth direction DR4 opposite to the third direction DR3.

In an embodiment of the present disclosure, the folding area FA may be bent about a folding axis extending in a direction parallel to or substantially parallel to the long sides of the electronic device 1000, for example, such as in a direction parallel to or substantially parallel to the second direction DR2. The folding area FA has a suitable curvature (e.g., a certain or predetermined curvature) and a suitable radius of curvature (e.g., a certain or predetermined radius of curvature) in a folded state of the electronic device 1000. The electronic device 1000 may be folded in an in-folding manner, such that the first non-folding area NFA1 and the second non-folding area NFA 2 face each other and the first display part DA1-F is not exposed to the outside.

In an embodiment of the present disclosure, the electronic device 1000 may be folded in an out-folding manner, such that the first display part DA1-F is exposed to the outside. In an embodiment of the present disclosure, the electronic device 1000 may be folded in an in-folding manner and/or an out-folding manner from the unfolded state. However, the present disclosure is not limited thereto.

Although FIG. 1A illustrates an example in which one folding area FA is defined in the electronic device 1000, the present disclosure is not limited thereto. For example, a plurality of folding axes and a plurality of folding areas corresponding to the folding axes may be defined in the electronic device 1000, and the electronic device 1000 may be folded about the plurality of folding axes in an in-folding manner and/or an out-folding manner from an unfolded state.

According to an embodiment of the present disclosure, at least one of the first display panel DP1 or the second display panel DP2 may sense an input by the pen PN without including or using a digitizer. Because the digitizer for sensing the pen PN may be omitted, an increase in the thickness and the weight of the electronic device 1000 and a decrease in the flexibility of the electronic device 1000 depending on the addition of the digitizer may not occur. Accordingly, not only the first display panel DP1, but also the second display panel DP2 may be designed (e.g., may be configured) to sense the pen PN.

Figure 2:
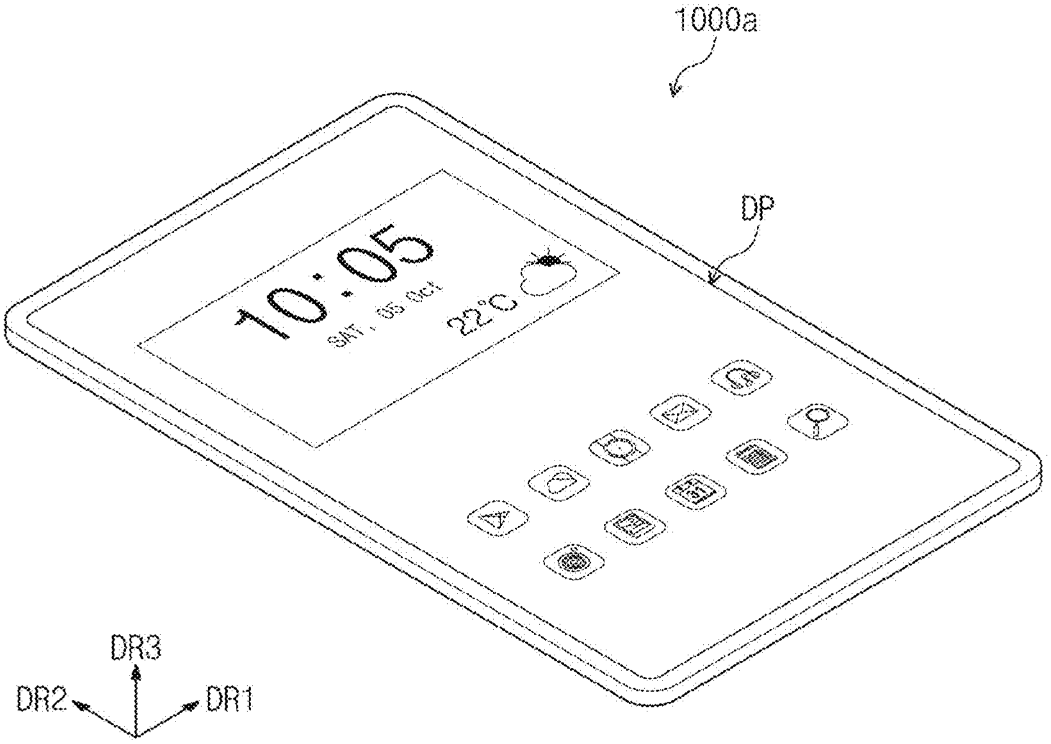
FIG. 2 is a perspective view of an electronic device according to an embodiment of the present disclosure.
Figure 3:
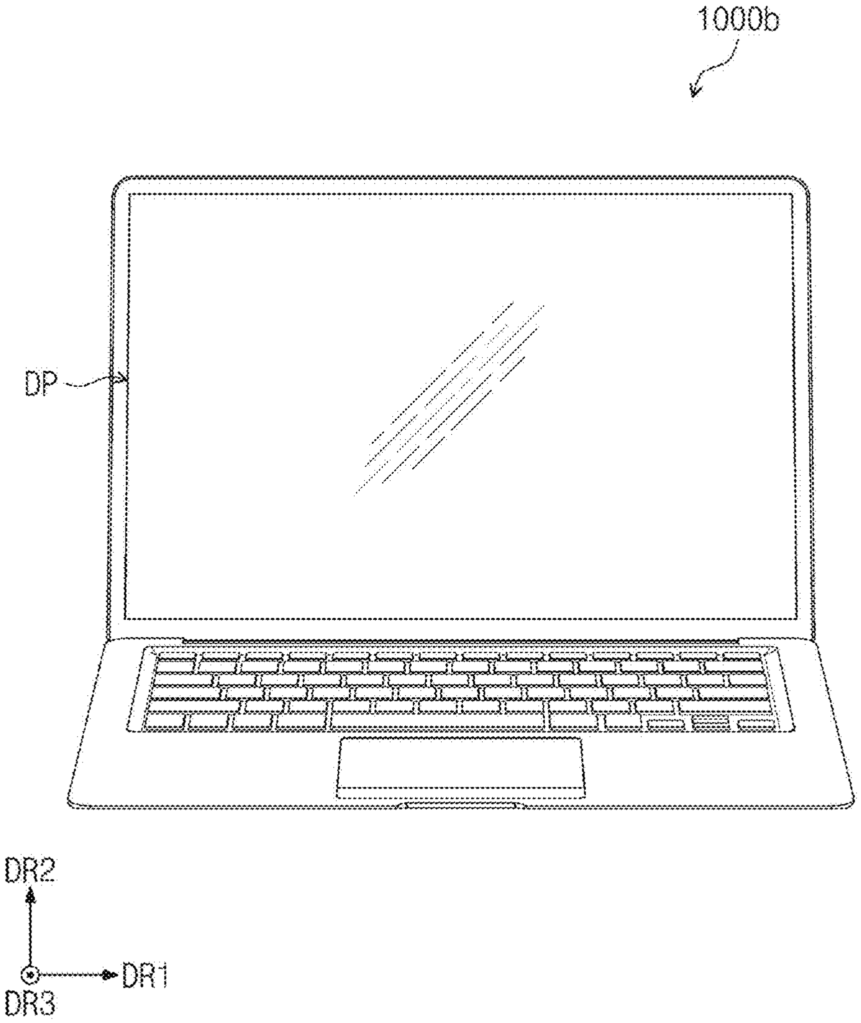
FIG. 3 is a perspective view of an electronic device according to an embodiment of the present disclosure.

FIG. 2 is a perspective view of an electronic device according to an embodiment of the present disclosure. FIG. 3 is a perspective view of an electronic device according to an embodiment of the present disclosure.

FIG. 2 illustrates an example in which the electronic device 1000*a* is a mobile phone, and the electronic device 1000*a* may include a display panel DP. FIG. 3 illustrates an example in which the electronic device 1000*b* is a notebook computer, and the electronic device 1000*b* may include the display panel DP.

In an embodiment of the present disclosure, the display panel DP may sense an input (e.g., an external input) applied from the outside. The external input may be a user input. The user input may include various suitable kinds of external inputs, such as a part of a user's body, the pen PN (e.g., refer to FIG. 1A), light, heat, or pressure.

According to an embodiment of the present disclosure, the display panel DP may sense an input by the pen PN (e.g., refer to FIG. 1A) without using or including a digitizer. Because the digitizer for sensing the pen PN may be omitted, an increase in the thickness and the weight of the electronic device 1000*a* or 1000*b* depending on the addition of a digitizer may not occur.

Although the foldable electronic device 1000 is illustrated in FIG. 1A and a bar-kind of electronic device 1000*a* is illustrated in FIG. 2, the present disclosure is not limited thereto. For example, the following description may be applied to various suitable kinds of electronic devices, such as a rollable electronic device, a slidable electronic device, and a stretchable electronic device.

Figure 4:
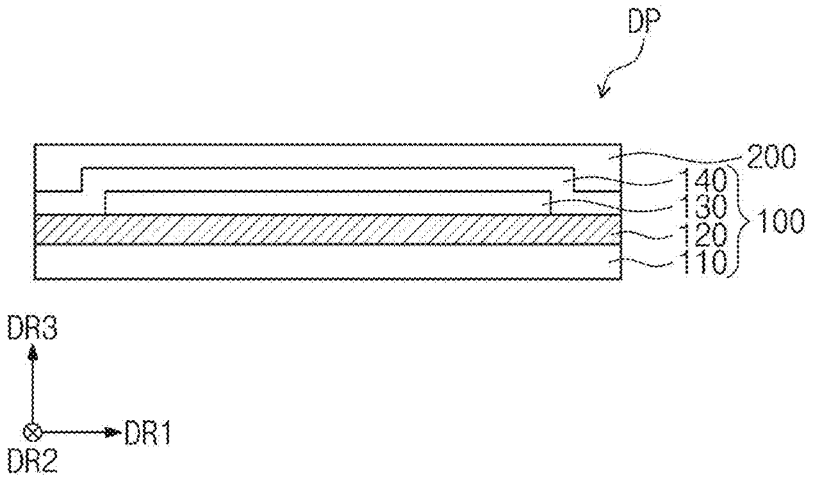
FIG. 4 is a schematic sectional view of a display panel according to an embodiment of the present disclosure.

FIG. 4 is a schematic sectional view of the display panel according to an embodiment of the present disclosure.

Referring to FIG. 4, the display panel DP may include a display layer 100 and a sensor layer 200.

The display layer 110 may include a base layer 110, a circuit layer 120, a light emitting element layer 130, and an encapsulation layer 140.

The base layer 110 may be a member that provides a base surface on which the circuit layer 120 is disposed. The base layer 110 may have a multi-layered structure or a single-layer structure. The base layer 110 may be a glass substrate, a metal substrate, a silicon substrate, or a polymer substrate, but the present disclosure is not particularly limited thereto.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a suitable process, such as coating or deposition. The insulating layer, the semiconductor layer, and the conductive layer may be selectively subjected to patterning by performing a photolithography process a plurality of times.

The light emitting element layer 130 may be disposed on the circuit layer 120. The light emitting element layer 130 may include light emitting elements. For example, the light emitting element layer 130 may include an organic luminescent material, an inorganic luminescent material, an organic-inorganic luminescent material, a quantum dot, a quantum rod, a micro LED, or a nano LED.

The encapsulation layer 140 may be disposed on the light emitting element layer 130. The encapsulation layer 140 may protect the light emitting element layer 130 from foreign matter, such as moisture, oxygen, and dust particles.

The sensor layer 200 may be disposed on the display layer 100. The sensor layer 200 may sense an external input applied from the outside. The sensor layer 200 may be an integrated sensor that is continuously formed in a process of manufacturing the display layer 100. As another example, the sensor layer 200 may be an external sensor that is attached to the display layer 100. The sensor layer 200 may be referred to as a sensor, an input sensing layer, an input sensing panel, or an electronic device for sensing input coordinates.

According to an embodiment of the present disclosure, the sensor layer 200 may sense both an input by a passive input means, such as a part of a user's body, and an input by the input device PN (e.g., refer to FIG. 1A) that generates a magnetic field having a suitable resonant frequency.

Figure 5:
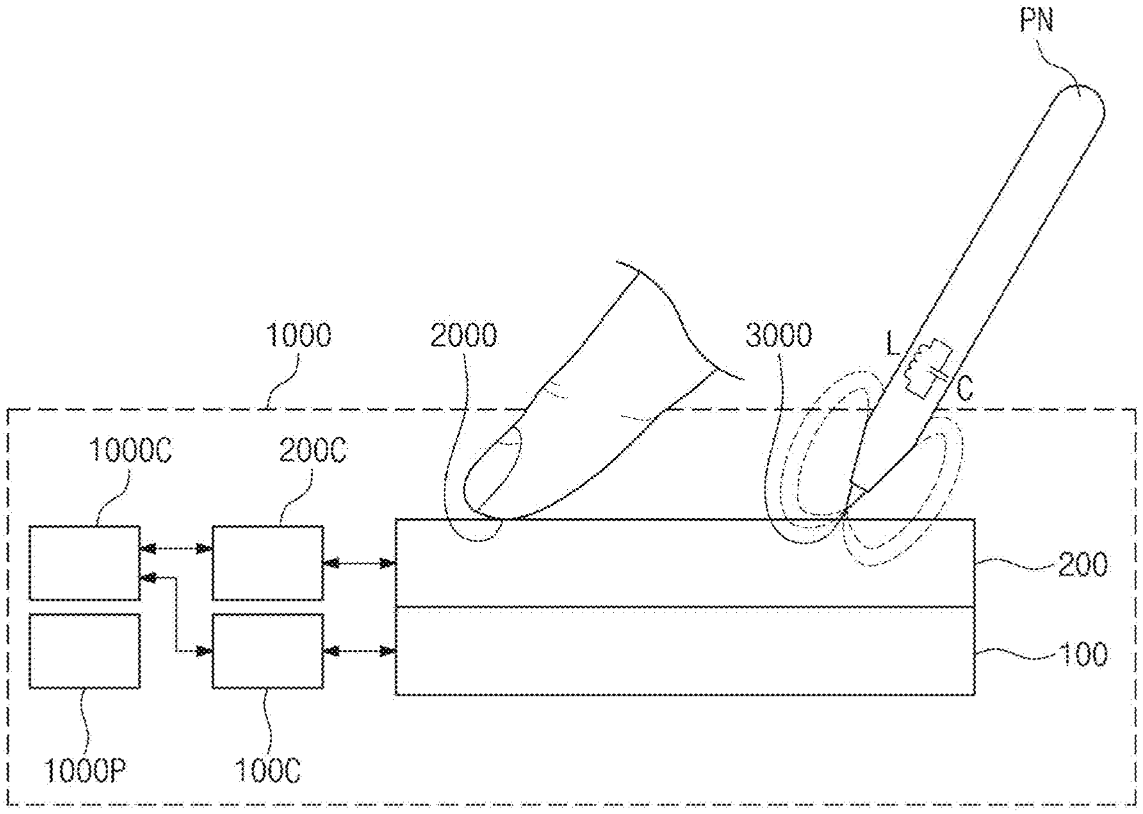
FIG. 5 is a view illustrating an operation of an electronic device according to an embodiment of the present disclosure.

FIG. 5 is a view illustrating an operation of an electronic device according to an embodiment of the present disclosure.

Referring to FIG. 5, the electronic device 1000 may include the display layer 100, the sensor layer 200, a display driver 100C, a sensor driver 200C, a main driver 1000C, and a power circuit 1000P.

The sensor layer 200 may sense a first input 2000 or a second input 3000 applied from the outside. Each of the first input 2000 and the second input 3000 may be an input (e.g., an input means) capable of changing the capacitance of the sensor layer 200. or an input (e.g., an input means) capable of causing an induced current in the sensor layer 200. For example, the first input 2000 may be an input by a passive input means, such as a part of a user's body. The second input 3000 may be an input by the pen PN, or an input by an RFIC tag. For example, the pen PN may be a pen of a passive kind or a pen of an active kind.

In an embodiment of the present disclosure, the pen PN may be a device that generates a magnetic field having a suitable resonant frequency. The pen PN may transmit an output signal based on an electromagnetic resonance scheme. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. In an embodiment of the present disclosure, the RLC resonance circuit may include (e.g., may be) a variable resonance circuit that varies the resonant frequency. In this case, the inductor L may be a variable inductor, and/or the capacitor C may be a variable capacitor. However, the present disclosure is not particularly limited thereto.

The inductor L may generate a current by a magnetic field formed in the sensor layer 200. However, the present disclosure is not particularly limited thereto. For example, when the pen PN operates in an active kind, the pen PN may generate a current even though a magnetic field is not provided to the pen PN from the outside. The generated current is transferred to the capacitor C. The capacitor C may charge the current input from the inductor L, and discharge the charged current to the inductor L. Thereafter, the inductor L may emit a magnetic field having a suitable resonant frequency. An induced current may flow in the sensor layer 200 by the magnetic field emitted from the pen PN. The induced current may be transferred to the sensor driver 200C as a reception signal (e.g., a sensing signal or a signal).

The main driver 1000C may control the overall operations of the electronic device 1000. For example, the main driver 1000C may control operations of the display driver 100C and the sensor driver 200C. The main driver 1000C may include at least one microprocessor, and may further include a graphic controller. The main driver 1000C may be referred to as an application processor, a central processing unit, or a main processor.

1 The display driver 100C may drive the display layer 100. The display driver 100C may receive image data and a control signal from the main driver 1000C. The control signal may include various suitable signals. For example, the control signal may include an input vertical synchronization signal, an input horizontal synchronization signal, a main clock, and a data enable signal.

The sensor driver 200C may drive the sensor layer 200. The sensor driver 200C may receive a control signal from the main driver 1000C. The control signal may include a clock signal of the sensor driver 200C. In addition, the control signal may further include a mode determination signal for determining the operating mode of the sensor driver 200C and the sensor layer 200.

The sensor driver 200C may be implemented with an integrated circuit (IC), and may be electrically connected with the sensor layer 200. For example, the sensor driver 200C may be directly mounted on an area of the display panel. As another example, the sensor driver 200C may be mounted on a separate printed circuit board using a chip on film (COF) method, and may be electrically connected with the sensor layer 200.

The sensor driver 200C and the sensor layer 200 may selectively operate in a first mode or a second mode. For example, the first mode may be for sensing a touch input, for example, such as the first input 2000. The second mode may be for sensing an input by the pen PN, for example, such as the second input 3000. The first mode may be referred to as a touch sensing mode, and the second mode may be referred to as a pen sensing mode.

Switching between the first mode and the second mode may be performed in various suitable ways. For example, the sensor driver 200C and the sensor layer 200 may be driven in the first mode and the second mode in a time-division manner, and may sense the first input 2000 and the second input 3000. As another example, the switching between the first mode and the second mode may be performed by a user's selection or a user's specific action. In another example, by activating or deactivating a specific application, one of the first mode and/or the second mode may be activated or deactivated, or the operating mode may be switched from one mode to the other mode. As another example, while the sensor driver 200C and the sensor layer 200 alternately operate in the first mode and the second mode, when the first input 2000 is sensed, the sensor driver 200C and the sensor layer 200 may remain in the first mode, and when the second input 3000 is sensed, the sensor driver 200C and the sensor layer 200 may remain in the second mode.

The sensor driver 200C may calculate coordinate information of an input based on a signal received from the sensor layer 200, and may provide a coordinate signal having the coordinate information to the main driver 1000C. The main driver 1000C executes an operation corresponding to the user input, based on the coordinate signal. For example, the main driver 1000C may operate the display driver 100C, such that a new application image is displayed on the display layer 100.

The power circuit 1000P may include a power management integrated circuit (PMIC). The power circuit 1000P may generate a plurality of drive voltages for driving the display layer 100, the sensor layer 200, the display driver 100C, and the sensor driver 200C. For example, the plurality of drive voltages may include a gate high-voltage, a gate low-voltage, a first drive voltage (e.g., an ELVSS voltage), a second drive voltage (e.g., an ELVDD voltage), an initialization voltage, and the like, but the present disclosure is not particularly limited to these examples.

Figure 6:
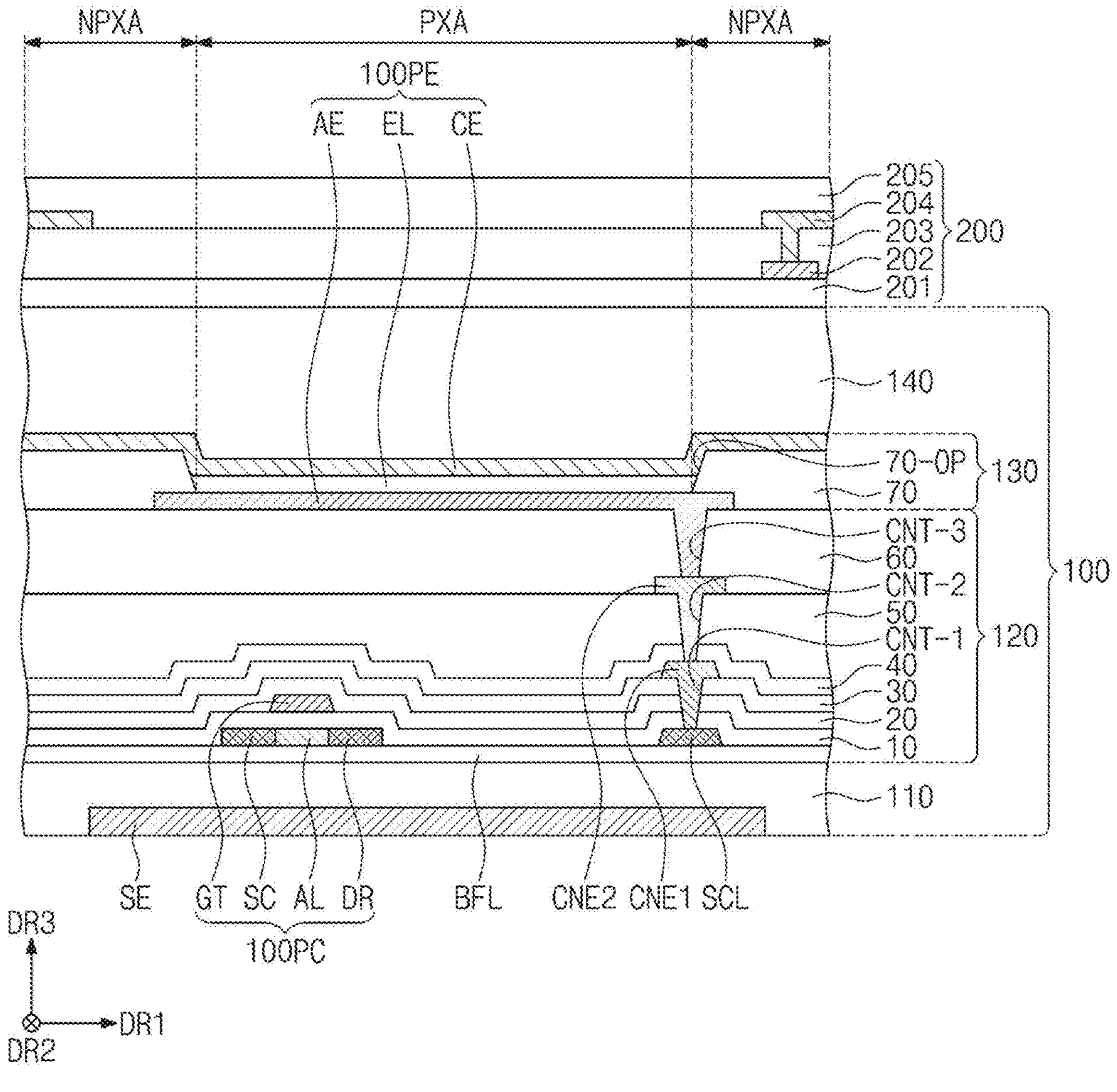
FIG. 6 is a sectional view of the display panel according to an embodiment of the present disclosure.

FIG. 6 is a sectional view of the display panel according to an embodiment of the present disclosure. Hereinafter with reference to FIG. 6, the components that are the same or substantially the same as those described above with reference to FIG. 4 are denoted with the same reference symbols, and thus, redundant description thereof may not be repeated.

Referring to FIG. 6, the base layer 110 may include a first charging electrode SE. The base layer 110 may be referred to as an auxiliary layer 110, and will be described in more detail below.

At least one buffer layer BFL may be formed on the upper surface of the base layer 110. The buffer layer BFL may improve a coupling force between the base layer 110 and a semiconductor pattern. The buffer layer BFL may be formed of multiple layers. As another example, the display layer 100 may further include a barrier layer. The buffer layer BFL may include at least one of silicon oxide, silicon nitride, or silicon oxy nitride. For example, the buffer layer BFL may include a suitable structure in which silicon oxide layers and silicon nitride layers are alternately stacked one above another.

The semiconductor pattern SC, AL, DR, and SCL may be disposed on the buffer layer BFL. The semiconductor pattern SC, AL, DR, and SCL may include poly silicon. However, the present disclosure is not limited thereto, and the semiconductor pattern SC, AL, DR, and SCL may include amorphous silicon, a low-temperature polycrystalline silicon, or an oxide semiconductor.

FIG. 6 illustrates a portion (e.g., only a portion) of the semiconductor pattern SC, AL, DR, and SCL, and the semiconductor pattern may be additionally disposed in other areas. The semiconductor pattern SC, AL, DR, and SCL may be arranged according to a suitable rule (e.g., a specific or predetermined rule) across the pixels. The semiconductor pattern SC, AL, DR, and SCL may have different electrical properties depending on whether or not it is doped (e.g., whether doping is performed or not). The semiconductor pattern SC, AL, DR, and SCL may include first areas SC, DR, and SCL having a relatively higher or high conductivity, and a second area AL having a relatively lower or low conductivity. The first areas SC, DR, and SCL may be doped with an N-type dopant or a P-type dopant. A P-type transistor may include a doped area that is doped with a P-type dopant, and an N-type transistor may include a doped area that is doped with an N-type dopant. The second area AL may be a non-doped area, or may be an area that is more lightly doped than those of the first areas.

The first areas SC, DR, and SCL may have a higher conductivity than that of the second area AL, and may substantially serve as electrodes or signal lines. The second area AL may substantially correspond to an active area AL (e.g., a channel) of a transistor 100PC. In other words, one portion AL of the semiconductor pattern SC, AL, DR, and SCL may be the active area AL of the transistor 100PC, another portion SC or DR may be a source area SC or a drain area DR of the transistor 100PC, and another portion SCL may be a connecting electrode or a connecting signal line SCL.

Each of the pixels may have an equivalent circuit including seven transistors, one capacitor, and a light emitting element. However, the present disclosure is not limited thereto, and the equivalent circuit of the pixel may be modified in various suitable forms as needed or desired as would be understood by those having ordinary skill in the art. In FIG. 6, one transistor 100PC and one light emitting element 100PE included in the pixel are illustrated as an example.

The source area SC, the active area AL, and the drain area DR of the transistor 100PC may be formed from the semiconductor pattern SC, AL, DR, and SCL. The source area SC and the drain area DR may extend from the active area AL in opposite directions from each other on the section (e.g., in a cross-sectional view). In FIG. 6, a portion of the connecting signal line SCL formed from the semiconductor pattern SC, AL, DR, and SCL is illustrated. The connecting signal line SCL may be connected to the drain area DR of the transistor 100PC in another view (e.g., when viewed from above the plane or in a plan view).

A first insulating layer 10 may be disposed on the buffer layer BFL. The first insulating layer 10 may commonly overlap with the plurality of pixels, and may cover the semiconductor pattern SC, AL, DR, and SCL. The first insulating layer 10 may be an inorganic layer and/or an organic layer, and may have a single-layer structure or a multi-layered structure. The first insulating layer 10 may include at least one of aluminum oxide, titanium oxide, silicon oxide, silicon nitride, silicon oxy nitride, zirconium oxide, or hafnium oxide. In the present embodiment, the first insulating layer 10 may be a single silicon oxide layer. Not only the first insulating layer 10, but also insulating layers of the circuit layer 120 that will be described in more detail below, may be inorganic layers and/or organic layers, and may have a single-layer structure or a multi-layered structure. The inorganic layers may include at least one of the aforementioned inorganic materials, but the present disclosure is not limited thereto.

A gate GT of the transistor 100PC may be disposed on the first insulating layer 10. The gate GT may be a portion of a metal pattern. The gate GT overlaps with the active area AL. The gate GT may function as a mask in a process of doping or reducing the semiconductor pattern SC, AL, DR, and SCL.

A second insulating layer 20 may be disposed on the first insulating layer 10, and may cover the gate GT. The second insulating layer 20 may commonly overlap with the pixels. The second insulating layer 20 may be an inorganic layer and/or an organic layer, and may have a single-layer structure or a multi-layered structure. The second insulating layer 20 may include at least one of silicon oxide, silicon nitride, or silicon oxy nitride. In the present embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer structure or a multi-layered structure. For example, the third insulating layer 30 may have a multi-layered structure including a silicon oxide layer and a silicon nitride layer.

A first connecting electrode CNE1 may be disposed on the third insulating layer 30. The first connecting electrode CNE1 may be connected to the connecting signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connecting electrode CNE2 may be disposed on the fifth insulating layer 50. The second connecting electrode CNE2 may be connected to the first connecting electrode CNE1 through a contact hole CNT-2 penetrating the fourth insulating layer 40 and the fifth insulating layer 50.

A sixth insulating layer 60 may be disposed on the fifth insulating layer 50, and may cover the second connecting electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic luminescent material, an inorganic luminescent material, an organic-inorganic luminescent material, a quantum dot, a quantum rod, a micro LED, or a nano LED. Hereinafter, for convenience of illustration, the the light emitting element 100PE may be described in more detail in the context of an organic light emitting element. However, the present disclosure is not particularly limited thereto.

The light emitting element 100PE may include a first electrode AE, an emissive layer EL, and a second electrode CE.

The first electrode AE may be disposed on the sixth insulating layer 60. The first electrode AE may be connected to the second connecting electrode CNE2 through a contact hole CNT-3 penetrating the sixth insulating layer 60.

A pixel defining layer 70 may be disposed on the sixth insulating layer 60, and may cover a portion of the first electrode AE. The pixel defining layer 70 has an opening 70-OP defined therein. The opening 70-OP of the pixel defining layer 70 exposes at least a portion of the first electrode AE.

The first display part DA1-F (e.g., refer to FIG. 1A) may include an emissive area PXA, and a non-emissive area NPXA adjacent to the emissive area PXA. The non-emissive area NPXA may surround (e.g., around a periphery of) the emissive area PXA. In the present embodiment, the emissive area PXA is defined to correspond to a partial area of the first electrode AE exposed through the opening 70-OP.

The emissive layer EL may be disposed on the first electrode AE. The emissive layer EL may be disposed in an area corresponding to the opening 70-OP. In other words, the emissive layer EL may be separately formed in each of the pixels. When the emissive layer EL is separately formed in each of the pixels, the emissive layers EL may each emit at least one of a blue light, a red light, or a green light. However, the present disclosure is not limited thereto, and the emissive layer EL may be connected to the pixels and may be commonly included in the pixels. In this case, the emissive layer EL may provide a blue light or a white light.

The second electrode CE may be disposed on the emissive layer EL. The second electrode CE may have a one-body shape (e.g., an integral shape), and may be commonly included in the plurality of pixels.

In an embodiment of the present disclosure, a hole control layer may be disposed between the first electrode AE and the emissive layer EL. The hole control layer may be commonly disposed in the emissive area PXA and the non-emissive area NPXA. The hole control layer may include a hole transport layer, and may further include a hole injection layer. An electron control layer may be disposed between the emissive layer EL and the second electrode CE. The electron control layer may include an electron transport layer, and may further include an electron injection layer. The hole control layer and the electron control layer may be commonly formed in the plurality of pixels using an open mask or an ink-jet process.

The encapsulation layer 140 may be disposed on the light emitting element layer 130. The encapsulation layer 140 may include an inorganic layer, an organic layer, and an inorganic layer, which are sequentially stacked one above another. However, the layers constituting the encapsulation layer 140 are not limited thereto. The inorganic layers may protect the light emitting element layer 130 from moisture and oxygen, and the organic layer may protect the light emitting element layer 130 from foreign matter such as dust particles. The inorganic layers may include a silicon nitride layer, a silicon oxy nitride layer, a silicon oxide layer, a titanium oxide layer, or an aluminum oxide layer. The organic layer may include an acrylic organic layer, but the present disclosure is not limited thereto.

The sensor layer 200 may include a base layer 201, a first conductive layer 202, a sensing insulation layer 203, a second conductive layer 204, and a cover insulating layer 205.

The base layer 201 may be an inorganic layer including at least one of silicon nitride, silicon oxy nitride, or silicon oxide. As another example, the base layer 201 may be an organic layer including an epoxy resin, an acrylic resin, or an imide-based resin. The base layer 201 may have a single-layer structure, or may have a multi-layered structure stacked in the third direction DR3.

Each of the first conductive layer 202 and the second conductive layer 204 may have a single-layer structure, or may have a multi-layered structure stacked in the third direction DR3.

Each of the first conductive layer 202 and the second conductive layer 204 that have the single-layer structure may include a metal layer or a transparent conductive layer. The metal layer may include molybdenum, silver, titanium, copper, aluminum, or a suitable alloy thereof. The transparent conductive layer may include a transparent conductive oxide, such as indium tin oxide (ITO), indium zinc oxide (IZO), zinc oxide (ZnO), indium zinc tin oxide (IZTO), or the like. In addition, the transparent conductive layer may include a conductive polymer such as poly(3,4-ethylenedioxythiophene) (PEDOT), a metal nano wire, or graphene.

Each of the first conductive layer 202 and the second conductive layer 204 that have the multi-layered structure may include a plurality of metal layers. The metal layers may have, for example, a three-layered structure of titanium/aluminum/titanium. The conductive layer having the multi-layered structure may include at least one metal layer and at least one transparent conductive layer.

At least one of the sensing insulation layer 203 or the cover insulating layer 205 may include an inorganic film. The inorganic film may include at least one of aluminum oxide, titanium oxide, silicon oxide, silicon nitride, silicon oxy nitride, zirconium oxide, or hafnium oxide.

At least one of the sensing insulation layer 203 or the cover insulating layer 205 may include an organic film. The organic film may include at least one of an acrylic resin, a methacrylic resin, a polyisoprene resin, a vinyl resin, an epoxy resin, a urethane-based resin, a celluosic resin, a siloxane-based resin, a polyimide resin, a polyamide resin, or a perylene-based resin.

Figure 7:
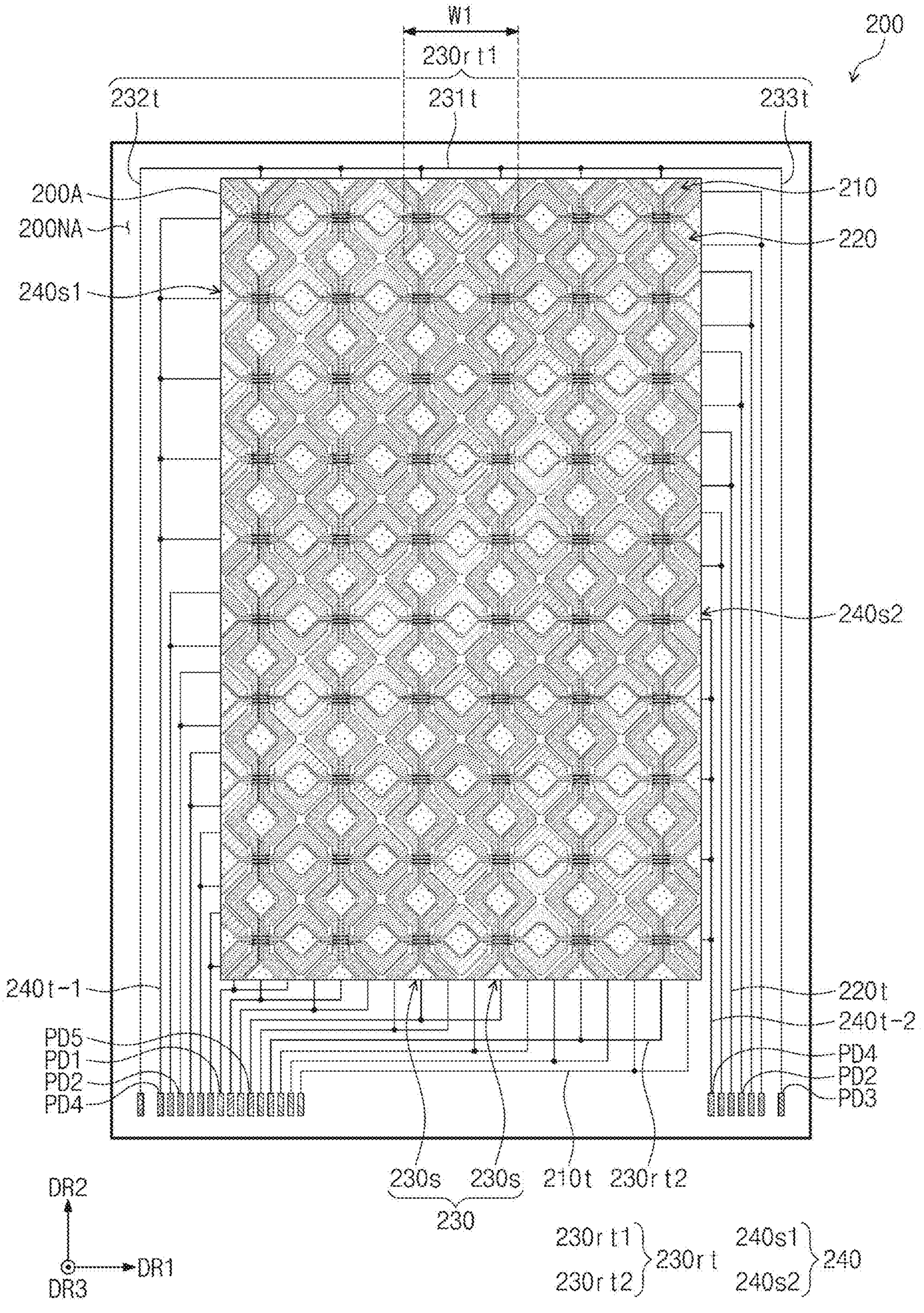
FIG. 7 is a plan view of a sensor layer according to an embodiment of the present disclosure.
Figure 8:
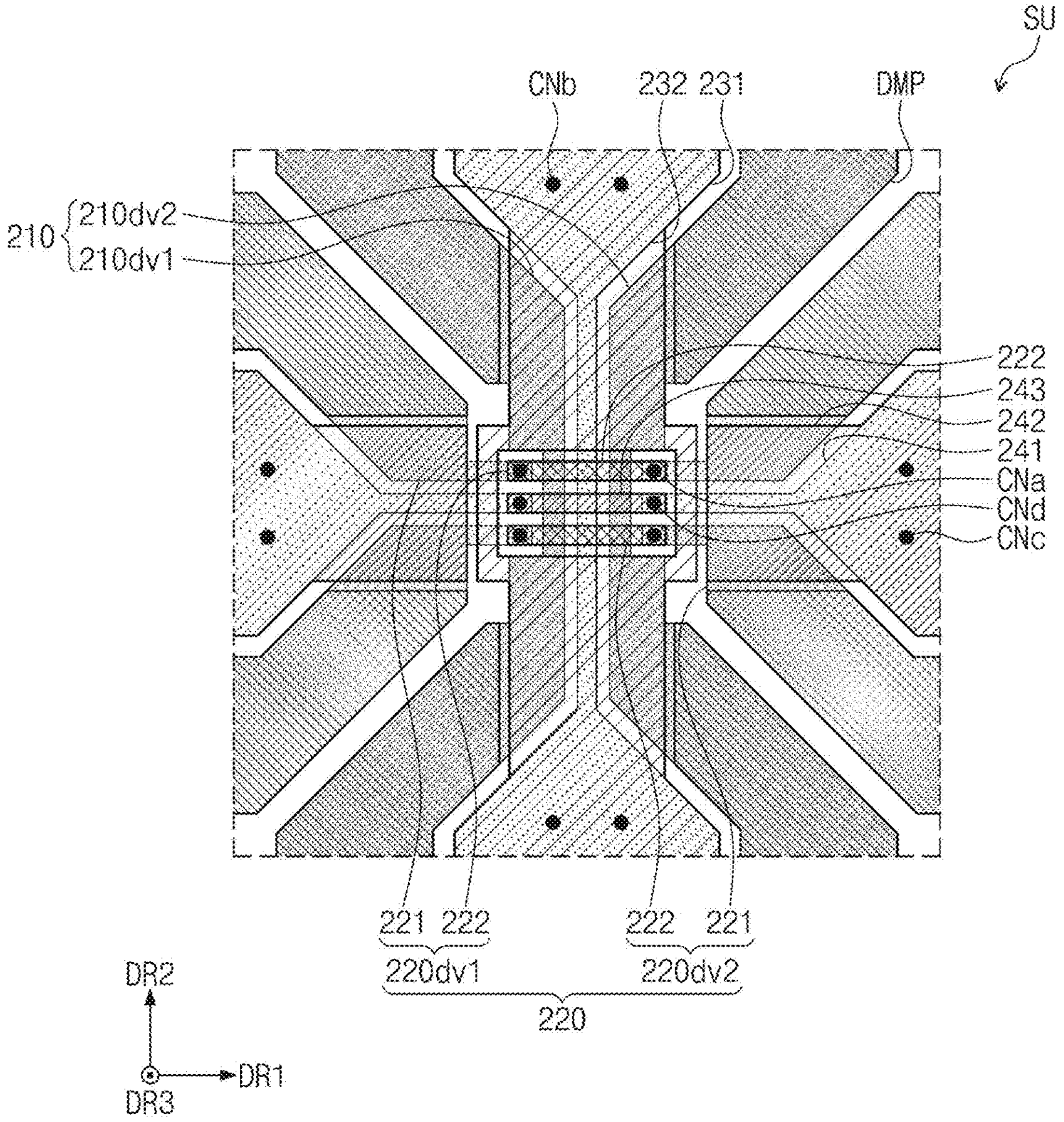
FIG. 8 is an enlarged plan view illustrating one sensing unit according to an embodiment of the present disclosure.
Figure 9A:
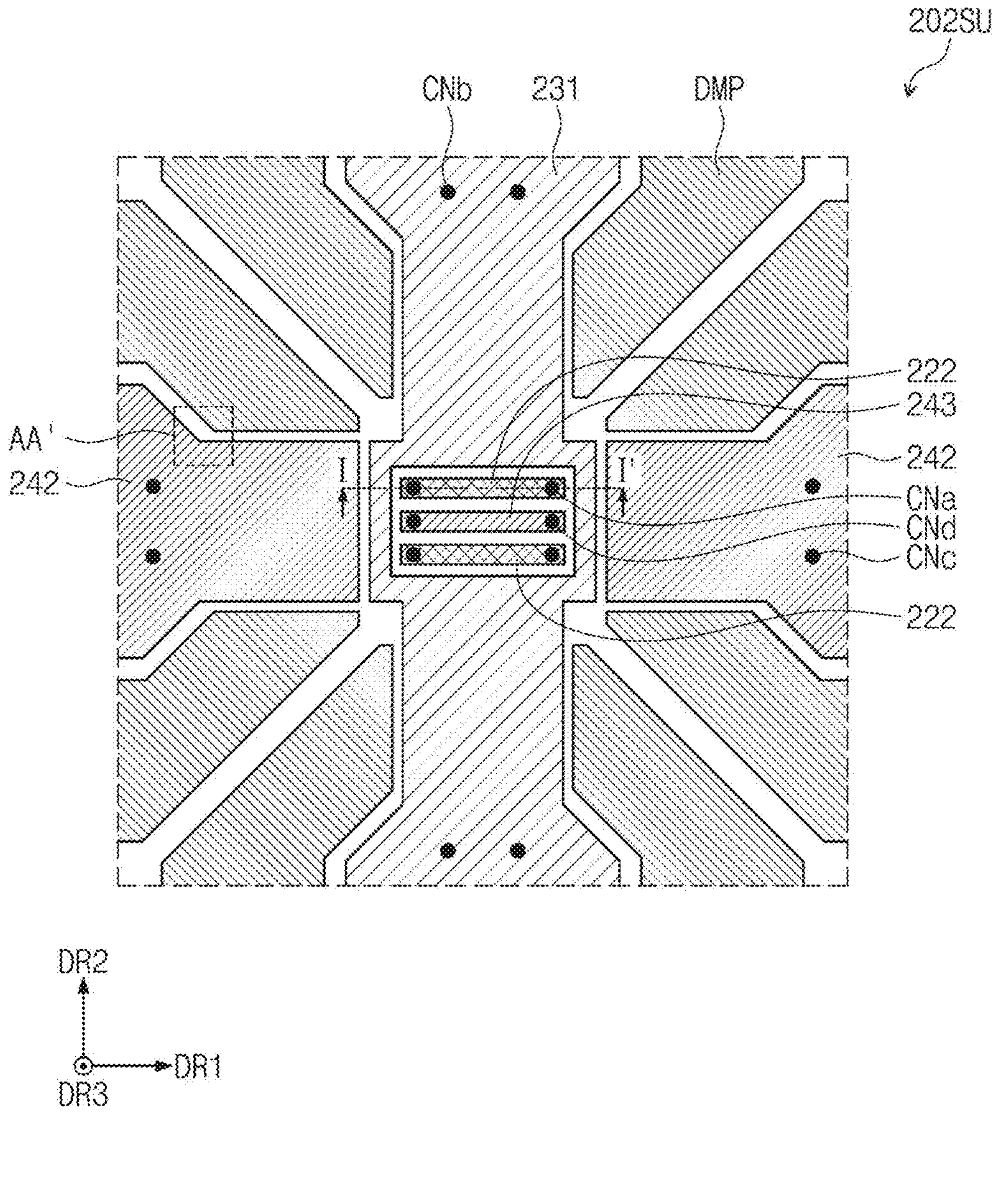
FIG. 9A is a plan view illustrating a first conductive layer of the sensing unit according to an embodiment of the present disclosure.
Figure 9B:
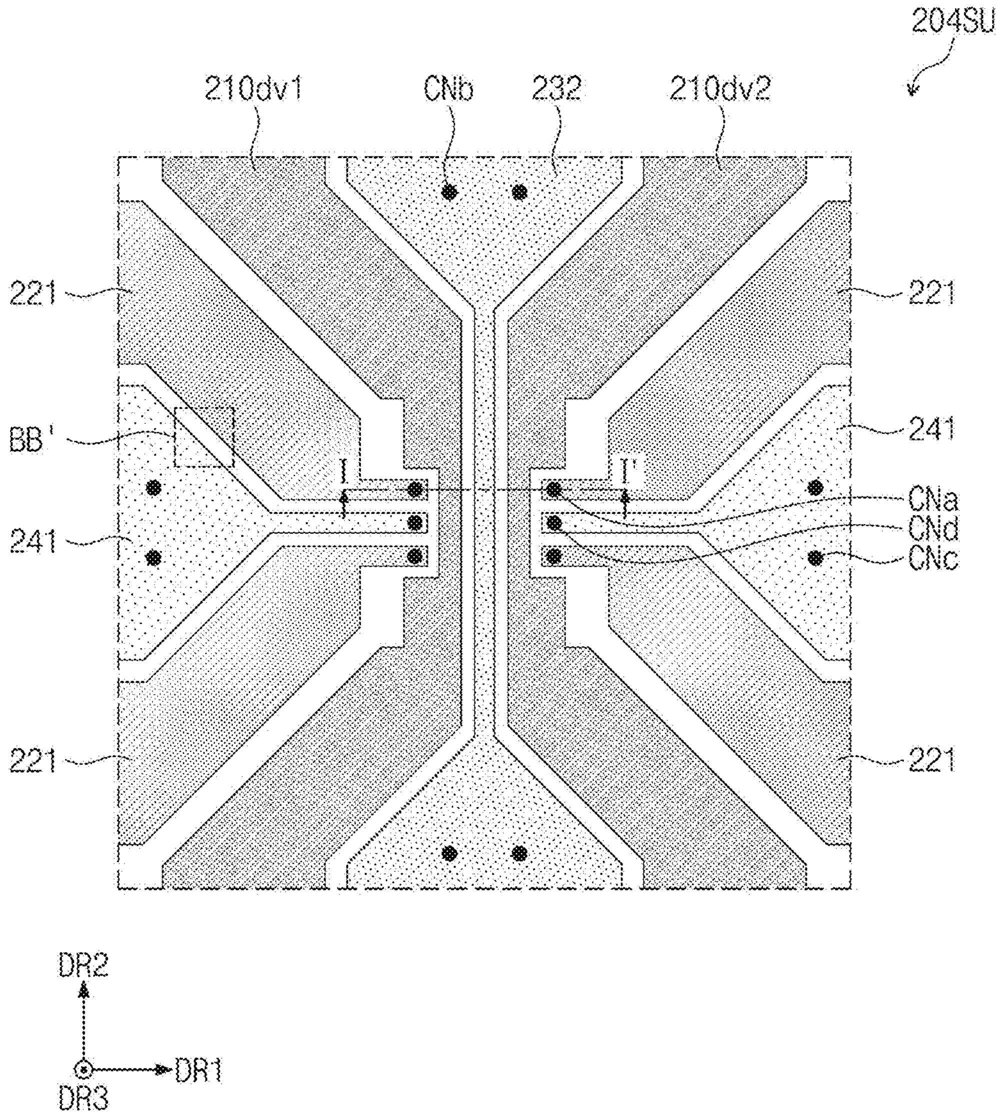
FIG. 9B is a plan view illustrating a second conductive layer of the sensing unit according to an embodiment of the present disclosure.
Figure 9C:
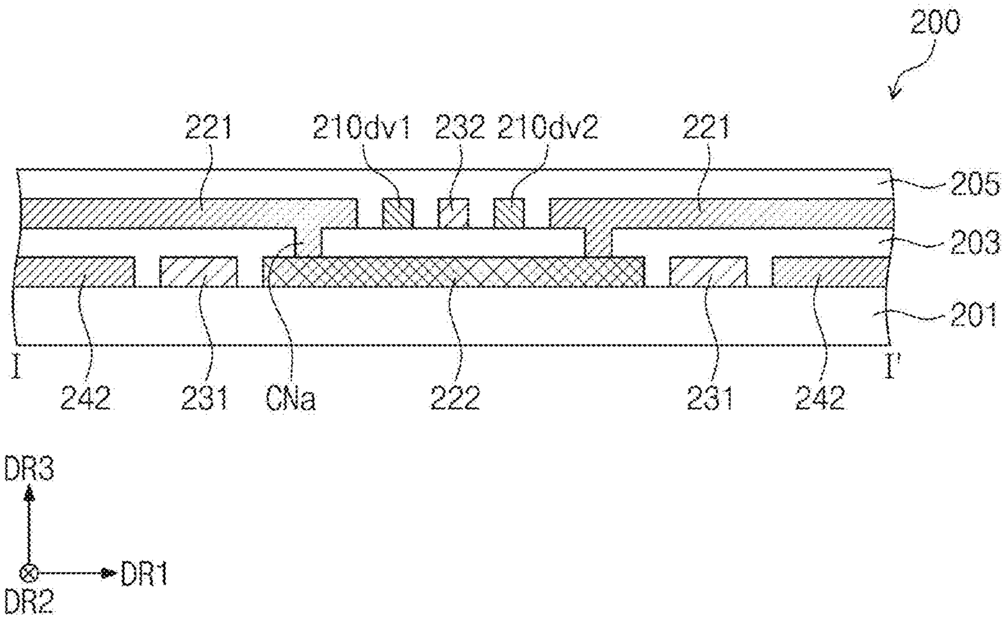
FIG. 9C is a sectional view of the sensor layer taken along the line I-I' illustrated in FIGS. 9A and 9B.

FIG. 7 is a plan view of the sensor layer according to an embodiment of the present disclosure. FIG. 8 is an enlarged plan view illustrating one sensing unit according to an embodiment of the present disclosure. FIG. 9A is a plan view illustrating a first conductive layer of the sensing unit according to an embodiment of the present disclosure. FIG. 9B is a plan view illustrating a second conductive layer of the sensing unit according to an embodiment of the present disclosure. FIG. 9C is a sectional view of the sensor layer taken along the line I-I' illustrated in FIGS. 9A and 9B.

Referring to FIGS. 7 to 9C, the sensor layer 200 may have an active area 200A, and a peripheral area 200NA adjacent to the active area 200A.

The sensor layer 200 may include a plurality of sensing units SU (e.g., unit sensors or unit sensing regions) disposed in the active area 200A. The plurality of sensing units SU may be arranged along the first direction DR1 and the second direction DR2.

The sensor layer 200 may include a plurality of first electrodes 210, a plurality of second electrodes 220, a plurality of third electrodes 230, and a plurality of fourth electrodes 240.

Each of the plurality of first electrodes 210 may cross the plurality of second electrodes 220. Each of the plurality of first electrodes 210 may extend in the second direction DR2. The plurality of first electrodes 210 may be spaced apart from one another along the first direction DR1.

Each of the plurality of second electrodes 220 may extend in the first direction DR1. The plurality of second electrodes 220 may be spaced apart from one another along the second direction DR2.

The sensing unit SU of the sensor layer 200 may be an area or a region where one first electrode 210 and one second electrode 220 cross each other.

The sensing unit SU may include one first electrode 210 among the plurality of first electrodes 210, one second electrode 220 among the plurality of second electrodes 220, one third electrode 230 among the plurality of third electrodes 230, and one fourth electrode 240 among the plurality of fourth electrodes 240.

Each of the first electrodes 210 may include first divided electrodes 210*dv*1 and 210*dv*2. The first divided electrodes 210*dv*1 and 210*dv*2 may extend in the second direction DR2, and may be spaced apart from each other in the first direction DR1. The first divided electrodes 210*dv*1 and 210*dv*2 may have suitable shapes having a line symmetry with each other with respect to a line extending in the second direction DR2.

Each of the second electrodes 220 may include second divided electrodes 220*dv*1 and 220*dv*2. The second electrodes 220 may extend in the first direction DR1, and may be spaced apart from one another in the second direction DR2. The second divided electrodes 220*dv*1 and 220*dv*2 may have suitable shapes having a line symmetry with each other with respect to a line extending in the first direction DR1.

Each of the second divided electrodes 220*dv*1 and 220*dv*2 may include a sensing pattern 221 and a bridge pattern 222. The sensing pattern 221 and the bridge pattern 222 may be disposed at (e.g., in or on) different layers from each other. The sensing pattern 221 and the bridge pattern 222 may be electrically connected with each other through a first contact CNa. For example, the bridge pattern 222 may be included in the first conductive layer 202SU, and the sensing pattern 221 and the first divided electrodes 210*dv*1 and 210*dv*2 may be included in the second conductive layer 204SU. The first conductive layer 202SU may be included in the first conductive layer 202 described above with reference to FIG. 6, and the second conductive layer 204SU may be included in the second conductive layer 204.

Each of the third electrodes 230 may extend in the second direction DR2. The third electrodes 230 may be spaced apart from one another along the first direction DR1. In an embodiment of the present disclosure, each of the third electrodes 230 may include a plurality of first auxiliary electrodes 230*s* connected in parallel with each other. The number of first auxiliary electrodes 230*s* included in one third electrode 230 (e.g., included in each of the third electrodes 230) may be variously modified as needed or desired. For example, as the number of first auxiliary electrodes 230*s* included in each of the third electrodes 230 is increased, a resistance of each of the third electrodes 230 may be lowered, and thus, a power efficiency and a sensing sensitivity may be improved. On the other hand, as the number of first auxiliary electrodes 230*s* included in each of the third electrodes 230 is decreased, a loop coil pattern formed using the third electrodes 230 may be implemented in more various suitable forms.

Although FIG. 7 illustrates an example in which one third electrode 230 includes two first auxiliary electrodes 230*s*, the present disclosure is not particularly limited thereto. In some embodiments, first auxiliary electrodes 230*s* may be disposed to correspond to the first electrodes 210 in a one-to-one manner. Accordingly, one sensing unit SU may include a portion of one first auxiliary electrode 230*s*.

A coupling capacitor may be defined between one first electrode 210 and one third electrode 230. In this case, an induced current generated when the pen is sensed may be transferred from the third electrode 230 to the first electrode 210 through the coupling capacitor. In other words, the third electrode 230 may serve to supplement a signal transferred from the first electrode 210 to the sensor driver 200C. Accordingly, a greatest effect may be obtained when the phase of a signal induced in the third electrode 230 coincides with the phase of a signal induced in the first electrode 210. Accordingly, the centers of the first electrodes 210 in the second direction DR2 may overlap with the centers of the third electrodes 230 in the second direction DR2. In addition, the centers of the first electrodes 210 in the first direction DR1 may overlap with the centers of the third electrodes 230 in the first direction DR1.

In an embodiment of the present disclosure, because one third electrode 230 includes two first auxiliary electrodes 230*s*, the one third electrode 230 may correspond to (e.g., may overlap with) two first electrodes 210. Accordingly, the number of first electrodes 210 included in the sensor layer 200 may be greater than the number of third electrodes 230. For example, the number of first electrodes 210 may be equal to the product of the number of third electrodes 230 included in the sensor layer 200 and the number of first auxiliary electrodes 230*s* included in each of the third electrodes 230. In FIG. 7, the number of first electrodes 210 may be six, the number of third electrodes 230 may be three, and the number of first auxiliary electrodes 230*s* included in each of the third electrodes 230 may be two.

One third electrode 230 may have a first width W1 in the first direction DR1. The first width W1 may be defined based on a channel that substantially functions as the third electrode 230. For example, the first width W1 may be defined as a maximum width in the first direction DR1 between two first auxiliary electrodes 230*s* included in the third electrode 230.

The fourth electrodes 240 may be arranged along the second direction DR2. The fourth electrodes 240 may extend in the first direction DR1. In an embodiment of the present disclosure, each of the fourth electrodes 240 may include second auxiliary electrodes 240*s*1 or 240*s*2 connected in parallel with each other. The second auxiliary electrodes 240*s*1 or 240*s*2 may be referred to as second-first auxiliary electrodes 240*s*1 or second-second auxiliary electrodes 240*s*2.

Routing directions of the second-first auxiliary electrodes 240*s*1 may be different from that of the second-second auxiliary electrodes 240*s*2. In FIG. 7, two fourth electrodes 240 and five second auxiliary electrodes 240*s*1 or 240*s*2 included in each of the fourth electrodes 240 are illustrated as an example.

As used herein, when the routing directions are described as being different from each other, this means that the connection positions of the electrodes and the corresponding trace lines are different from each other. For example, a first connection position of a fourth trace line 240*t*-1 electrically connected with the second auxiliary electrode 240*s*1 may be different from a second connection position of a fourth trace line 240*t*-2 electrically connected with the second auxiliary electrode 240*s*2. The first connection position may be a left end with respect to the second auxiliary electrode 240*s*1, and the second connection position may be a right end with respect to the second auxiliary electrode 240*s*2.

In an embodiment of the present disclosure, the sensor layer 200 may include one fourth electrode. In this case, the fourth electrode may include ten second auxiliary electrodes connected in parallel with each other. However, the number of second auxiliary electrodes included in the fourth electrode is not limited to the above-described examples with reference to FIG. 7.

FIG. 7 illustrates an example in which five second auxiliary electrodes 240*s*1 are electrically connected together, and five second auxiliary electrodes 240*s*2 are electrically connected together. In other words, the ratio between the areas of the two fourth electrodes 240 or the ratio between the numbers of the second auxiliary electrodes included in the two fourth electrodes 240 may be 1:1. However, the present disclosure is not particularly limited thereto. For example, the number of second auxiliary electrodes 240*s*1 may be different from the number of second auxiliary electrodes 240*s*2.

In an embodiment of the present disclosure, when each of the fourth electrodes 240 includes the second auxiliary electrodes 240*s*1 or 240*s*2 connected in parallel with each other, an effect of increasing the area of one fourth electrode may be obtained. In addition, a resistance of each of the fourth electrodes 240 may be lowered, and thus, the sensing sensitivity for the second input 3000 (e.g., refer to FIG. 5) may be improved.

A coupling capacitor may be defined between one second electrode 220 and one second auxiliary electrode 240*s*1. In this case, an induced current generated when the pen is sensed may be transferred from the second auxiliary electrode 240*s*1 to the second electrode 220 through the coupling capacitor. In other words, the second auxiliary electrode 240*s*1 may serve to supplement a signal transferred from the second electrode 220 to the sensor driver 200C. Accordingly, a greatest effect may be obtained when the phase of a signal induced in the second auxiliary electrode 240*s*1 coincides with the phase of a signal induced in the second electrode 220. Thus, the centers of the second electrodes 220 in the first direction DR1 may overlap with the centers of the second auxiliary electrodes 240*s*1 in the first direction DR1. In addition, the centers of the second electrodes 220 in the second direction DR2 may overlap with the centers of the second auxiliary electrodes 240_s_1 in the second direction DR2.

Each of the third electrodes 230 may include a third-first pattern 231 and a third-second pattern 232. The third-first pattern 231 and the third-second pattern 232 may be disposed at (e.g., in or on) different layers from each other. The third-first pattern 231 and the third-second pattern 232 may be electrically connected with each other through a second contact CNb. The third-first pattern 231 may be included in the first conductive layer 202SU, and the third-second pattern 232 may be included in the second conductive layer 204SU.

In an embodiment of the present disclosure, a portion of the third-first pattern 231 may overlap with a portion of each of the first divided electrodes 210_dv_1 and 210_dv_2. Accordingly, a coupling capacitance may be provided (e.g., may be formed) between the first electrode 210 and the third electrode 230.

Each of the second auxiliary electrodes 240_s_1 or 240_s_2 included in the fourth electrode 240 may include a fourth-first pattern 241, a fourth-second pattern 242, and a fourth-third pattern 243. The fourth-second pattern 242 and the fourth-third pattern 243 may be disposed at (e.g., in or on) the same layer as each other, and the fourth-first pattern 241 may be disposed at (e.g., in or on) a layer different from the layer at (e.g., in or on) which the fourth-second pattern 242 and the fourth-third pattern 243 are disposed. The fourth-first pattern 241 and the fourth-second pattern 242 may be electrically connected with each other through a third contact CNc, and the fourth-first pattern 241 and the fourth-third pattern 243 may be electrically connected with each other through a fourth contact CNd. The fourth-second pattern 242 and the fourth-third pattern 243 may be included in the first conductive layer 202SU, and the fourth-first pattern 241 may be included in the second conductive layer 204SU.

In an embodiment of the present disclosure, a portion of the fourth-second pattern 242 may overlap with the sensing pattern 221 of each of the second divided electrodes 220_dv_1 and 220_dv_2. Accordingly, a coupling capacitor may be defined (e.g., may be provided or formed) between the second electrode 220 and the fourth electrode 240.

In an embodiment of the present disclosure, the first conductive layer 202SU may further include dummy patterns DMP. Each of the dummy patterns DMP may be electrically floated or electrically grounded. In an embodiment of the present disclosure, the dummy patterns DMP may be omitted as needed or desired.

The sensor layer 200 may further include a plurality of first trace lines 210_t_ disposed in the peripheral area 200NA, a plurality of first pads PD1 connected to the first trace lines 210_t_ in a one-to-one correspondence, a plurality of second trace lines 220_t_, and a plurality of second pads PD2 connected to the second trace lines 220_t_ in a one-to-one correspondence.

The first trace lines 210_t_ may be electrically connected to the first electrodes 210 in a one-to-one correspondence. Two first divided electrodes 210_dv_1 and 210_dv_2 included in one first electrode 210 may be connected to one first trace line among the first trace lines 210_t_. Each of the first trace lines 210_t_ may include a plurality of branch portions for connection to the two first divided electrodes 210_dv_1 and 210_dv_2. In an embodiment of the present disclosure, the two first divided electrodes 210_dv_1 and 210_dv_2 may be connected with each other in the active area 200A.

The second trace lines 220_t_ may be electrically connected to the second electrodes 220 in a one-to-one correspondence. Two second divided electrodes 220_dv_1 and 220_dv_2 included in one second electrode 220 may be connected to one second trace line among the second trace lines 220_t_. Each of the second trace lines 220_t_ may include a plurality of branch portions for connection to the two second divided electrodes 220_dv_1 and 220_dv_2. In an embodiment of the present disclosure, the two second divided electrodes 210_dv_1 and 210_dv_2 may be connected with each other in the active area 200A.

The sensor layer 200 may further include a third trace line 230_rt_1 disposed in the peripheral area 200NA, a plurality of third pads PD3 connected to one end and an opposite end of the third trace line 230_rt_1, the fourth trace lines 240_t_-1 and 240_t_-2, fourth pads PD4 connected to the fourth trace lines 240_t_-1 and 240_t_-2 in a one-to-one correspondence, fifth trace lines 230_rt_2, and fifth pads PD5 connected to the fifth trace lines 230_rt_2 in a one-to-one correspondence.

The third trace line 230_rt_1 and the fifth trace lines 230_rt_2 electrically connected to the plurality of third electrodes 230 may be referred to as a charging trace line 230_rt_.

The third trace line 230_rt_1 may be electrically connected with the third electrodes 230. For example, the third trace line 230_rt_1 may be electrically connected to all of the third electrodes 230. As such, the plurality of third electrodes 230 may be electrically connected with one another. The third trace line 230_rt_1 may include a first line portion 231_t_ that extends in the first direction DR1 and is electrically connected to the third electrodes 230, a second line portion 232_t_ that extends from a first end of the first line portion 231_t_ in the second direction DR2, and a third line portion 233_t_ that extends from a second end of the first line portion 231_t_ in the second direction DR2.

In an embodiment of the present disclosure, each of a resistance of the second line portion 232_t_ and a resistance of the third line portion 233_t_ may be the same or substantially the same as a resistance of one third electrode among the third electrodes 230. Accordingly, the second line portion 232_t_ and the third line portion 233_t_ may serve as the third electrodes 230, and the same effect as placing the third electrodes 230 in the peripheral area 200NA may be obtained. For example, one of the second line portion 232_t_ or the third line portion 233_t_ and one of the third electrodes 230 may form a coil. Accordingly, the pen located in an area adjacent to the peripheral area 200NA may also be sufficiently charged by a loop including the second line portion 232_t_ or the third line portion 233_t_.

In an embodiment of the present disclosure, the widths of the second line portion 232_t_ and the third line portion 233_t_ in the first direction DR1 may be adjusted to adjust the resistance of the second line portion 232_t_ and the resistance of the third line portion 233_t_. However, the present disclosure is not limited thereto, and the first to third line portions 231_t_, 232_t_, and 233_t_ may have the same or substantially the same width as each other.

The fifth trace lines 230_rt_2 may be connected to the third electrodes 230 in a one-to-one correspondence. In other words, the number of fifth trace lines 230_rt_2 may correspond to the number of third electrodes 230. In FIG. 7, three fifth trace lines 230_rt_2 are illustrated as an example.

In an embodiment of the present disclosure, the fifth trace lines 230_t_2 and the fifth pads PD5 may be omitted as needed or desired, and a charging drive mode for charging the pen may be omitted. In this case, the sensor layer 200 may sense an input by an active pen capable of emitting a magnetic field, even though a magnetic field is not provided from the sensor layer 200.

The fourth trace lines 240*t*-1 and 240*t*-2 may be spaced apart from each other with the active area 200A therebetween. The fourth trace line 240*t*-1 may be electrically connected to at least one second auxiliary electrode 240*s*1 among the second auxiliary electrodes 240*s*1. For example, one end of each of the second auxiliary electrodes 240*s*1 may be connected to the fourth trace line 240*t*-1. The fourth trace line 240*t*-2 may be electrically connected to at least one second auxiliary electrode 240*s*2 among the second auxiliary electrodes 240*s*2. For example, one end of each of the second auxiliary electrodes 240*s*2 may be connected to the fourth trace line 240*t*-2.

Figure 10:
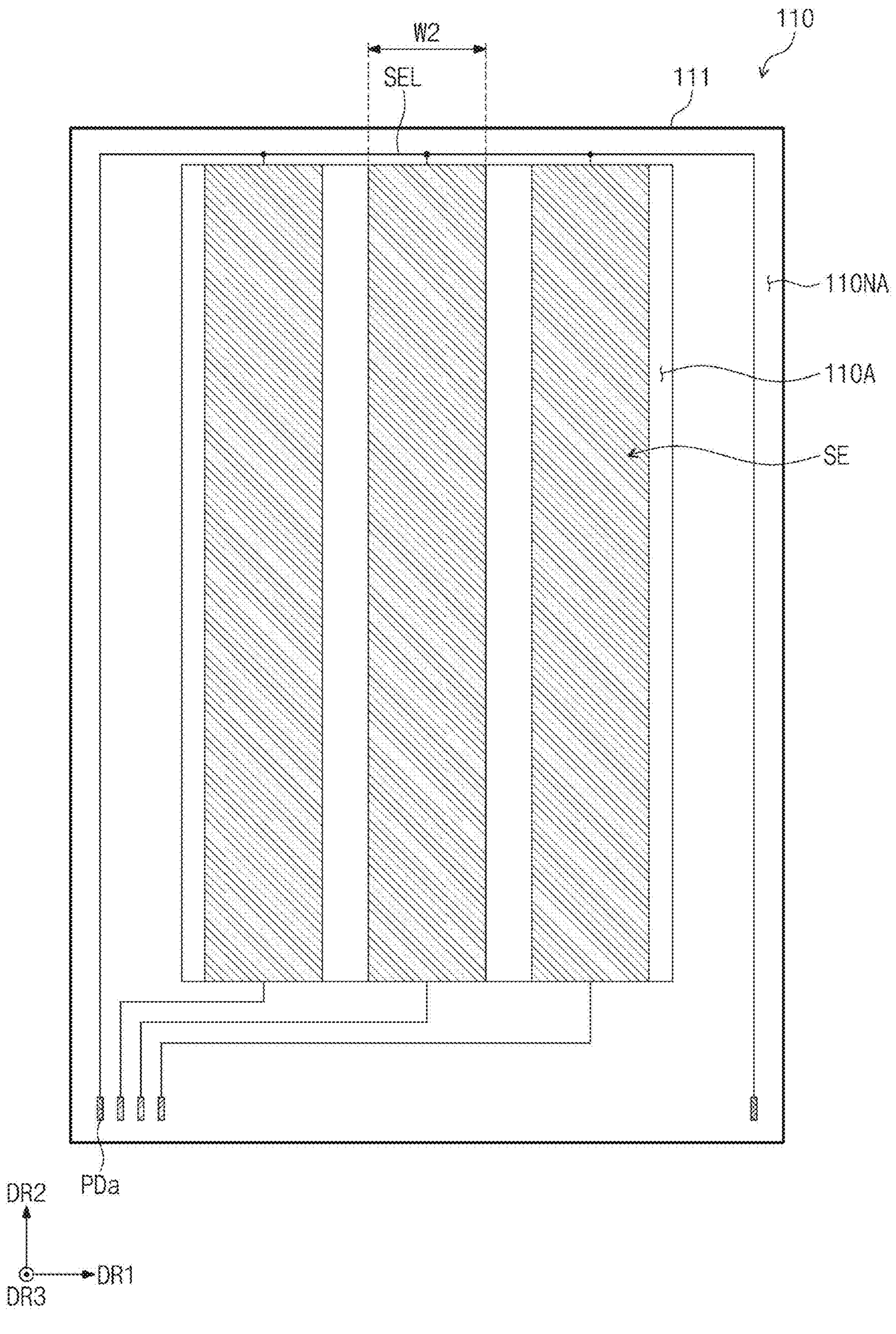
FIG. 10 is a plan view of a base layer according to an embodiment of the present disclosure.

FIG. 10 is a plan view of the base layer according to an embodiment of the present disclosure.

Referring to FIG. 10, the base layer 110 may have an active area 110A, and a peripheral area 110NA adjacent to the active area 110A.

The base layer 110 may include an insulating layer 111, a plurality of first charging electrodes SE, a plurality of charging lines SEL, and a plurality of charging pads PDa.

The insulating layer 111 may cover the plurality of first charging electrodes SE, the plurality of charging lines SEL, and the plurality of charging pads PDa. The insulating layer 111 may include an insulating material.

The plurality of first charging electrodes SE may be disposed in the active area 110A. Each of the plurality of first charging electrodes SE may extend in the second direction DR2, and the plurality of first charging electrodes SE may be spaced apart from one another along the first direction DR1.

In FIG. 10, three first charging electrodes SE are illustrated to correspond to the plurality of third electrodes 230 (e.g., refer to FIG. 7). However, the number of first charging electrodes SE is not limited thereto.

One first charging electrode SE may have a second width W2 in the first direction DR1. The second width W2 may be defined based on the first width W1 described above. The second width W2 may be equal to or substantially equal to the first width W1. However, the present disclosure is not limited thereto, and the second width W2 according to an embodiment of the present disclosure may be greater than or equal to the first width W1. This will be described in more detail below.

The plurality of first charging electrodes SE may include a conductive material. Unlike the plurality of third electrodes 230 (e.g., refer to FIG. 7), the plurality of first charging electrodes SE may not have a mesh structure. For example, each of the plurality of first charging electrodes SE may be implemented with an integrated electrode. The plurality of first charging electrodes SE may have a lower resistance than that of the plurality of third electrodes 230 (e.g., refer to FIG. 7).

The plurality of charging lines SEL and the plurality of charging pads PDa may be disposed in the peripheral area 110NA. The plurality of charging pads PDa may be connected to the plurality of charging lines SEL.

The plurality of charging lines SEL may be electrically connected with the plurality of first charging electrodes SE. The plurality of charging lines SEL may be connected to first ends and second ends of the plurality of first charging electrodes SE. The plurality of first charging electrodes SE may be electrically connected with one another by the plurality of charging lines SEL.

Figure 11A:
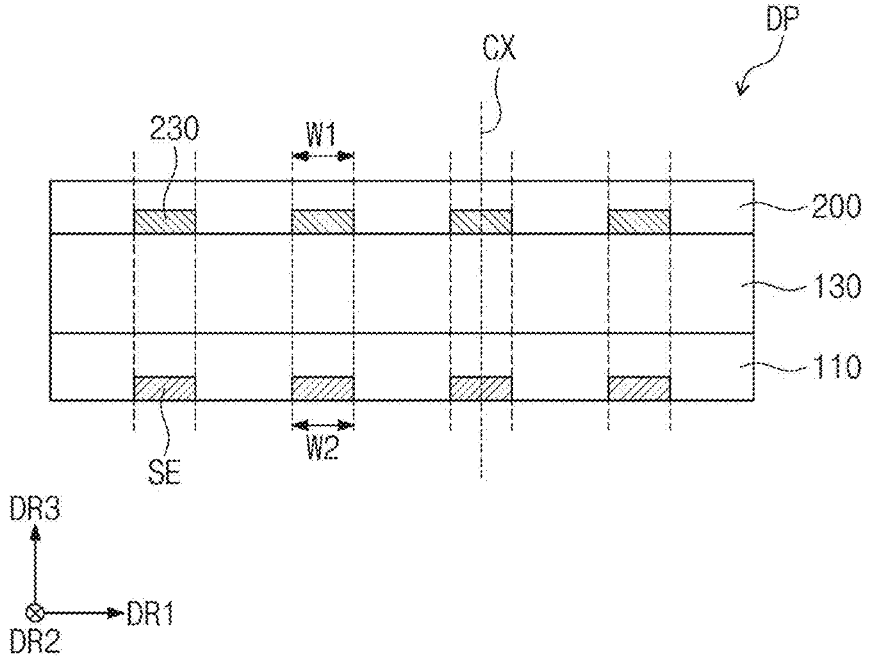
FIG. 11A is a sectional view of the display panel according to an embodiment of the present disclosure.

FIG. 11A is a sectional view of the display panel according to an embodiment of the present disclosure.

Referring to FIG. 11A, the display panel DP may include the light emitting element layer 130, the sensor layer 200, and the auxiliary layer 110.

In an embodiment of the present disclosure, the auxiliary layer 110 may be defined based on whether the plurality of first charging electrodes SE are disposed or not. For example, FIG. 11A illustrates an embodiment in which the plurality of first charging electrodes SE are disposed in the base layer 110, and the base layer 110 is the auxiliary layer 110. In other words, the base layer 110 may include the plurality of first charging electrodes SE.

The sensor layer 200 may be disposed on the light emitting element layer 130. The sensor layer 200 may include the plurality of third electrodes 230.

The auxiliary layer 110 may be disposed in a layer different from that of the sensor layer 200. The auxiliary layer 110 may be spaced apart from the sensor layer 200, with the light emitting element layer 130 therebetween.

The number of first charging electrodes SE may be equal to the number of third electrodes 230. The plurality of first charging electrodes SE may overlap with the plurality of third electrodes 230, respectively, when viewed from above the plane (e.g., in a plan view).

Each of the plurality of third electrodes 230 may be referred to as a main charging electrode, and each of the plurality of first charging electrodes SE may be referred to as a sub-charging electrode.

Each of the plurality of third electrodes 230 may have the first width W1 in the first direction DR1. Each of the plurality of first charging electrodes SE may have the second width W2 in the first direction DR1. The first width W1 may be equal to or substantially equal to the second width W2. In other words, side surfaces of the plurality of third electrodes 230 may be aligned with side surfaces of the plurality of first charging electrodes SE, respectively, in the third direction DR3 when viewed from the side.

In this case, the plurality of third electrodes 230 and the plurality of first charging electrodes SE may be defined as having a symmetrical structure.

The central axes CX of the plurality of first charging electrodes SE may be aligned with the central axes CX of the plurality of third electrodes 230, respectively, when viewed from the side.

Figure 11B:
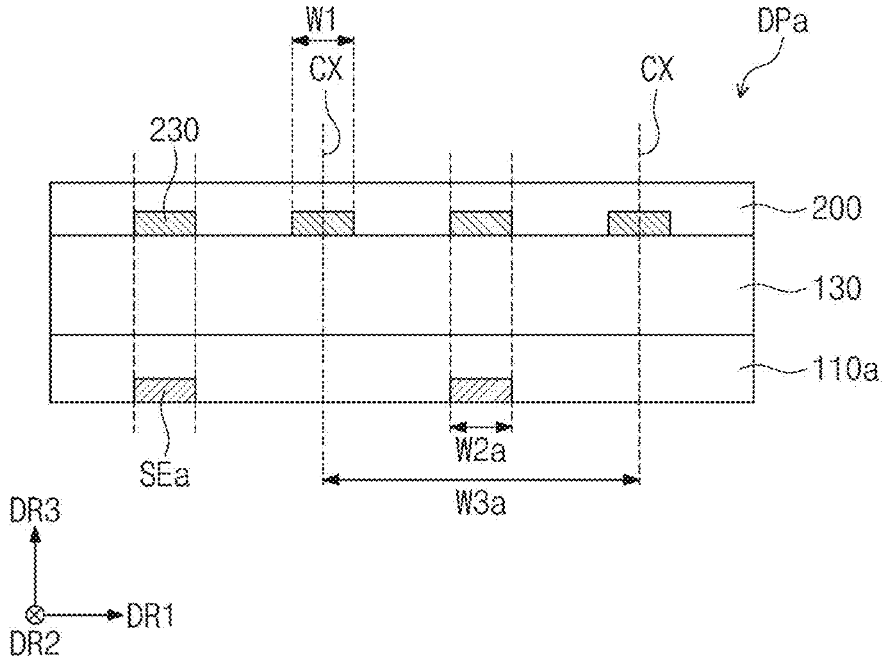
FIG. 11B is a sectional view of a display panel according to an embodiment of the present disclosure.

FIG. 11B is a sectional view of a display panel according to an embodiment of the present disclosure. Hereinafter with reference to FIG. 11B, the components that are the same or substantially the same as those described above with reference to FIG. 11A are denoted with the same reference symbols, and thus, redundant description thereof may not be repeated.

Referring to FIG. 11B, a base layer 110*a* may include a plurality of first charging electrodes SEa. The base layer 110*a* may be referred to as an auxiliary layer 110*a*.

The number of first charging electrodes SEa may be less than the number of third electrodes 230. The plurality of first charging electrodes SEa may overlap with some of the plurality of third electrodes 230 when viewed from above the plane (e.g., in a plan view).

Each of the plurality of third electrodes 230 may have the first width W1 in the first direction DR1. Each of the plurality of first charging electrodes SEa may have the second width W2*a* in the first direction DR1.

Although FIG. 11B illustrates an example in which the second width W2*a* is equal to or substantially equal to the first width W1, the present disclosure is not limited thereto. For example, the second width W2*a* may be greater than or equal to the first width W1.

The second width W2*a*, when viewed from the side, may be smaller than a gap W3*a* between the central axes CX of two adjacent third electrodes 230 among the plurality of third electrodes 230. As such, the plurality of first charging electrodes SE1*a* may be spaced apart from one another along the first direction DR1.

Figure 11C:
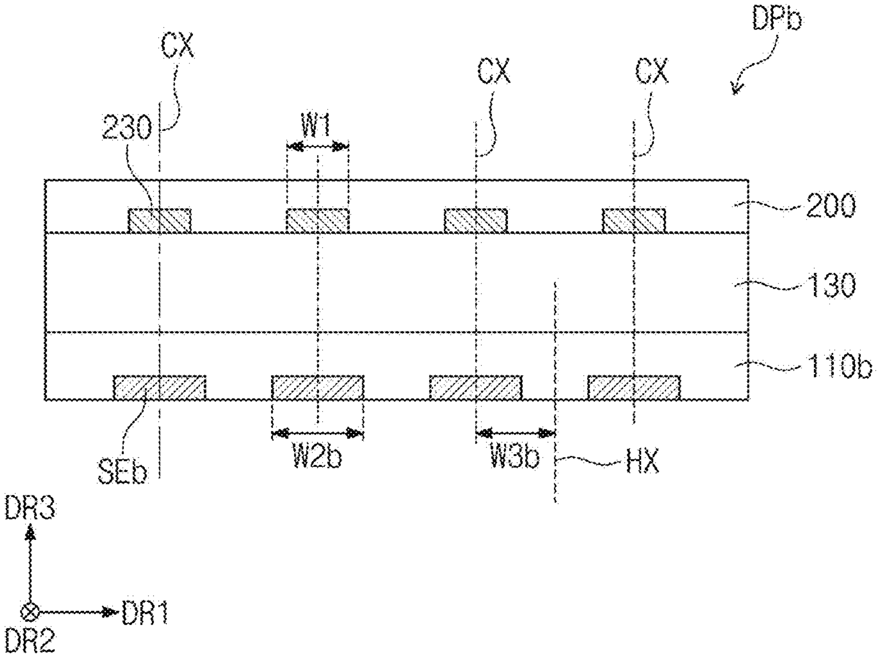
FIG. 11C is a sectional view of a display panel according to an embodiment of the present disclosure.

FIG. 11C is a sectional view of a display panel according to an embodiment of the present disclosure. Hereinafter with reference to FIG. 11C, the components that are the same or substantially the same as those described above with reference to FIG. 11A are denoted with the same reference symbols, and thus, redundant description thereof may not be repeated.

Referring to FIG. 11C, a base layer 110*b* may include a plurality of first charging electrodes SEb. The base layer 110*b* may be referred to as an auxiliary layer 110*b*.

Each of the plurality of third electrodes 230 may have the first width W1 in the first direction DR1. Each of the plurality of first charging electrodes SEb may have the second width W2*b* in the first direction DR1.

The second width W2*b* may be greater than the first width W1. When viewed from the side, half of the second width W2*b* may be smaller than the gap W3*b* between any axis HX between the central axis CX of one first charging electrode SEb and the central axis CX of another first charging electrode SEb adjacent thereto and the central axes CX. In other words, the second width W2*b* may be smaller than twice the gap W3*b*. As such, the plurality of first charging electrodes SEb may be spaced apart from one another along the first direction DR1.

When viewed from above the plane (e.g., in a plan view), the area of each of the plurality of first charging electrodes SEb may be greater than the area of each of the plurality of third electrodes 230. The resistances of the plurality of first charging electrodes SEb may be relatively lowered, and thus, a power efficiency and a sensing sensitivity may be improved.

Figure 12A:
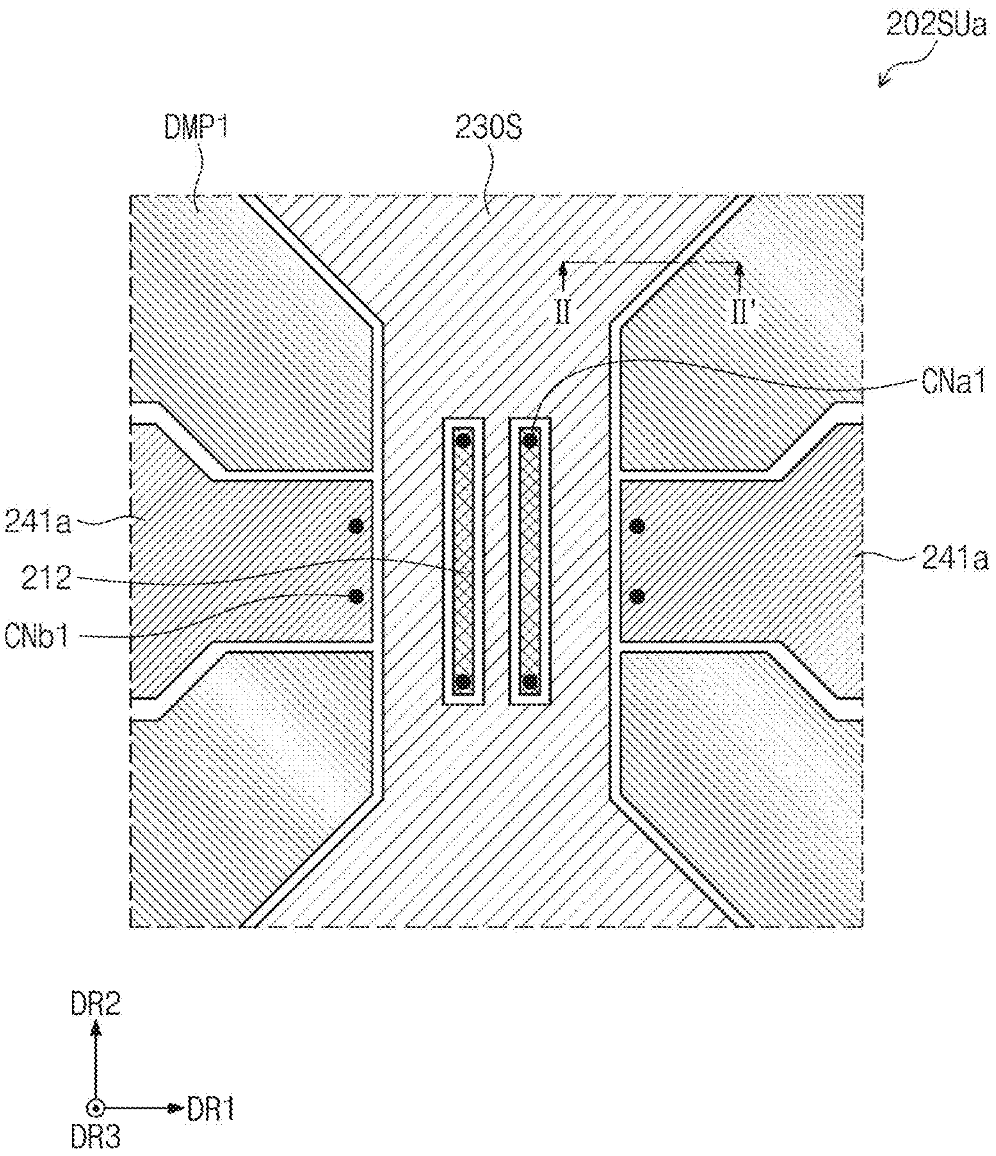
FIG. 12A is a plan view illustrating a first conductive layer of a sensing unit according to an embodiment of the present disclosure.
Figure 12B:
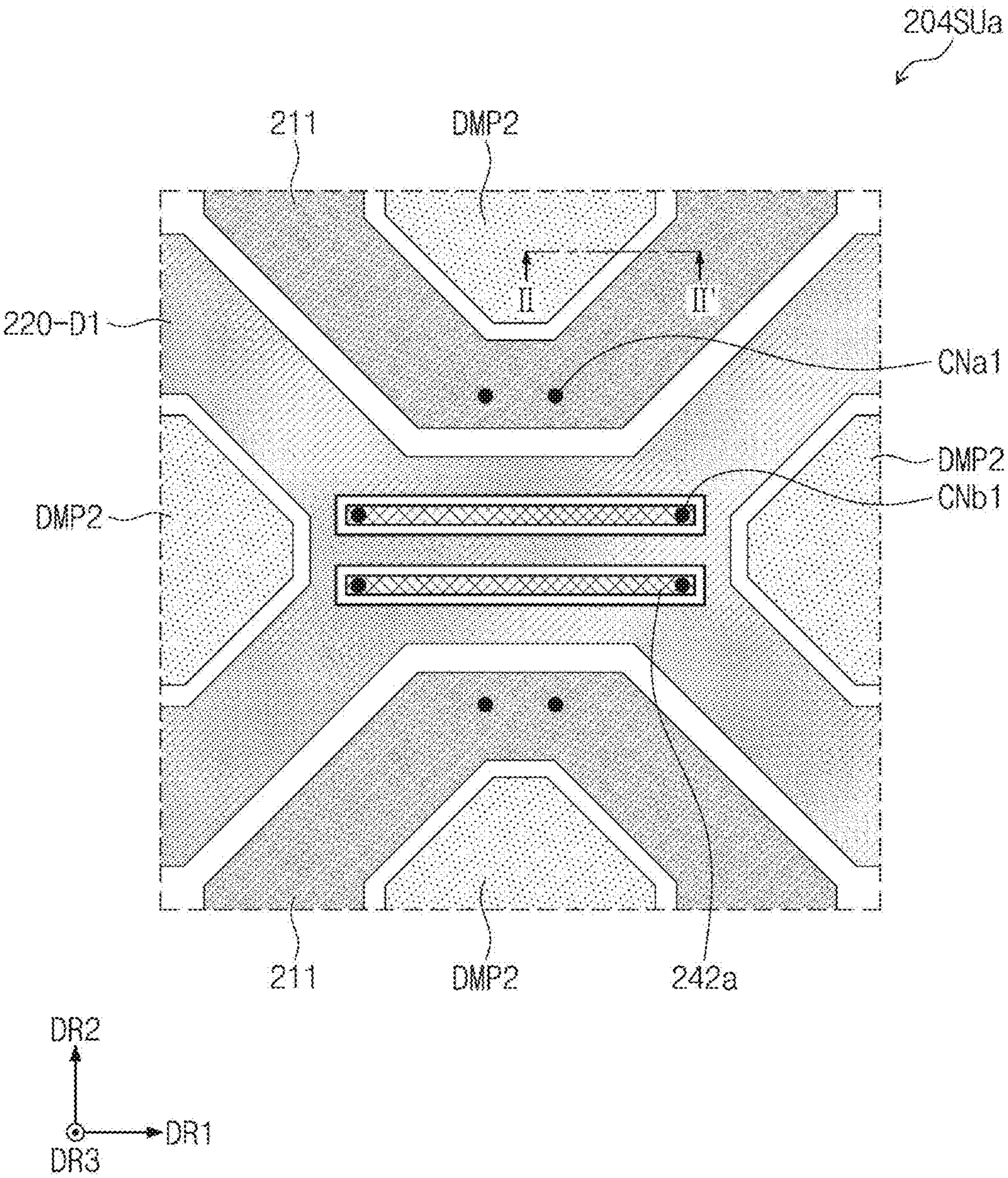
FIG. 12B is a plan view illustrating a second conductive layer of the sensing unit according to an embodiment of the present disclosure.
Figure 12C:
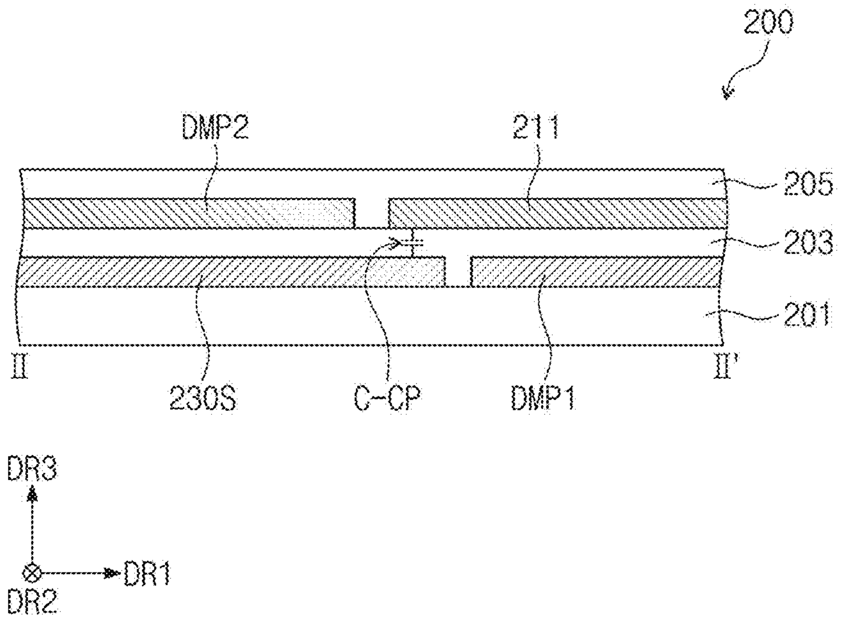
FIG. 12C is a sectional view of the sensor layer taken along the line II-II' illustrated in FIGS. 12A and 12B according to an embodiment of the present disclosure.

FIG. 12A is a plan view illustrating a first conductive layer of a sensing unit according to an embodiment of the present disclosure. FIG. 12B is a plan view illustrating a second conductive layer of the sensing unit according to an embodiment of the present disclosure. FIG. 12C is a sectional view of the sensor layer taken along the line II-II' illustrated in FIGS. 12A and 12B according to an embodiment of the present disclosure.

Referring to FIGS. 7, 12A, 12B, and 12C, each of first electrode groups 210G may include a plurality of first sensing patterns 211 and a plurality of first bridge patterns 212. The first sensing patterns 211 may be spaced apart from one another in the second direction DR2. The first bridge patterns 212 may extend in the second direction DR2, and may be electrically connected to the first sensing patterns 211 through first contacts CNa1. Although FIGS. 12A and 12B illustrate an example in which two first sensing patterns 211 adjacent to each other are electrically connected with each other by two first bridge patterns 212, the present disclosure is not particularly limited thereto. For example, two first sensing patterns 211 adjacent to each other may be electrically connected with each other by one first bridge pattern 212, or may be electrically connected with each other by three or more first bridge patterns 212.

In FIG. 12B, a first divided electrode 220-D1 is illustrated as an example. The first sensing patterns 211 adjacent to each other in the second direction DR2 may be spaced apart from each other with the first divided electrode 220-D1 therebetween. In an embodiment of the present disclosure, the first sensing patterns 211 and the first divided electrode 220-D1 may be included in the second conductive layer 204SUa, and the first bridge patterns 212 may be included in the first conductive layer 202SUa. The first bridge patterns 212 may be insulated from the first divided electrode 220-D1 that overlaps with the first bridge patterns 212, and may cross the first divided electrode 220-D1.

Each of first auxiliary electrodes 230S included in a third electrode group 230G may extend in the second direction DR2. The first auxiliary electrodes 230S may be included in the first conductive layer 202SUa. One or more holes may be defined in each of the first auxiliary electrodes 230S. One first bridge pattern 212 may be disposed in one hole. Accordingly, the first bridge pattern 212 may be electrically insulated from the first auxiliary electrodes 230S.

Each of second auxiliary electrodes 240S included in a fourth electrode group 240G may include a plurality of second sensing patterns 241*a* and a plurality of second bridge patterns 242*a*. The second sensing patterns 241*a* may be spaced apart from one another in the first direction DR1. The second bridge patterns 242*a* may extend in the first direction DR1, and may be electrically connected to the second sensing patterns 241*a* through second contacts CNb1.

Although FIGS. 12A and 12B illustrate an example in which two second sensing patterns 241*a* adjacent to each other are electrically connected with each other by two second bridge patterns 242*a*, the present disclosure is not particularly limited thereto. For example, two second sensing patterns 241*a* adjacent to each other may be electrically connected with each other by one second bridge pattern 242*a*, or may be electrically connected with each other by three or more second bridge patterns 242*a*.

In an embodiment of the present disclosure, the second sensing patterns 241*a* and the first auxiliary electrodes 230S may be included in the first conductive layer 202SUa, and the second bridge patterns 242*a* may be included in the second conductive layer 204SUa. The second bridge patterns 242*a* may be insulated from the first auxiliary electrodes 230S overlapping with the second bridge patterns 242*a*, and may cross the first auxiliary electrodes 230S.

Referring to FIGS. 12A and 12B, in the second conductive layer 204SUa in one sensing unit SU, the area occupied by the components included in the first electrode group 210G and the second electrode group 220G may be greater than the area occupied by the components included in the third electrode group 230G and the fourth electrode group 240G. A change in a capacitance by the first input 2000 (e.g., refer to FIG. 4) may be increased as the distance is decreased. Accordingly, a component for sensing the first input 2000 (e.g., refer to FIG. 4) may be disposed in a relatively larger area in a layer adjacent to the surface of the electronic device 1000 (e.g., refer to FIG. 1A). Thus, a touch performance may be improved.

In an embodiment of the present disclosure, the first conductive layer 202SUa may further include first dummy patterns DMP1, and the second conductive layer 204SUa may further include second dummy patterns DMP2. The first dummy patterns DMP1 and the second dummy patterns DMP2 may be floated or may be electrically floated. The first dummy patterns DMP1 and the second dummy patterns DMP2 may each be divided into a plurality of conductive patterns. For example, one first dummy pattern DMP1 may include a plurality of floating dummy patterns spaced apart (e.g., separated) or electrically isolated from one another.

Referring to FIG. 12C, the area of the first auxiliary electrode 230S and the area of the first sensing pattern 211 may be variously adjusted. For example, the position of a boundary between the first auxiliary electrode 230S and the first dummy patterns DMP1 and the position of a boundary between the first sensing pattern 211 and the second dummy patterns DMP2 may be variously adjusted. In this case, the area of an overlapping area between the first auxiliary electrode 230S and the first sensing pattern 211 may be variously adjusted, and the magnitude of the capacitance of a coupling capacitor C-CP between the first auxiliary electrode 230S and the first sensing pattern 211 may be adjusted accordingly.

Figure 13A:
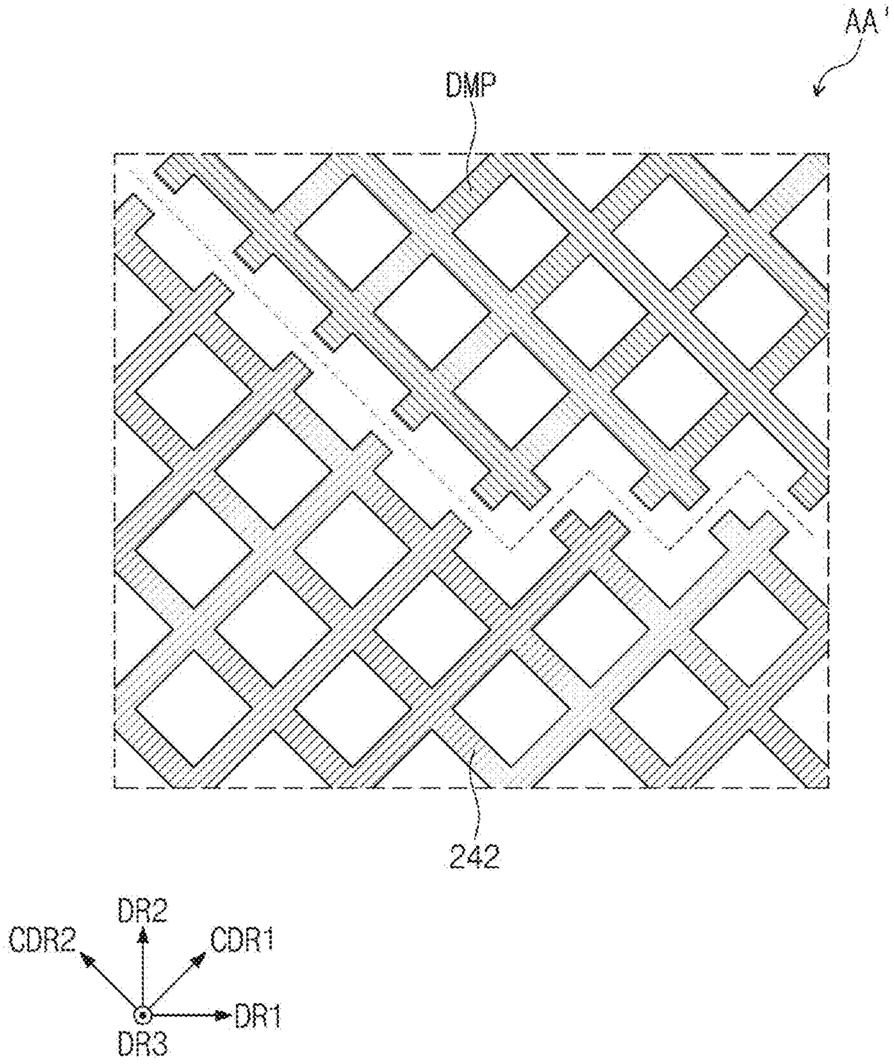
FIG. 13A is an enlarged plan view of the area AA' illustrated in FIG. 9A.
Figure 13B:
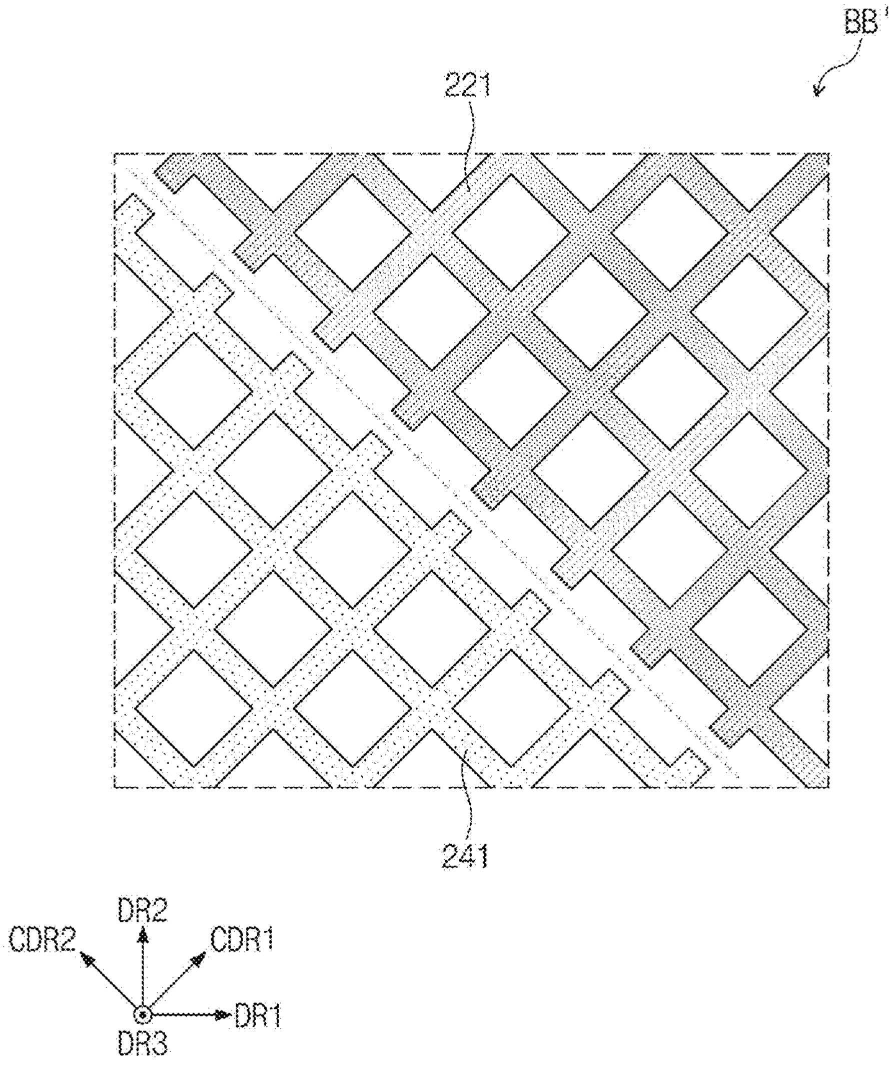
FIG. 13B is an enlarged plan view of the area BB' illustrated in FIG. 9B.

FIG. 13A is an enlarged plan view of the area AA' illustrated in FIG. 9A. FIG. 13B is an enlarged plan view of the area BB' illustrated in FIG. 9B.

Referring to FIGS. 9A, 9B, 13A, and 13B, the first electrode groups 210G, the second electrode groups 220G, the third electrode groups 230G, the fourth electrode groups 240G, and the dummy patterns DMP may each have a mesh structure. The mesh structure may include a plurality of mesh lines. Each of the plurality of mesh lines may have a suitable shape extending in a suitable direction (e.g., a certain or predetermined direction). The plurality of mesh lines may be connected with one another. The shape may include various suitable shapes, such as a straight line, a line having protrusions, and/or an uneven line. Openings where the mesh structure is not disposed may be defined (e.g., may be provided or formed) in each of the first electrode groups 210G, the second electrode groups 220G, the third electrode groups 230G, the fourth electrode groups 240G, and the dummy patterns DMP.

FIGS. 13A and 13B illustrate an example in which the mesh structure includes mesh lines extending in a first crossing direction CDR1 that crosses the first direction DR1 and the second direction DR2, and mesh lines extending in a second crossing direction CDR2 that crosses the first crossing direction CDR1. However, the extension directions of the mesh lines constituting the mesh structure are not particularly limited to those illustrated in FIGS. 13A and 13B. For example, the mesh structure may include mesh lines (e.g., only mesh lines) extending in the first direction DR1 and the second direction DR2, or may include mesh lines extending in the first direction DR1, the second direction DR2, the first crossing direction CDR1, and the second crossing direction CDR2. In other words, the mesh structure may be variously modified in various suitable forms as needed or desired.

Figure 14:
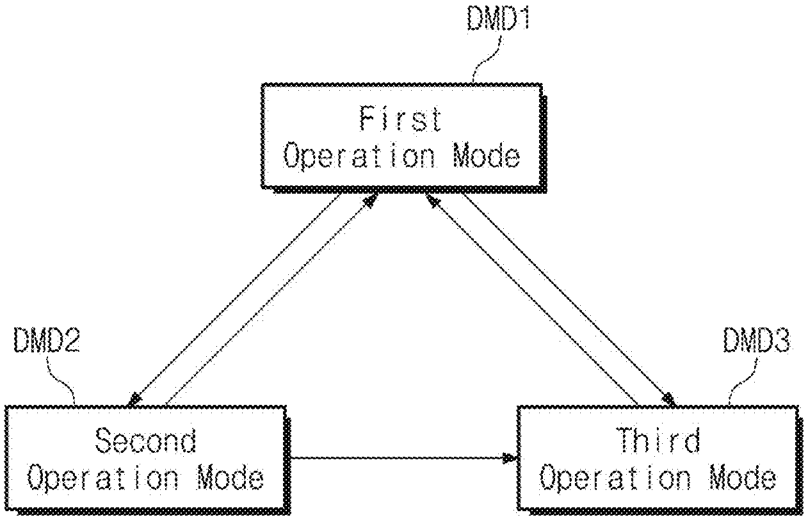
FIG. 14 is a view illustrating an operation of a sensor driver according to an embodiment of the present disclosure.

FIG. 14 is a view illustrating an operation of the sensor driver according to an embodiment of the present disclosure.

Referring to FIGS. 5 and 14, the sensor driver 200C may be selectively driven in one of a first operation mode DMD1, a second operation mode DMD2, and/or a third operation mode DMD3.

The first operation mode DMD1 may be referred to as a touch and pen standby mode, the second operation mode DMD2 may be referred to as a touch activation and pen standby mode, and the third operation mode DMD3 may be referred to as a pen activation mode. The first operation mode DMD1 may be a mode in which the sensor driver 200C waits for the first input 2000 and the second input 3000. The second operation mode DMD2 may be a mode in which the sensor driver 200C senses the first input 2000, and waits for the second input 3000. The third operation mode DMD3 may be a mode in which the sensor driver 200C senses the second input 3000.

In an embodiment of the present disclosure, the sensor driver 200C may first be driven in the first operation mode DMD1. When the first input 2000 is sensed in the first operation mode DMD1, the sensor driver 200C may be switched (e.g., may be changed) to the second operation mode DMD2. As another example, when the second input 3000 is sensed in the first operation mode DMD1, the sensor driver 200C may be switched (e.g., may be changed) to the third operation mode DMD3.

In an embodiment of the present disclosure, when the second input 3000 is sensed in the second operation mode DMD2, the sensor driver 200C may be switched to the third operation mode DMD3. When the first input 2000 is released (e.g., not sensed) in the second operation mode DMD2, the sensor driver 200C may be switched to the first operation mode DMD1. When the second input 3000 is released (e.g., not sensed) in the third operation mode DMD3, the sensor driver 200C may be switched to the first operation mode DMD1.

Figure 15:
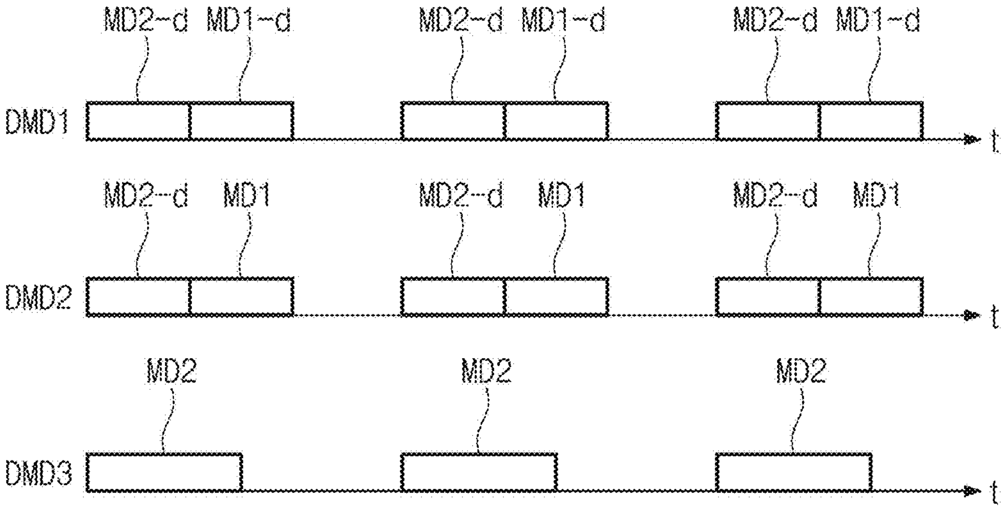
FIG. 15 is a view illustrating an operation of the sensor driver according to an embodiment of the present disclosure.

FIG. 15 is a view illustrating an operation of the sensor driver according to an embodiment of the present disclosure.

Referring to FIGS. 5, 7, 14, and 15, the operations in the first to third operation modes DMD1, DMD2, and DMD3 are illustrated in the order of time (t).

In the first operation mode DMD1, the sensor driver 200C may be repeatedly driven in a second mode MD2-*d* and a first mode MD1-*d*. During the second mode MD2-*d*, the sensor layer 200 may be scan-driven to detect the second input 3000. During the first mode MD1-*d*, the sensor layer 200 may be scan-driven to detect the first input 2000. Although FIG. 15 illustrates an example in which the sensor driver 200C operates in the first mode MD1-*d* continuously after the second mode MD2-*d*, the sequence is not limited thereto.

In the second operation mode DMD2, the sensor driver 200C may be repeatedly driven in a second mode MD2-*d* and a first mode MD1. During the second mode MD2-*d*, the sensor layer 200 may be scan-driven to detect the second input 3000. During the first mode MD1, the sensor layer 200 may be scan-driven to detect the coordinates by the first input 2000.

In the third operation mode DMD3, the sensor driver 200C may be driven in a second mode MD2. During the second mode MD2, the sensor layer 200 may be scan-driven to detect the coordinates by the second input 3000. In the third operation mode DMD3, the sensor driver 200C may not operate in the first mode MD1-D or MD1 until the second input 3000 is released (e.g., not sensed).

In the first mode MD1-*d* and the first mode MD1, the third electrodes 230 and the fourth electrodes 240 may all be grounded. Accordingly, touch noise may be prevented or substantially prevented from being introduced through the third electrodes 230 and the fourth electrodes 240.

In the second mode MD2-*d* and the second mode MD2, first ends of the third electrodes 230 and the fourth electrodes 240 may all be floated. In addition, in the second mode MD2-*d* and the second mode MD2, second ends of the third electrodes 230 and the fourth electrodes 240 may all be grounded or floated. Accordingly, a compensation for a sensing signal may be increased or maximized by the coupling between the first electrodes 210 and the third electrodes 230, and the coupling between the second electrodes 220 and the fourth electrodes 240.

Figure 16A:
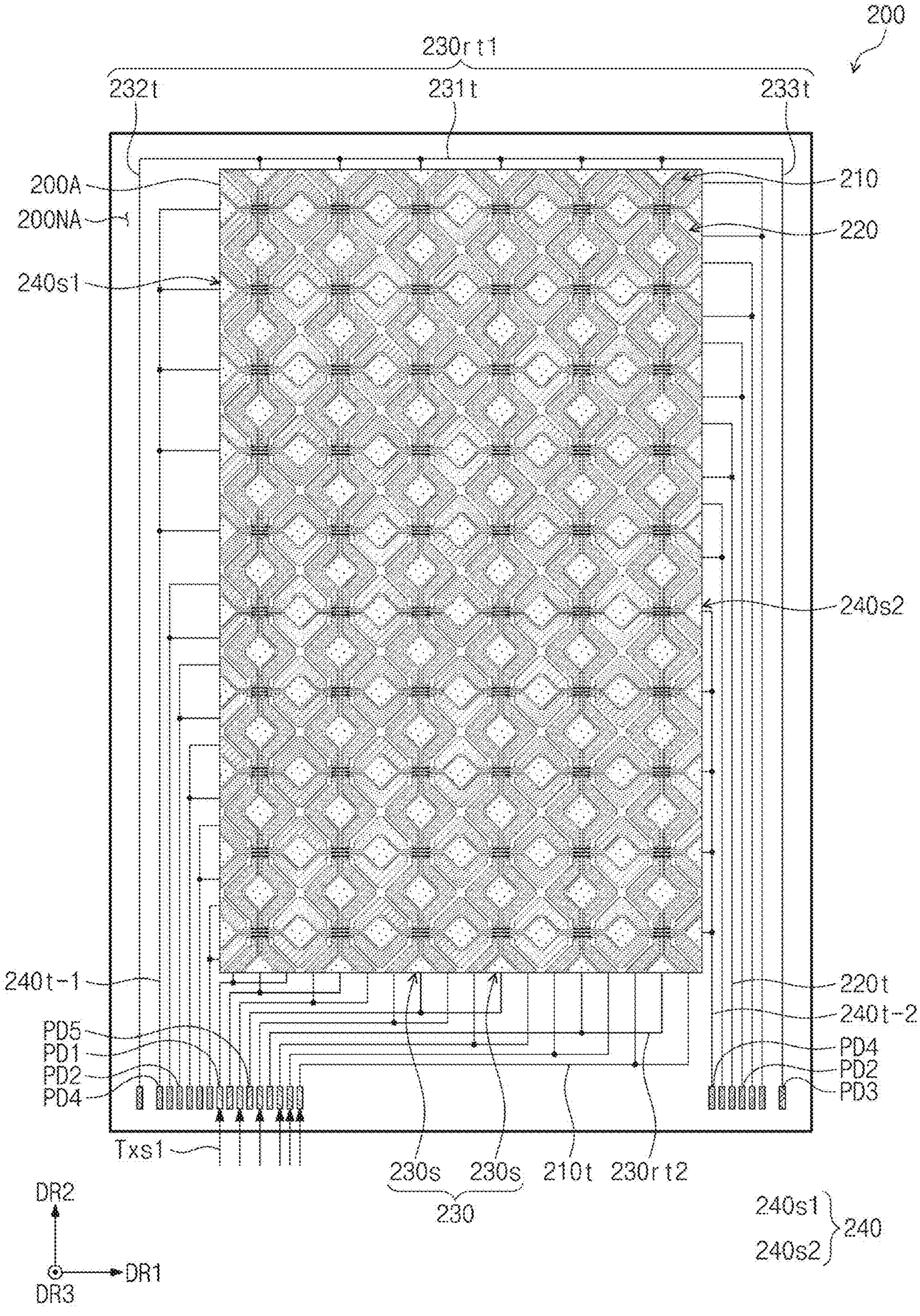
FIGS. 16A and 16B are views illustrating a first mode according to an embodiment of the present disclosure.
Figure 16B:
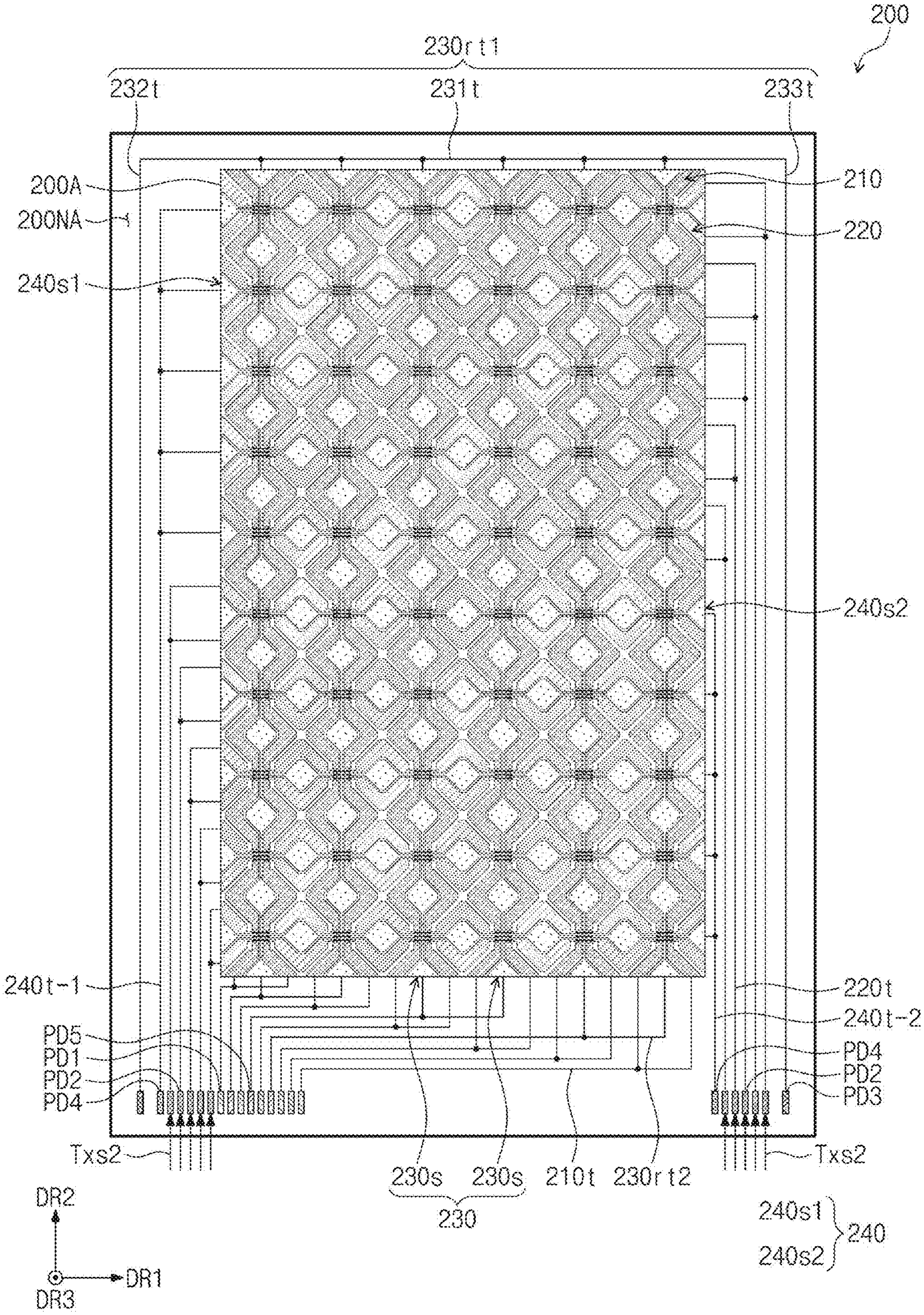

FIGS. 16A and 16B are views illustrating the first mode according to an embodiment of the present disclosure.

Referring to FIGS. 15, 16A, and 16B, the first mode MD1-*d* and the first mode MD1 may include a self-capacitance detection mode. The self-capacitance detection mode may include a first sub-section and a second sub-section.

FIG. 16A is a view illustrating an operation in the first sub-section, and FIG. 16B is a view illustrating an operation in the second sub-section.

In the self-capacitance detection mode, the sensor driver 200C may calculate input coordinates by outputting drive signals Txs1 and Txs2 to the first electrodes 210 and the second electrodes 220, and sensing a change in the capacitance of each of the first electrodes 210 and the second electrodes 220. Referring to FIG. 16A, in the first sub-section, the sensor driver 200C may output the drive signal Txs1 to the first trace lines 210*t*. Referring to FIG. 16B, in the second sub-section, the sensor driver 200C may output the drive signal Txs2 to the second trace lines 220*t*.

The third electrodes 230 are electrically connected with the third trace line 230*rt*1 and the fifth trace lines 230*rt*2, and the fourth electrodes 240 are electrically connected with the fourth trace lines 240*t*-1 and 240*t*-2. In the self-capacitance detection mode, the third electrodes 230 and the fourth electrodes 240 may all be grounded. Accordingly, noise may not be introduced through the third electrodes 230 and the fourth electrodes 240.

Figure 17:
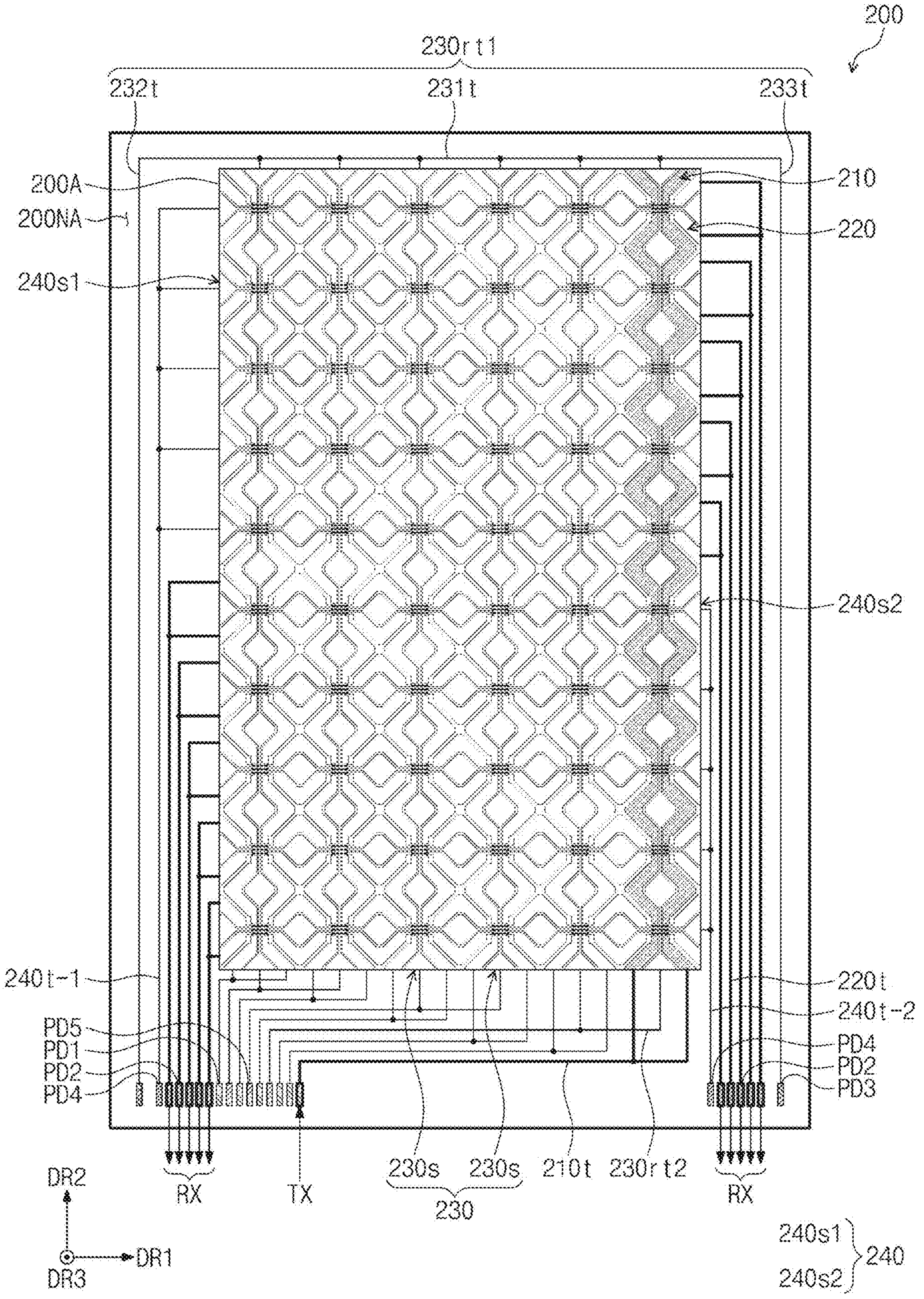
FIG. 17 is a view illustrating the first mode according to an embodiment of the present disclosure.

FIG. 17 is a view illustrating the first mode according to an embodiment of the present disclosure.

Referring to FIGS. 5, 15, and 17, the first mode MD1-*d* and the first mode MD1 may further include a mutual-capacitance detection mode. FIG. 17 is a view illustrating the mutual-capacitance detection mode in the first mode MD1-*d* and the first mode MD1.

In the mutual-capacitance detection mode, the sensor driver 200C may sequentially provide a transmission signal Tx to the first electrodes 210, and may detect the coordinates for the first input 2000 using a reception signal Rx detected through the second electrodes 220. For example, the sensor driver 200C may sense a change in the mutual capacitance between the first electrodes 210 and the second electrodes 220, and may calculate input coordinates.

FIG. 17 illustrates an example in which the transmission signal TX is provided to one first electrode 210 and the reception signal RX is output from the second electrodes 220. In FIG. 17, for convenience of illustration of the signal, hatching is drawn on only one first electrode 210 to which the transmission signal TX is provided. The sensor driver 200C may sense a change in the capacitance between the first electrode 210 and the second electrodes 220, and may detect the input coordinates for the first input 2000.

In the mutual-capacitance detection mode, the third electrodes 230 and the fourth electrodes 240 may all be grounded. Accordingly, noise may not be introduced through the third electrodes 230 and the fourth electrodes 240.

In each of the first mode MD1-*d* and the first mode MD1, the sensor layer 200 may alternately repeat the operations described above with reference to FIGS. 16A, 16B, and 17. However, the present disclosure is not limited thereto. For example, in each of the first mode MD1-*d* and the first mode MD1, the sensor layer 200 may repeat only the operation described above with reference to FIG. 14. As another example, in the first mode MD1-*d*, the sensor layer 200 may repeat only at least one of the operations described above with reference to FIGS. 16A, 136, and 17, and in the first mode MD1, the sensor layer 200 may alternately repeat the operations described above with reference to FIGS. 16A, 16B, and 17.

Figure 18A:
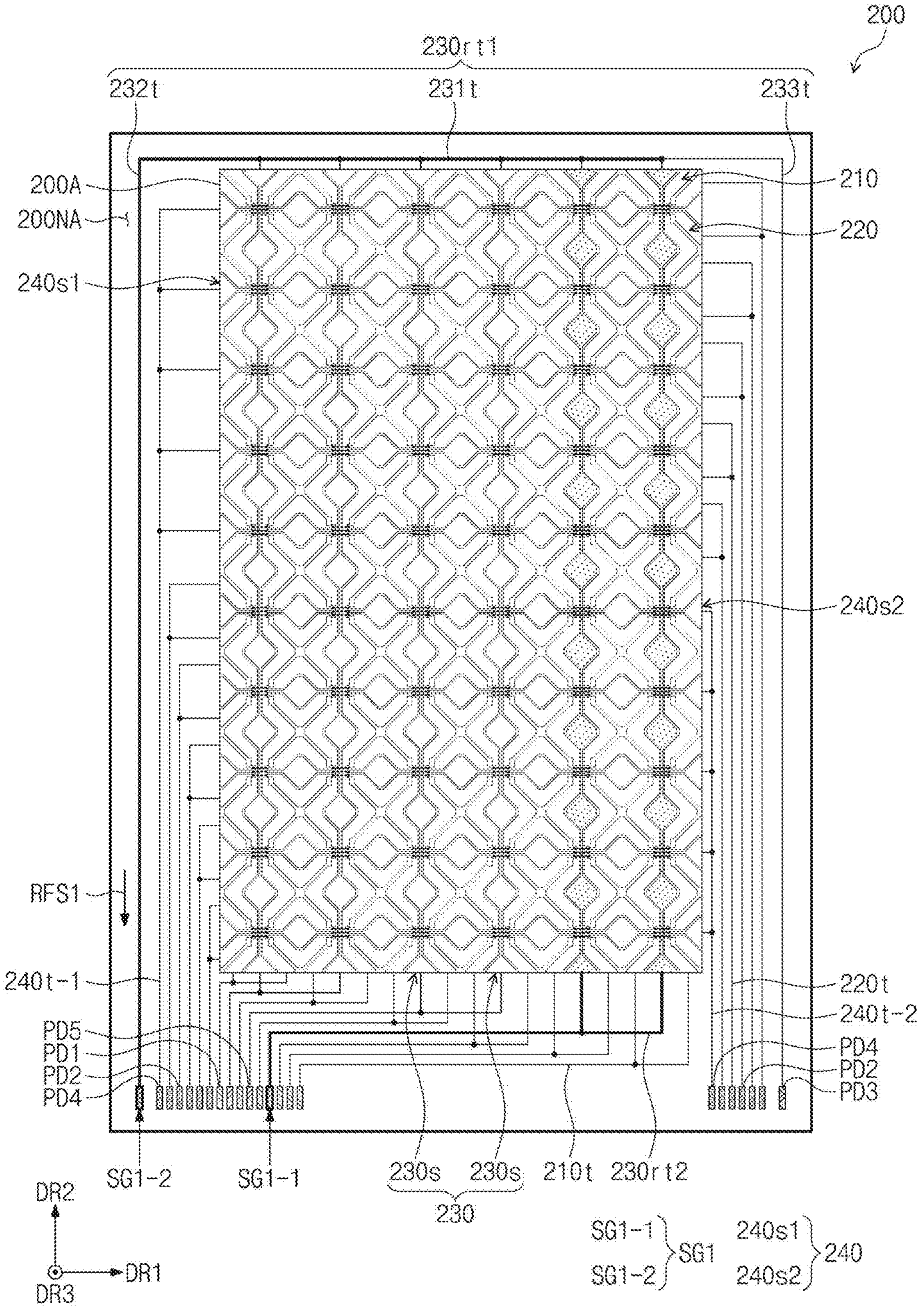
FIG. 18A is a plan view of the sensor layer illustrating a second mode according to an embodiment of the present disclosure.
Figure 18B:
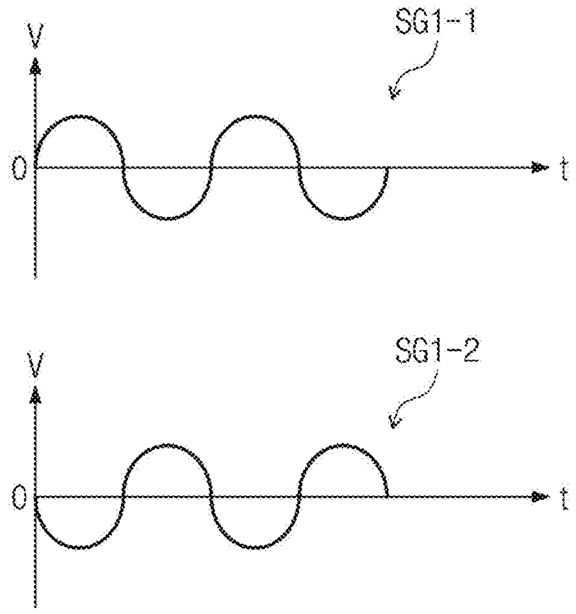
FIG. 18B illustrates graphs depicting waveforms of a first signal and a second signal according to an embodiment of the present disclosure.

FIG. 18A is a plan view of the sensor layer illustrating the second mode according to an embodiment of the present disclosure, and FIG. 18B illustrates graphs depicting waveforms of a first signal and a second signal according to an embodiment of the present disclosure.

Referring to FIGS. 5, 15, 18A, and 18B, the second mode MD2 may include a charging drive mode and a pen sensing drive mode.

In the charging drive mode, the sensor driver 200C may transmit the first signal SG1 to the sensor layer 200. The first signal SG1 may include a first-first sub-signal SG1-1 and a first-second sub-signal SG1-2.

The sensor driver 200C may apply the first-first sub-signal SG1-1 to at least one pad among the third pads PD3 and/or the fifth pads PD5, and may apply the first-second sub-signal SG1-2 to at least one other pad.

The first-second sub-signal SG1-2 may be an inverse signal of the first-first sub-signal SG1-1. For example, each of the first-first sub-signal SG1-1 and the first-second sub-signal SG1-2 may be a sinusoidal signal. However, the present disclosure is not limited thereto, and each of the first-first sub-signal SG1-1 and the first-second sub-signal SG1-2 according to an embodiment of the present disclosure may be a square-wave signal.

Although FIG. 18A illustrates an example in which the first-first sub-signal SG1-1 is applied to one pad and the first-second sub-signal SG1-2 is applied to another pad, the present disclosure is not limited thereto. For example, the first-first sub-signal SG1-1 may be applied to two or more pads, and the first-second sub-signal SG1-2 may be applied to two or more other pads.

Because the first-first sub-signal SG1-1 and the first-second sub-signal SG1-2 are applied to at least two pads, a first current RFS1 may have a current path that flows to at least one pad through at least one other pad. In addition, because the first-first sub-signal SG1-1 and the first-second sub-signal SG1-2 may be sinusoidal signals having an inverse phase relationship, the direction of the first current RFS1 may be periodically varied.

The first-first sub-signal SG1-1 and the first-second sub-signal SG1-2 may have an inverse phase relationship. Accordingly, noise caused in the display layer 100 by the first-first sub-signal SG1-1 may cancel out noise caused by the first-second sub-signal SG1-2. As such, a flicker phenomenon may not occur in the display layer 100, and a display quality of the display layer 100 may be improved.

The first current RFS1 may flow along a current path defined by the fifth pad PD5, the fifth trace line 230*t*2 connected to the fifth pad PD5, the third electrode 230, a portion of the third trace line 230*t*1 connected to the third pad PD3, and the third pad PD3. The current path may have a coil shape. Accordingly, in the charging drive mode of the second mode, the resonance circuit of the pen PN may be charged by the current path. In this case, the plurality of third electrodes 230 may be referred to as a plurality of channels.

According to some embodiments of the present disclosure, a current path having a loop coil pattern may be implemented by the components included in the sensor layer 200. Accordingly, the electronic device 1000 may charge the pen PN using the sensor layer 200. As such, a component having a coil for charging the pen PN may not need to be separately added, so that an increase in the thickness and weight of the electronic device 1000 and a decrease in the flexibility of the electronic device 1000 may not occur by such an addition.

In the charging drive mode, the first electrodes 210, the second electrodes 220, and the fourth electrodes 240 may be grounded or electrically floated, or may receive a constant or substantially constant voltage. In more detail, the first electrodes 210, the second electrodes 220, and the fourth electrodes 240 may be floated. In this case, the first current RFS1 may not flow to the first electrodes 210, the second electrodes 220, and the fourth electrodes 240.

The charging drive mode may include a searching charging drive mode and a tracking charging drive mode.

Because the position of the pen PN is not sensed in the searching charging drive mode, the first-first sub-signal SG1-1 or the first-second sub-signal SG1-2 may be sequentially provided to all channels included in the sensor layer 200. For example, the first-first sub-signal SG1-1 and the first-second sub-signal SG1-2 may be sequentially scanned in the first direction DR1. In other words, in the searching charging drive mode, the entire active area 200A of the sensor layer 200 may be scanned.

When the pen PN is sensed in the searching charging drive mode, the sensor layer 200 may be driven in the tracking charging drive mode. For example, in the tracking charging drive mode, the sensor driver 200C may sequentially output the first-first sub-signal SG1-1 and the first-second sub-signal SG1-2 to an area overlapping with a point where the pen PN is sensed, rather than the entire sensor layer 200.

Accordingly, after the position of the pen PN is sensed, channels that are driven for charging may be limited in correspondence to the position of the pen PN in a previous frame. Thus, channels overlapping with an area where the pen is not located may not be driven for charging, so that the efficiency of a charging operation may be improved.

Figure 19A:
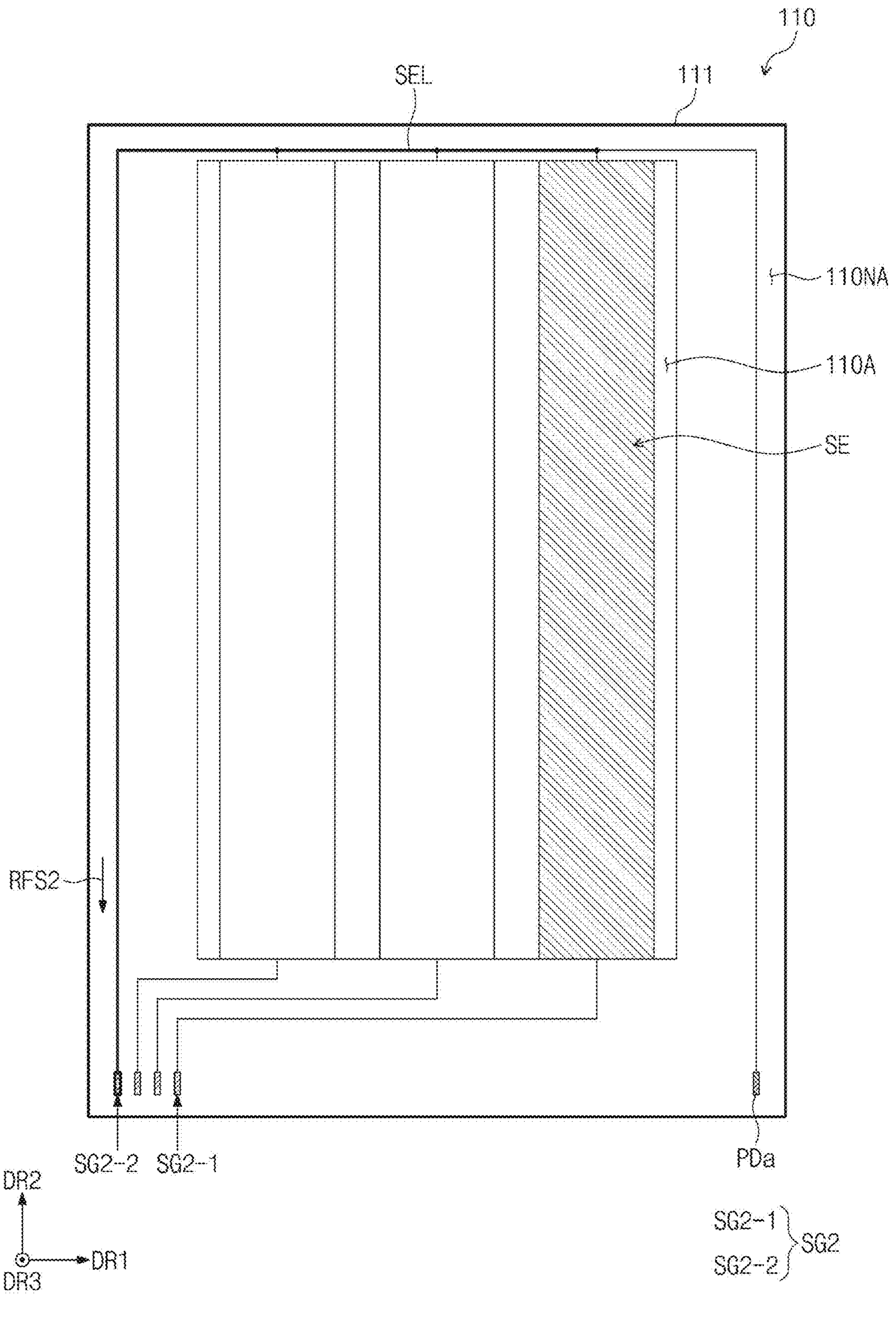
FIG. 19A is a plan view of an auxiliary layer in the second mode according to an embodiment of the present disclosure.

FIG. 19A is a plan view of the auxiliary layer in the second mode according to an embodiment of the present disclosure.

Referring to FIGS. 5, 15, 18A, and 19A, in the charging drive mode, the sensor driver 200C may transmit the second signal SG2 to the auxiliary layer 110. The second signal SG2 may include a second-first sub-signal SG2-1 and a second-second sub-signal SG2-2.

The sensor driver 200C may apply the second-first sub-signal SG2-1 to at least one charging pad among the plurality of charging pads PDa, and may apply the second-second sub-signal SG2-2 to at least one other charging pad.

Among the plurality of charging pads PDa, charging pads to which the second-first sub-signal SG2-1 and the second-second sub-signal SG2-2 are provided may be selected to correspond to the pads to which the first-first sub-signal SG1-1 and the first-second sub-signal SG1-2 are applied. For example, the second-first sub-signal SG2-1 may be provided to a first charging electrode SE overlapping with the third electrode 230 to which the first-first sub-signal SG1-1 is provided, and the second-second sub-signal SG2-2 may be provided to a first charging electrode SE overlapping with the third electrode 230 to which the first-second sub-signal SG1-2 is provided.

The second-second sub-signal SG2-2 may be an inverse signal of the second-first sub-signal SG2-1. For example, when the first-first sub-signal SG1-1 and the first-second sub-signal SG1-2 are sinusoidal signals, the second-first sub-signal SG2-1 and the second-second sub-signal SG2-2 may also be sinusoidal signals. However, the present disclosure is not limited thereto, and when the first-first sub-signal SG1-1 and the first-second sub-signal SG1-2 according to an embodiment of the present disclosure are square-wave signals, the second-first sub-signal SG2-1 and the second-second sub-signal SG2-2 may also be square-wave signals.

Although FIG. 19A illustrates an example in which the second-first sub-signal SG2-1 is applied to one pad and the second-second sub-signal SG2-2 is applied to another pad, the present disclosure is not limited thereto. For example, the second-first sub-signal SG2-1 may be applied to two or more pads, and the second-second sub-signal SG2-2 may be applied to two or more other pads.

Because the second-first sub-signal SG2-1 and the second-second sub-signal SG2-2 are applied to at least two pads, a second current RFS2 may have a current path that flows to at least one pad through at least one other pad. In addition, because the second-first sub-signal SG2-1 and the second-second sub-signal SG2-2 may be sinusoidal signals having an inverse phase relationship, the direction of the second current RFS2 may be periodically varied.

The second-first sub-signal SG2-1 and the second-second sub-signal SG2-2 may be provided to correspond to the first-first sub-signal SG1-1 and the first-second sub-signal SG1-2 provided to the plurality of third electrodes 230. The current path of the second current RFS2 may be the same as the current path of the first current RFS1.

The direction of the first current RFS1 flowing through one of the plurality of third electrodes 230 based on the first signal SG1 may be the same as the direction of the second current RFS2 flowing through one of the plurality of first charging electrodes SE overlapping with the one of the plurality of third electrodes 230 based on the second signal SG2.

The second-first sub-signal SG2-1 and the second-second sub-signal SG2-2 may have an inverse phase relationship. Accordingly, noise caused in the display layer 100 by the second-first sub-signal SG2-1 may cancel out noise caused by the second-second sub-signal SG2-2. Thus, a flicker phenomenon may not occur in the display layer 100, and a display quality of the display layer 100 may be improved.

The second current RFS2 may flow along a current path defined by one charging pad PDa, a charging line SEL, a first charging electrode SE, a charging line SEL, and one charging pad PDa. The current path may have a coil shape.

According to some embodiments of the present disclosure, in the charging drive mode of the second mode, a magnetic field may be strengthened due to the current path that flows by the first current RFS1 and the current path that flows by the second current RFS2, and may be provided to the resonance circuit of the pen PN. The resonance circuit of the pen PN may be charged by the magnetic field. The electronic device 1000 (e.g., refer to FIG. 1A) may be easily charged by the magnetic field strengthened by the first charging electrodes SE of the auxiliary layer 110. Accordingly, the electronic device 1000 (e.g., refer to FIG. 1A) having an improved pen sensing reliability may be provided.

Figure 19B:
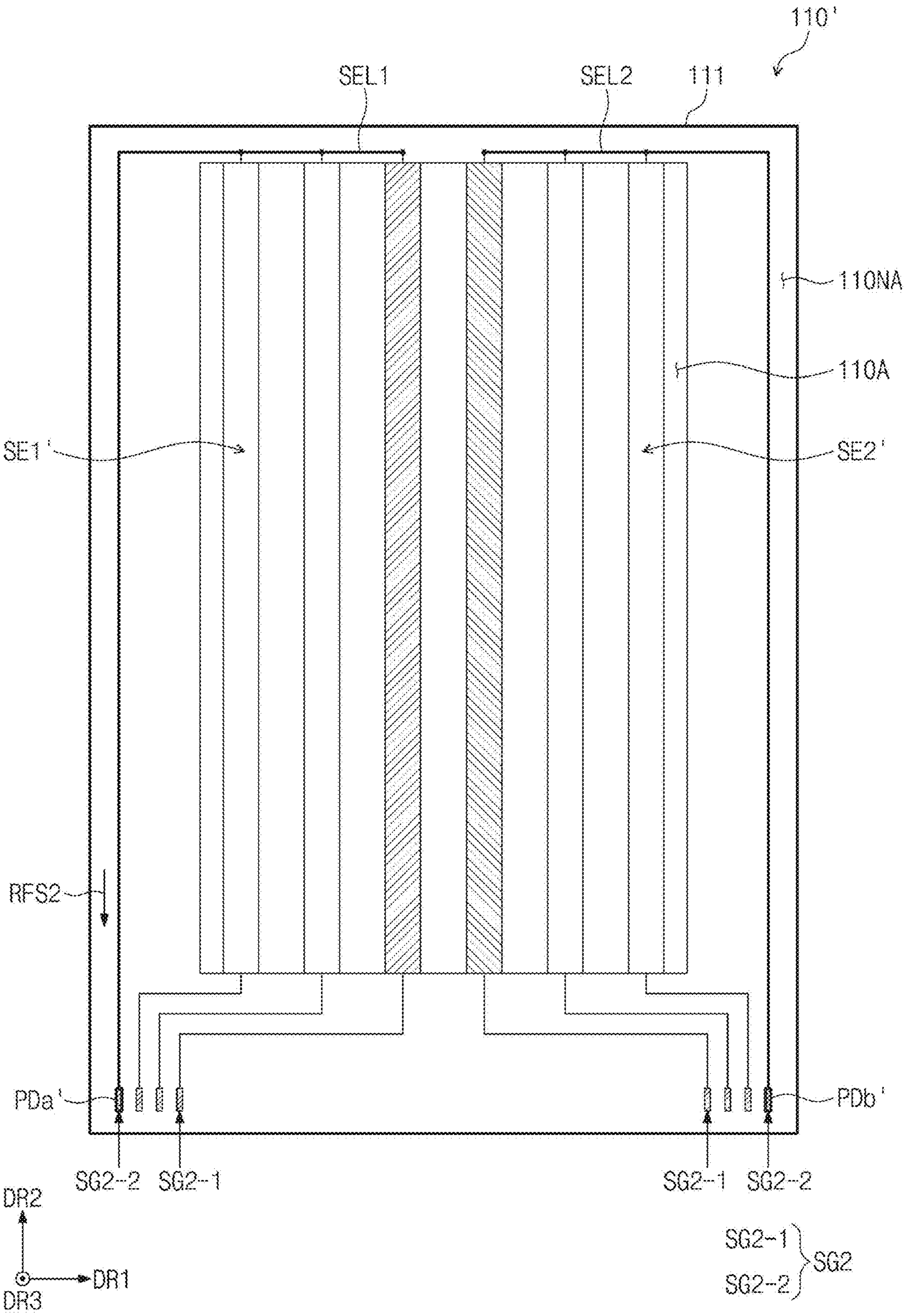
FIG. 19B is a plan view of an auxiliary layer in the second mode according to an embodiment of the present disclosure.

FIG. 19B is a plan view of an auxiliary layer in the second mode according to an embodiment of the present disclosure. Hereinafter with reference to FIG. 19B, the components that are the same or substantially the same as those described above with reference to FIG. 19A are denoted with the same reference symbols, and thus, redundant description thereof may not be repeated.

Referring to FIGS. 5, 15, 18A, and 19B, the auxiliary layer 110' may include a plurality of first charging electrodes SE1', a plurality of second charging electrodes SE2', a plurality of first charging lines SEL1, a plurality of second charging lines SEL2, a plurality of first charging pads PDa', a plurality of second charging pads PDb', and an insulating layer 111.

The plurality of second charging electrodes SE2' may be electrically insulated from the plurality of first charging electrodes SE1'.

When viewed from above the plane (e.g., in a plan view), the plurality of first charging electrodes SE1' may overlap with some of the plurality of third electrodes 230, respectively. When viewed from above the plane (e.g., in a plan view), the plurality of second charging electrodes SE2' may overlap with the other remaining third electrodes 230, respectively.

Accordingly, the sensor layer 200 disposed over the auxiliary layer 110' may have a configuration in which each of the plurality of third electrodes 230 includes one first auxiliary electrode 230*s* (e.g., refer to FIG. 7).

The plurality of first charging electrodes SE1' may be electrically connected with the plurality of first charging lines SEL1, and the plurality of first charging lines SEL1 may be connected with the plurality of first charging pads PDa', respectively.

The second-first sub-signal SG2-1 may be applied to one of the plurality of first charging pads PDa', and the second-second sub-signal SG2-2 may be applied to another one of the plurality of first charging pads PDa'. A first current path may be formed by the second-first sub-signal SG2-1 and the second-second sub-signal SG2-2 in the area where the plurality of first charging electrodes SE1' are disposed.

The plurality of second charging electrodes SE2' may be electrically connected with the plurality of second charging lines SEL2, and the plurality of second charging lines SEL2 may be connected with the plurality of second charging pads PDb', respectively.

The second-first sub-signal SG2-1 may be applied to one of the plurality of second charging pads PDb', and the second-second sub-signal SG2-2 may be applied to another one of the plurality of second charging pads PDb'. A second current path may be formed by the second-first sub-signal SG2-1 and the second-second sub-signal SG2-2 in the area where the plurality of second charging electrodes SE2' are disposed.

The first signal SG1 (e.g., refer to FIG. 18A) may be provided to each of the plurality of third electrodes 230 in correspondence to the plurality of first charging electrodes SE1' and the plurality of second charging electrodes SE2'.

Each of the first and second current paths may have a coil shape. Accordingly, in the charging drive mode of the second mode, the resonance circuit of the pen PN may be charged by the current paths. The auxiliary layer 110' may perform a charging operation in the area where the plurality of first charging electrodes SE1' are disposed, and the remaining area where the plurality of second charging electrodes SE2' are disposed. In other words, the auxiliary layer 110' is capable of multi-charging for the pen PN.

Figure 20:
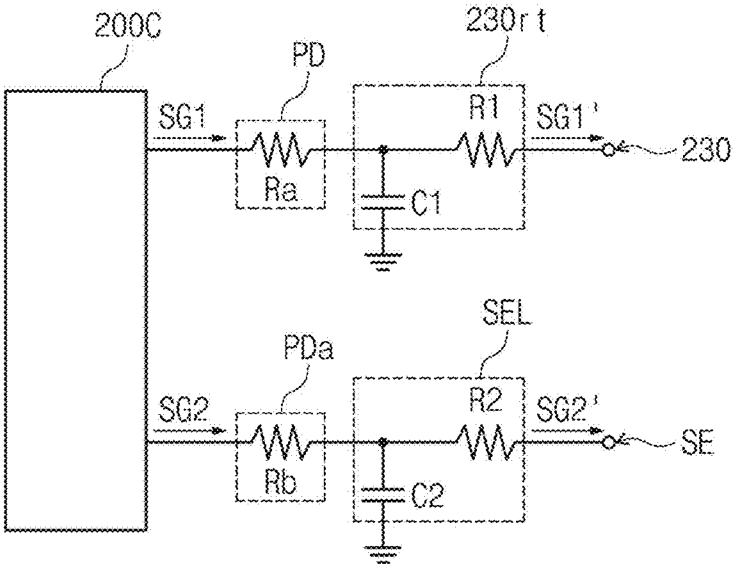
FIG. 20 is a schematic circuit diagram illustrating a connection relationship between the sensor driver and the display panel according to an embodiment of the present disclosure.
Figure 21:
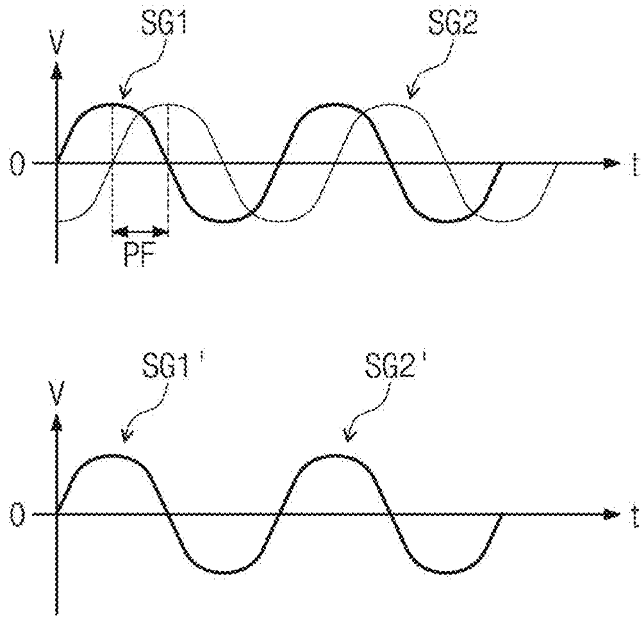
FIG. 21 illustrates waveform diagrams of the first signal and the second signal according to an embodiment of the present disclosure.

FIG. 20 is a schematic circuit diagram illustrating a connection relationship between the sensor driver and the display panel according to an embodiment of the present disclosure, and FIG. 21 illustrates waveform diagrams of the first signal and the second signal according to an embodiment of the present disclosure.

Referring to FIGS. 20 and 21, the sensor driver 200C may output the first signal SG1 having a first phase to the plurality of third electrodes 230 according to Equation 1 according to an embodiments of the present disclosure.

$$A\ \sin(\omega_0 t + \theta') \qquad \text{Equation 1}$$

In Equation 1 A is a constant and θ' represents the amount of phase delay.

The first signal SG1 may be provided to the sensor layer 200 (e.g., refer to FIG. 7) through a pad PD. The pad PD may include the third pad PD3 and the fifth pad PD5. The pad PD may have a resistor Ra. The pad PD may be electrically connected with the charging trace line 230*rt*. The charging trace line 230*rt* may have a resistor R1 and a capacitor C1.

A phase delay of the first signal SG1 may occur due to the resistors Ra and R1 and the capacitor C1 between the sensor driver 200C and the plurality of third electrodes 230. As such, a phase difference may occur between a first signal SG1' measured at the plurality of third electrodes 230 and the first signal SG1 output from the sensor driver 200C.

The sensor driver 200C may output the second signal SG2 having a second phase to the plurality of first charging electrodes SE according to Equation 2 according to an embodiments of the present disclosure. The second phase of the second signal SG2 may have a phase difference PF from the first phase.

$$A\ \sin(\omega_0 t + \theta'') \qquad \text{Equation 2}$$

In Equation 2 A is a constant and θ" represents the amount of phase delay. According to an embodiments of the present disclosure, θ" may be different from θ'.

The second signal SG2 may be provided to the auxiliary layer 110 (e.g., refer to FIG. 10) through the charging pad PDa. The charging pad PDa may have a resistor Rb. The charging pad PDa may be electrically connected with the charging line SEL. The charging line SEL may have a resistor R2 and a capacitor C2.

A phase delay of the second signal SG2 may occur due to the resistors Rb and R2 and the capacitor C2 between the sensor driver 200C and the plurality of first charging electrodes SE. As such, a phase difference may occur between a second signal SG2' measured at the plurality of first charging electrodes SE and the second signal SG2 output from the sensor driver 200C.

The phase of the first signal SG1' measured at the plurality of third electrodes 230 and the phase of the second signal SG2' measured at the plurality of first charging electrodes SE may be the same as each other according to Equation 3.

$$A\ \sin(\omega_0 t + \theta) \qquad \text{Equation 3}$$

Equation 3 above may represent the first signal SG1' measured at the plurality of third electrodes 230 and the second signal SG2' measured at the plurality of first charging electrodes SE. In Equation 3, 0 represents the amount of phase delay. In other words, the amount of phase delay of the first signal SG1' may be equal to or substantially equal to the amount of phase delay of the second signal SG2'. However, the present disclosure is not limited thereto, and the amount of phase delay of the first signal SG1' and the amount of phase delay of the second signal SG2' are not limited thereto. For example, the phase difference between the first signal SG1' and the second signal SG2' may range from 0 degrees to 90 degrees. This will be described in more detail below.

According to some embodiments of the present disclosure, to equalize the amount of phase delay of the charging signal SG1' in the plurality of third electrodes 230 and the amount of phase delay of the charging signal SG2' in the plurality of first charging electrodes SE, the sensor driver 200C may output the first signal SG1 and the second signal SG2 differing from each other in terms of the amount of phase delay. A magnetic field may be formed through a constructive interference of the charging signals SG1' and SG2'. The resonance circuit of the pen PN may be charged by the magnetic field. Accordingly, the electronic device 1000 (e.g., refer to FIG. 1A) having an improved charging efficiency of the pen PN (e.g., refer to FIG. 5) may be provided.

Figure 22A:
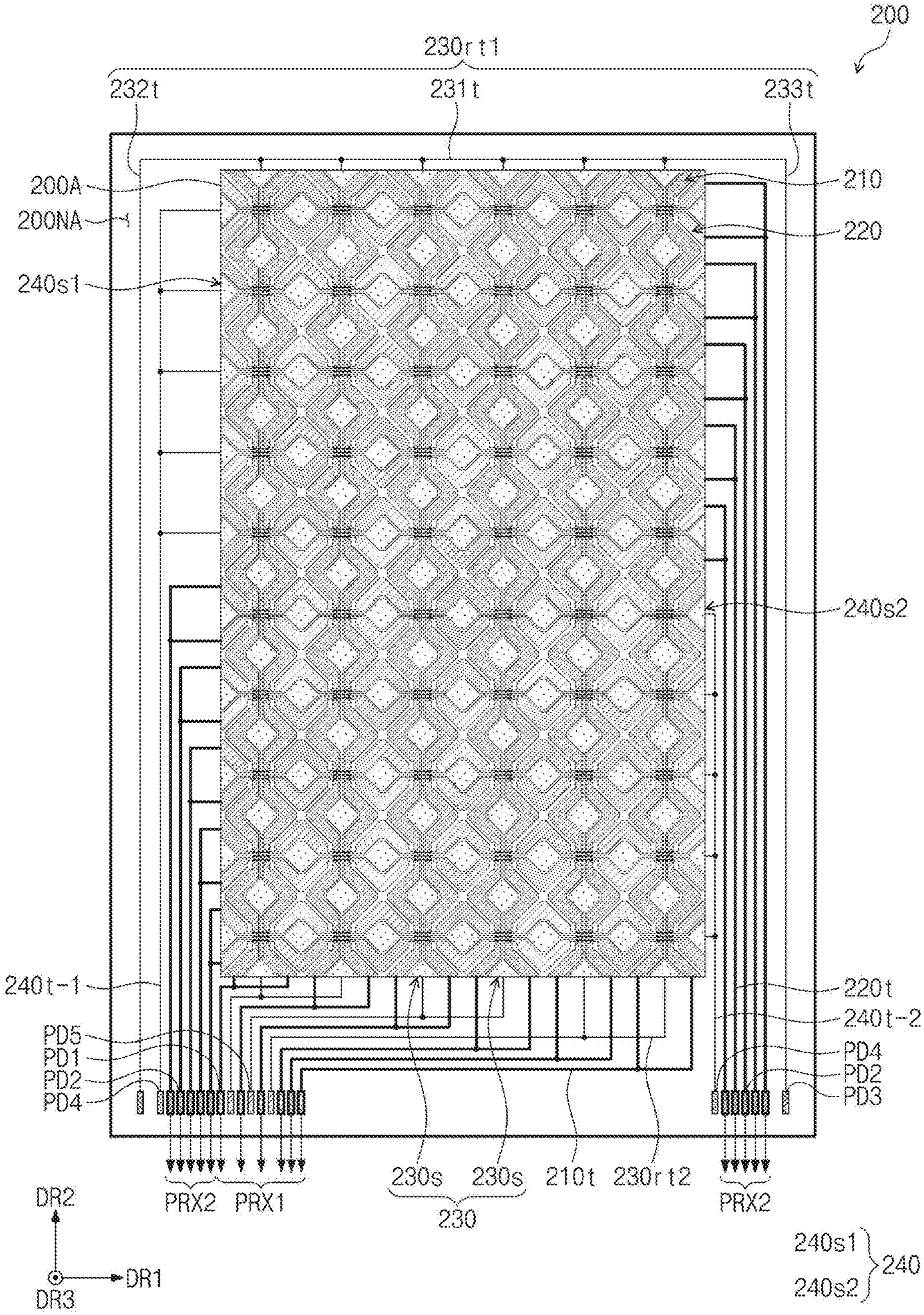
FIG. 22A is a view illustrating the second mode according to an embodiment of the present disclosure.
Figure 22B:
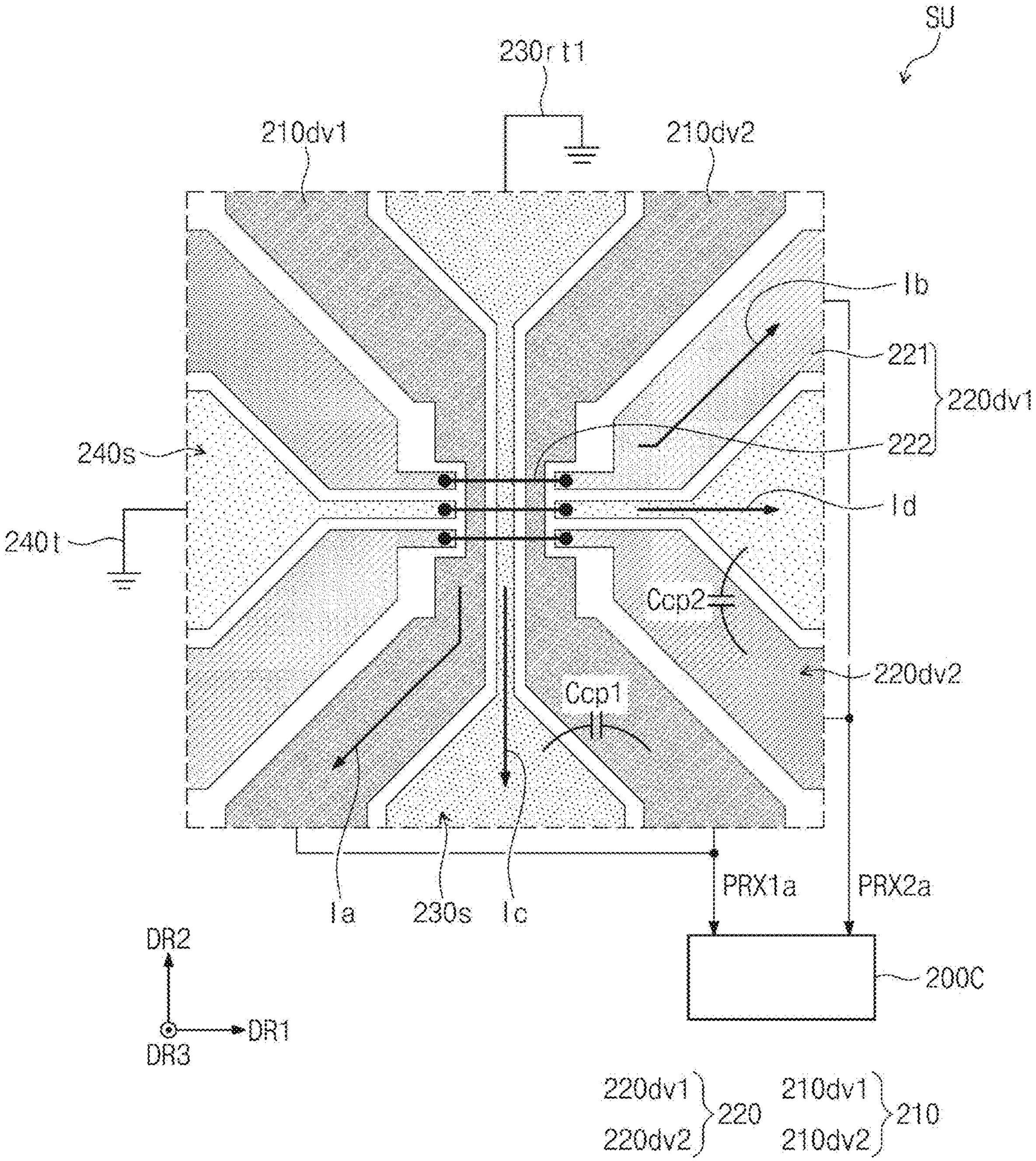
FIG. 22B is a view illustrating the second mode based on a sensing unit according to an embodiment of the present disclosure.

FIG. 22A is a view illustrating the second mode according to an embodiment of the present disclosure, and FIG. 22B is a view illustrating the second mode based on a sensing unit according to an embodiment of the present disclosure.

Referring to FIGS. 5, 22A, and 22B, in the second mode, the charging drive mode and the pen sensing drive mode may be alternately repeated. In FIG. 22B, one sensing unit SU through which first to fourth induced currents Ia, Ib, Ic, and Id are generated by a flow of the pen PN is illustrated.

The RLC resonance circuit of the pen PN may emit a magnetic field having a suitable resonant frequency while discharging charged charges. Due to the magnetic field provided by the pen PN, the first induced current Ia may be generated in the first electrode 210, and the second induced current Ib may be generated in the second electrode 230. In addition, the third induced current Ic may be generated in the first auxiliary electrode 230*s* of the third electrode 230, and the fourth induced current Id may be generated in the second auxiliary electrode 240*s* of the fourth electrode 240.

A first coupling capacitor Ccp1 may be formed between the first auxiliary electrode 230*s* and the first electrode 210, and a second coupling capacitor Ccp2 may be formed between the second auxiliary electrode 240*s* and the second electrode 220. The third induced current Ic may be transferred to the first electrode 210 through the first coupling capacitor Ccp1, and the fourth induced current Id may be transferred to the second electrode 220 through the second coupling capacitor Ccp2. In this case, the plurality of first electrodes 210 and the plurality of second electrodes 220 may each be referred to as a channel.

The sensor driver 200*c* may receive a first detection signal PRX1*a* based on the first induced current Ia and the third induced current Ic from the first electrode 210, and may receive a second detection signal PRX2*a* based on the second induced current Ib and the fourth induced current Id from the second electrode 220. In other words, the sensor driver 200C may receive the first detection signal PRX1*a* from the plurality of first electrodes 210, and may receive the second detection signal PRX2*a* from the plurality of second electrodes 220. The sensor driver 200C may detect the coordinates of the pen PN, based on the first detection signal PRX1*a* and/or the second detection signal PRX2*a*.

The sensor driver 200C may receive the first detection signal PRX1*a* from the first electrodes 210, and may receive the second detection signal PRX2*a* from the second electrodes 220. In this case, first ends of the third electrodes 230 and the fourth electrodes 240 may all be floated. Accordingly, compensation for a sensing signal may be increased or maximized by the coupling between the first electrodes 210 and the third electrodes 230 and the coupling between the second electrodes 220 and the fourth electrodes 240. In addition, second ends of the third electrodes 230 and the fourth electrodes 240 may be grounded or floated. Accordingly, the third induced current Ic and the fourth induced current Id may be sufficiently transferred to the first electrodes 210 and the second electrodes 220 by the coupling between the first electrodes 210 and the third electrodes 230 and the coupling between the second electrodes 220 and the fourth electrodes 240.

In an embodiment of the present disclosure, the routing directions of an electrode and an auxiliary electrode of the sensor layer 200 that overlap with each other may be different from each other. For example, the routing direction of the first electrode 210 and the routing direction of the first auxiliary electrode 230*s* may be different from each other. In addition, the routing direction of the second electrode 220 and the routing direction of the second auxiliary electrode 240*s* may be different from each other. For example, in FIG. 22B, the first electrode 210 and the first trace line 210*t* may be connected on the lower side of the sensing unit SU, and the first auxiliary electrode 230*s* and the third trace line 230*rt*1 may be connected on the upper side of the sensing unit SU. The second electrode 220 and the second trace line 220*t* may be connected on the left side of the sensing unit SU, and the second auxiliary electrode 240*s* and the fourth trace line 240*t* may be connected on the right side of the sensing unit SU.

Figure 23:
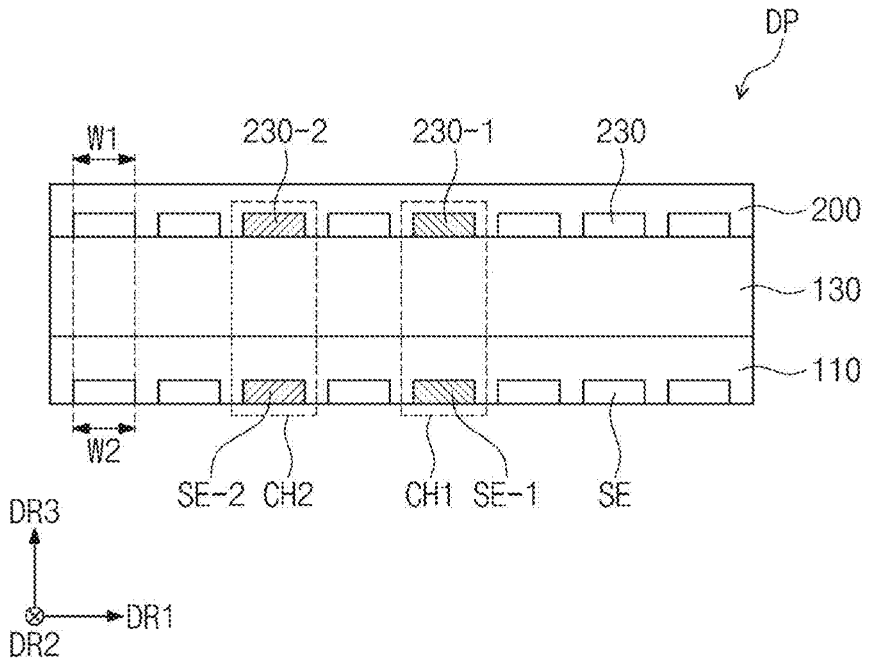
FIG. 23 is a sectional view illustrating the display panel according to an embodiment of the present disclosure.

FIG. 23 is a sectional view illustrating the display panel according to an embodiment of the present disclosure. Hereinafter with reference to FIG. 23, the components that are the same or substantially the same as those described above with reference to FIG. 11A are denoted with the same reference symbols, and thus, redundant description thereof may not be repeated.

Referring to FIGS. 5, 18A, 19A, 20, and 23, among the plurality of third electrodes 230 and the plurality of first charging electrodes SE, a third electrode and a first charging electrode overlapping with each other when viewed from above the plane (e.g., in a plan view) may be defined as one channel.

The sensor driver 200C may transmit the first-first sub-signal SG1-1 to one third electrode 230-1 among the plurality of third electrodes 230, and may transmit the first-second sub-signal SG1-2 to another third electrode 230-2 among the plurality of third electrodes 230.

The first current RFS1 may flow in the second direction DR2 through the one third electrode 230-1 among the plurality of third electrodes 230 by the first-first sub-signal SG1-1.

The first current RFS1 may flow in the direction opposite to the second direction DR2 through the other third electrode 230-2 among the plurality of third electrodes 230 by the first-second sub-signal SG1-2.

The one third electrode 230-1 and the other third electrode 230-2 among the plurality of third electrodes 230 may be spaced apart from each other with at least one of the remaining third electrodes among the plurality of third electrodes 230 therebetween. This method may be referred to as a selective charging method.

The sensor driver 200C may transmit the second-first sub-signal SG2-1 to one first charging electrode SE-1 among the plurality of first charging electrodes SE, and may transmit the second-second sub-signal SG2-2 to another first charging electrode SE-2 among the plurality of first charging electrodes SE.

When viewed from above the plane (e.g., in a plan view), the one first charging electrode SE-1 among the plurality of first charging electrodes SE may overlap with the one third electrode 230-1 among the plurality of third electrodes 230, and the other first charging electrode SE-2 among the plurality of first charging electrodes SE may overlap with the other third electrode 230-2 among the plurality of third electrodes 230.

The second current RFS2 may flow in the second direction DR2 through the one first charging electrode SE-1 among the plurality of first charging electrodes SE by the second-first sub-signal SG2-1.

The second current RFS2 may flow in the direction opposite to the second direction DR2 through the other first charging electrode SE-2 among the plurality of first charging electrodes SE by the second-second sub-signal SG2-2.

The one third electrode 230-1 among the plurality of third electrodes 230 and the one first charging electrode SE-1 among the plurality of first charging electrodes SE may define a first channel CH1. The first current RFS1 and the second current RFS2 may flow in the same direction as each other in the first channel CH1.

The other third electrode 230-2 among the plurality of third electrodes 230 and the other first charging electrode SE-2 among the plurality of first charging electrodes SE may define a second channel CH2. The first current RFS1 and the second current RFS2 may flow in the same direction as each other in the second channel CH2.

The pen PN may be disposed between the first channel CH1 and the second channel CH2.

Figure 24A:
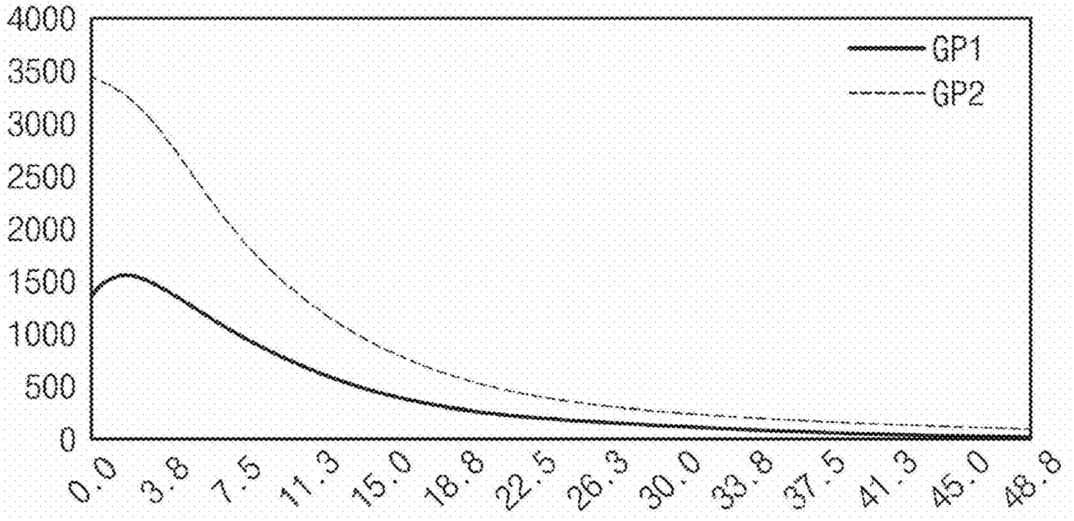
FIG. 24A is a graph depicting magnetic field strength versus pen height according to an embodiment of the present disclosure.

FIG. 24A is a graph depicting magnetic field strength versus pen height according to an embodiment of the present disclosure.

Referring to FIGS. 23 and 24A, the horizontal axis represents the distance between the display panel DP and the pen PN (e.g., refer to FIG. 5). The unit of the horizontal axis may be millimeter (mm).

The vertical axis represents the magnetic field strength. The unit of the vertical axis may be nanotesla (nT).

A first graph GP1 depicts the magnetic field strength depending on the height of the pen PN (e.g., refer to FIG. 5) according to a comparative example. In the comparative example, the plurality of first charging electrodes SE may be excluded. In the comparative example, the first current RFS1 (e.g., refer to FIG. 18A) provided to the plurality of third electrodes 230 may be 25 mA.

A second graph GP2 depicts the magnetic field strength depending on the height of the pen PN according to an embodiment of the present disclosure. The first current RFS1 (e.g., refer to FIG. 18A) provided to the plurality of third electrodes 230 may be 25 mA, and the second current RFS2 (e.g., refer to FIG. 19A) provided to the plurality of first charging electrodes SE may be 25 mA.

The second graph GP2 may be higher than the first graph GP1. In other words, the magnetic field strength depending on the distance between the display panel DP and the pen PN (e.g., refer to FIG. 5) in an embodiment of the present disclosure may be greater than that of the comparative example.

According to some embodiments of the present disclosure, in the charging drive mode of the second mode, a magnetic field may be strengthened due to the first current RFS1 (e.g., refer to FIG. 18A) and the second current RFS2 (e.g., refer to FIG. 19A). The resonance circuit of the pen PN (e.g., refer to FIG. 5) may be charged by the magnetic field. The electronic device 1000 (e.g., refer to FIG. 1A) may be easily charged by the magnetic field strengthened by the first charging electrodes SE of the auxiliary layer 110. Accordingly, the electronic device 1000 (e.g., refer to FIG. 1A) having an improved pen sensing reliability may be provided.

Figure 24B:
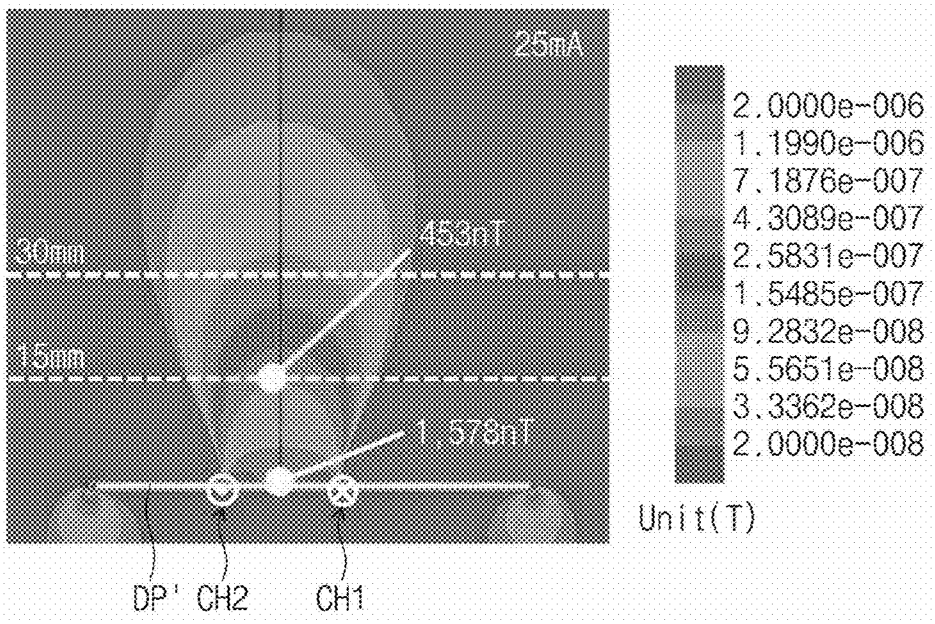
FIG. 24B is a view obtained by measuring the strength of a magnetic field on a cross-section of a display panel according to a comparative example.
Figure 24C:
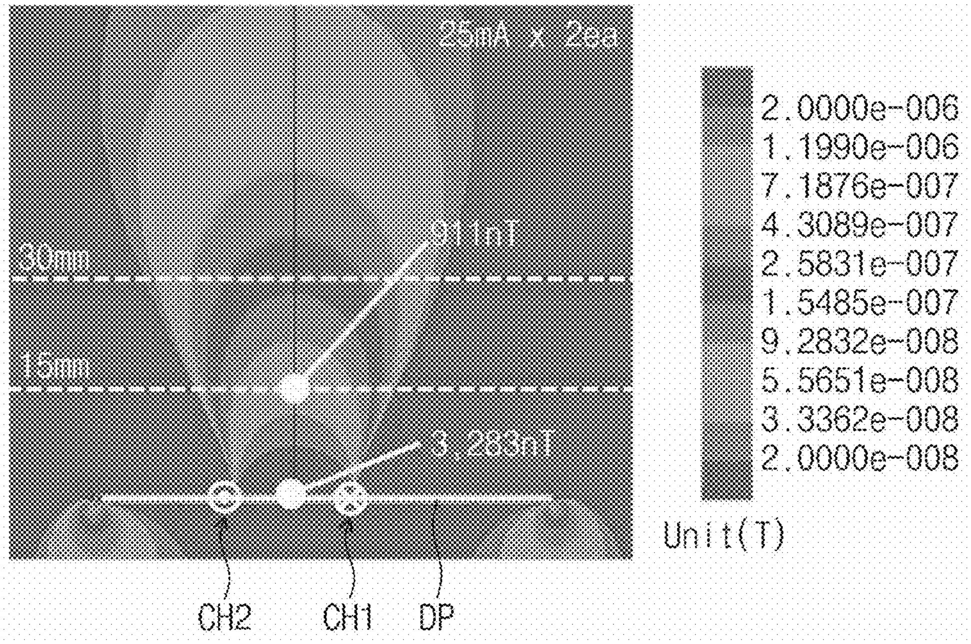
FIG. 24C is a view obtained by measuring the strength of a magnetic field on a cross-section of a display panel according to an embodiment of the present disclosure.

FIG. 24B is a view obtained by measuring the strength of a magnetic field on a cross-section of a display panel according to a comparative example, and FIG. 24C is a view obtained by measuring the strength of a magnetic field on a cross-section of a display panel according to an embodiment of the present disclosure.

Referring to FIGS. 23, 24B, and 24C, the radiation patterns of the magnetic fields in the display panels DP and DP' according to the embodiment of the present disclosure and the comparative example are illustrated. The strengths of the magnetic fields may be expressed in various colors.

In the comparative example, the display panel DP' may not include the plurality of first charging electrodes SE.

In the first channel CH1 of the display panel DP', the first current RFS1 (e.g., refer to FIG. 18A) may be provided in the second direction DR2, and in the second channel CH2, the first current RFS1 may be provided in the direction opposite to the second direction DR2. The first current RFS1 may be 25 mA.

The display panel DP' may be referred to as operating in a single charging manner, because a magnetic field is formed by the first current RFS1 (e.g., refer to FIG. 18A).

When the pen PN (e.g., refer to FIG. 5) and the display panel DP' make contact with each other, the magnetic field strength may be 1578 nT. When the pen PN hovers over the display panel DP' by a distance of about 15 mm, the magnetic field strength may be 453 nT.

In an embodiment of the present disclosure, the display panel DP may include the auxiliary layer 110 including the plurality of first charging electrodes SE.

In the first channel CH1 of the display panel DP, the first current RFS1 (e.g., refer to FIG. 18A) may be provided in the second direction DR2, and in the second channel CH2, the first current RFS1 may be provided in the direction opposite to the second direction DR2. The first current RFS1 may be 25 mA.

In the first channel CH1 of the display panel DP, the second current RFS2 (e.g., refer to FIG. 19A) may be provided in the second direction DR2, and in the second channel CH2, the second current RFS2 may be provided in the direction opposite to the second direction DR2. The second current RFS2 may be 25 mA.

The display panel DP may be referred to as operating in a dual charging manner because a magnetic field is formed by the first current RFS1 and the second current RFS2.

When the pen PN (e.g., refer to FIG. 5) and the display panel DP make contact with each other, the magnetic field strength may be 3283 nT. When the pen PN hovers over the display panel DP by a distance of about 15 mm, the magnetic field strength may be 911 nT. The magnetic field strength according to an embodiment of the present disclosure may be greater than that measured in the display panel DP' according to the comparative example.

According to some embodiments of the present disclosure, in the charging drive mode of the second mode, a magnetic field may be strengthened due to the first current RFS1 (e.g., refer to FIG. 18A) and the second current RFS2 (e.g., refer to FIG. 19A). The resonance circuit of the pen PN (e.g., refer to FIG. 5) may be charged by the magnetic field. The electronic device 1000 (e.g., refer to FIG. 1A) may be easily charged by the magnetic field strengthened by the first charging electrodes SE of the auxiliary layer 110. Accordingly, the electronic device 1000 having an improved pen sensing reliability may be provided.

Figure 25:
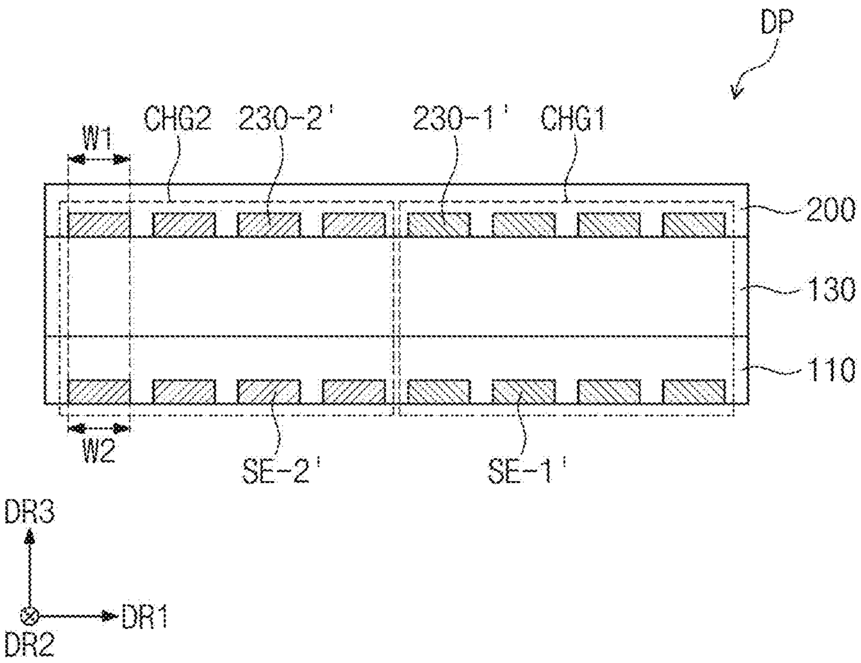
FIG. 25 is a sectional view illustrating the display panel according to an embodiment of the present disclosure.

FIG. 25 is a sectional view illustrating the display panel according to an embodiment of the present disclosure. Hereinafter with reference to FIG. 25, the components that are the same or substantially the same as those described above with reference to FIG. 23 are denoted with the same reference symbols, and thus, redundant description thereof may not be repeated.

Referring to FIG. 25, some of the plurality of third electrodes 230 (e.g., third electrodes 230-1') and some of the plurality of first charging electrodes SE (e.g., first charging electrodes SE-1') may be defined as a first channel group CHG1.

The other third electrodes 230-2' and the other first charging electrodes SE-2' may be defined as a second channel group CHG2.

The sensor driver 200C may transmit the first-first sub-signal SG1-1 to the third electrodes 230-1', and may transmit the first-second sub-signal SG1-2 to the third electrodes 230-2'.

The first current RFS1 (e.g., refer to FIG. 18A) may flow in the second direction DR2 through the third electrodes 230-1' by the first-first sub-signal SG1-1.

The first current RFS1 may flow in the direction opposite to the second direction DR2 through the third electrodes 230-2' by the first-second sub-signal SG1-2. This method may be referred to as a global charging method.

The sensor driver 200C may transmit the second-first sub-signal SG2-1 to the first charging electrodes SE-1', and may transmit the second-second sub-signal SG2-2 to the first charging electrodes SE-2'.

The second current RFS2 (e.g., refer to FIG. 19A) may flow in the second direction DR2 through the first charging electrodes SE-1' by the second-first sub-signal SG2-1.

The second current RFS2 may flow in the direction opposite to the second direction DR2 through the first charging electrodes SE-2' by the second-second sub-signal SG2-2.

In the first channel group CHG1, the first current RFS1 and the second current RFS2 may flow in the same direction as each other, and in the second channel group CHG2, the first current RFS1 and the second current RFS2 may flow in the same direction as each other.

Figure 26A:
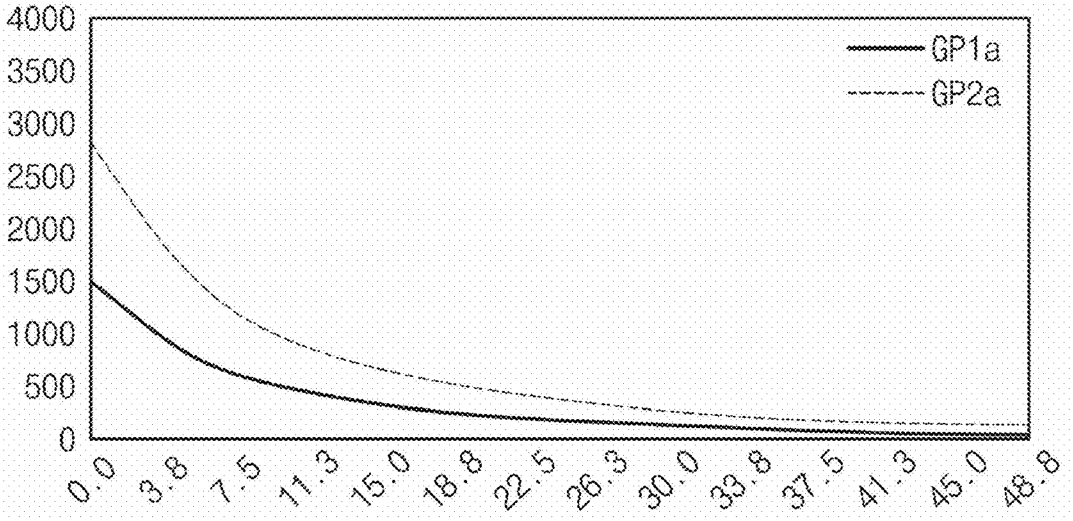
FIG. 26A is a graph depicting magnetic field strength versus pen height according to an embodiment of the present disclosure.

FIG. 26A is a graph depicting magnetic field strength versus pen height according to an embodiment of the present disclosure. Hereinafter with reference to FIG. 26A, the components that are the same or substantially the same as those described above with reference to FIG. 24A are denoted with the same reference symbols, and thus, redundant description thereof may not be repeated.

Referring to FIGS. 25 and 26A, a first graph GP1*a* depicts the strength of a magnetic field depending on the height of the pen PN (e.g., refer to FIG. 5) according to a comparative example. In the comparative example, the plurality of first charging electrodes SE may be excluded. In the comparative example, the first current RFS1 (e.g., refer to FIG. 18A) provided to the plurality of third electrodes 230 may be 6.25 mA.

A second graph GP2*a* depicts the strength of a magnetic field depending on the height of the pen PN according to an embodiment of the present disclosure. The first current RFS1 (e.g., refer to FIG. 18A) provided to the plurality of third electrodes 230 may be 6.25 mA, and the second current RFS2 (e.g., refer to FIG. 19A) provided to the plurality of first charging electrodes SE may be 6.25 mA.

The second graph GP2*a* may be higher than the first graph GP1*a*. In other words, the magnetic field strength depending on the distance between the display panel DP and the pen PN (e.g., refer to FIG. 5) in an embodiment of the present disclosure may be greater than that in the comparative example.

According to some embodiments of the present disclosure, in the charging drive mode of the second mode, a magnetic field may be strengthened due to the first current RFS1 and the second current RFS2. The resonance circuit of the pen PN may be charged by the magnetic field. The electronic device 1000 may be easily charged by the magnetic field strengthened by the first charging electrodes SE of the auxiliary layer 110. Accordingly, the electronic device 1000 having an improved pen sensing reliability may be provided.

Figure 26B:
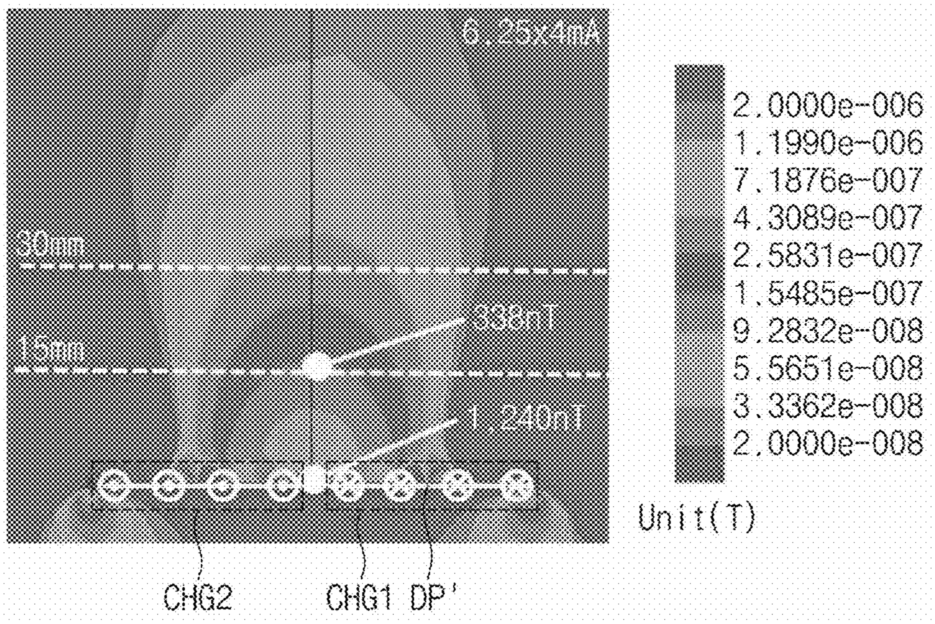
FIG. 26B is a view obtained by measuring the strength of a magnetic field on a cross-section of a display panel according to a comparative example.
Figure 26C:
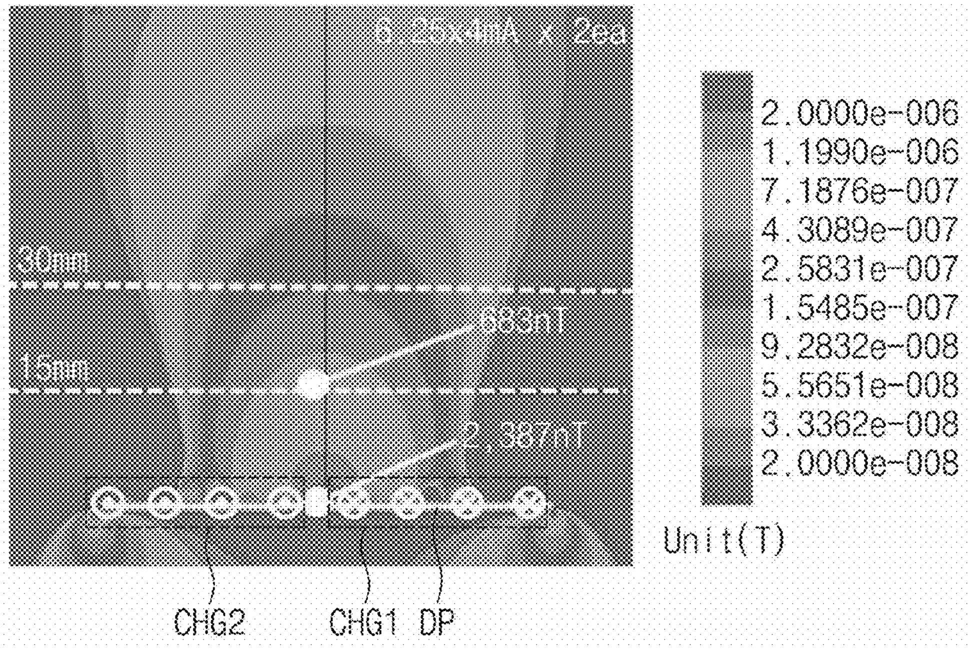
FIG. 26C is a view obtained by measuring the strength of a magnetic field on a cross-section of a display panel according to an embodiment of the present disclosure.

FIG. 26B is a view obtained by measuring the strength of a magnetic field on a cross-section of a display panel according to a comparative example, and FIG. 26C is a view obtained by measuring the strength of a magnetic field on a cross-section of a display panel according to an embodiment of the present disclosure.

Referring to FIGS. 25, 26B, and 26C, in the comparative example, the display panel DP' may not include the plurality of first charging electrodes SE.

In the first channel group CHG1 of the display panel DP', the first current RFS1 may be provided in the second direction DR2, and in the second channel group CHG2, the first current RFS1 may be provided in the direction opposite to the second direction DR2. The first current RFS1 may be 6.25 mA. For example, each of the first channel group CHG1 and the second channel group CHG2 may include four third electrodes 230 through which a current of 6.25 mA flows.

The display panel DP' may be referred to as operating in a single charging manner because a magnetic field is formed by the first current RFS1.

When the pen PN and the display panel DP' make contact with each other, the magnetic field strength may be 1240 nT. When the pen PN hovers over the display panel DP' by a distance of about 15 mm, the magnetic field strength may be 338 nT.

In an embodiment of the present disclosure, the display panel DP may include the auxiliary layer 110 including the plurality of first charging electrodes SE.

In the first channel group CHG1 of the display panel DP, the first current RFS1 may be provided in the second direction DR2, and in the second channel group CHG2, the first current RFS1 may be provided in the direction opposite to the second direction DR2. The first current RFS1 may be 6.25 mA. For example, each of the first channel group CHG1 and the second channel group CHG2 may include four third electrodes 230 through which a current of 6.25 mA flows.

In the first channel group CHG1 of the display panel DP, the second current RFS2 may be provided in the second direction DR2, and in the second channel group CHG2, the second current RFS2 may be provided in the direction opposite to the second direction DR2. The second current RFS2 may be 6.25 mA. For example, each of the first channel group CHG1 and the second channel group CHG2 may include four first charging electrodes SE through which a current of 6.25 mA flows.

The display panel DP may be referred to as operating in a dual charging manner because a magnetic field is formed by the first current RFS1 and the second current RFS2.

When the pen PN and the display panel DP make contact with each other, the magnetic field strength may be 2387 nT. When the pen PN hovers over the display panel DP by a distance of about 15 mm, the magnetic field strength may be 683 nT. The magnetic field strength according to an embodiment of the present disclosure may be greater than that measured in the display panel DP' according to the comparative example.

According to some embodiments the present disclosure, in the charging drive mode of the second mode, a magnetic field may be strengthened due to the first current RFS1 and the second current RFS2. The resonance circuit of the pen PN may be charged by the magnetic field. The electronic device 1000 may be easily charged by the magnetic field strengthened by the first charging electrodes SE of the auxiliary layer 110. Accordingly, the electronic device 1000 having an improved pen sensing reliability may be provided.

Figure 27:
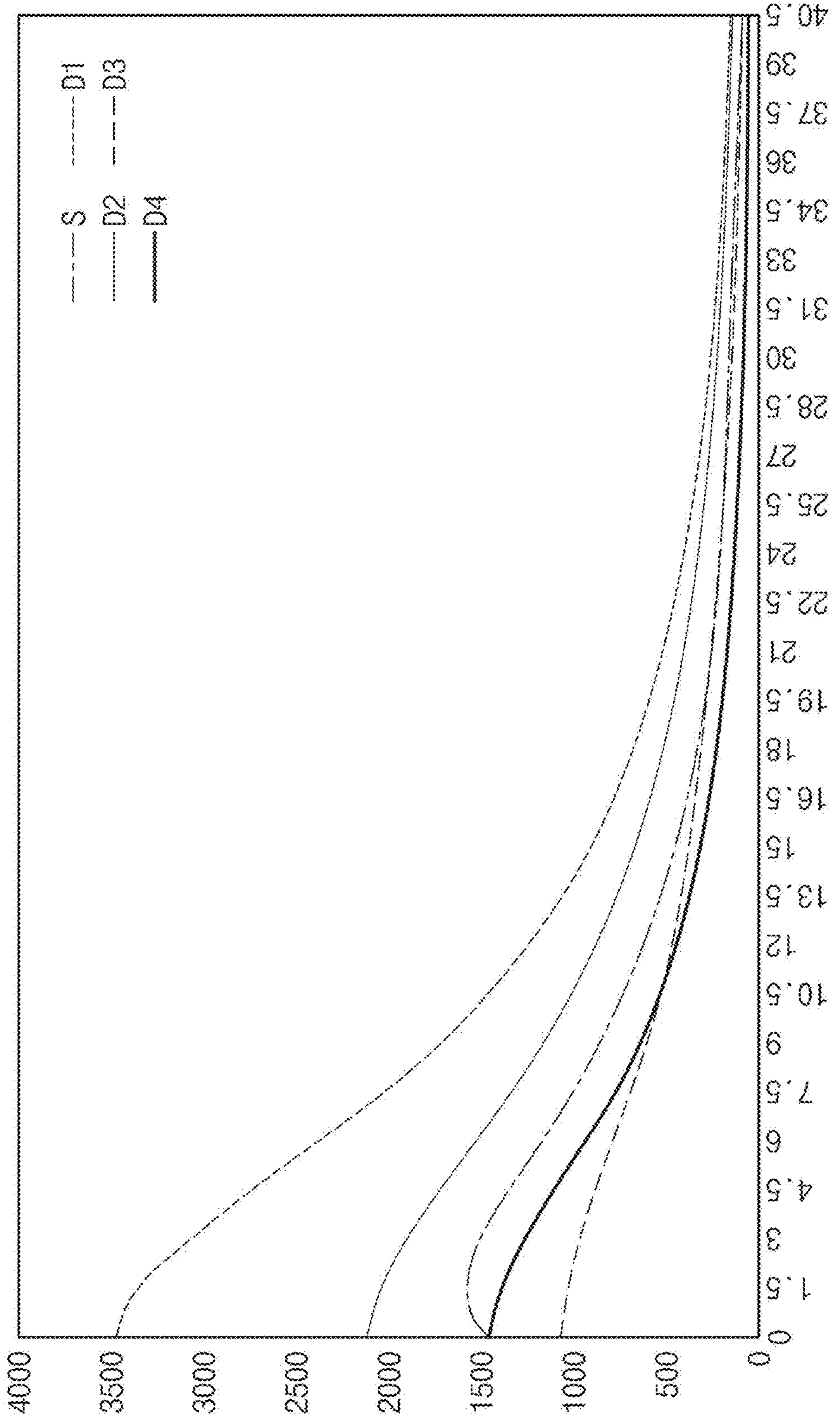
FIG. 27 is a graph depicting magnetic field strength versus pen height depending on positions where the first signal and the second signal are provided according to an embodiment of the present disclosure.

FIG. 27 is a graph depicting magnetic field strength versus pen height depending on positions where the first signal and the second signal are provided according to an embodiment of the present disclosure.

Referring to FIGS. 20, 23, and 27, the horizontal axis represents the distance between the display panel DP and the pen PN (e.g., refer to FIG. 5). The unit of the horizontal axis may be millimeter (mm).

The vertical axis represents the magnetic field strength. The unit of the vertical axis may be nanotesla (nT).

In first to fifth graphs D1, D2, D3, D4, and S, the plurality of third electrodes 230 arranged in the first direction DR1 in FIG. 23 are sequentially referred to as $0^{th}$ to $7^{th}$ third electrodes, and the plurality of first charging electrodes SE arranged in the first direction DR1 in FIG. 23 are sequentially referred to as $0^{th}$ to $7^{th}$ first charging electrodes.

The first graph D1 depicts the magnetic field strength depending on the pen height when the first signal SG1 is provided to the $2^{nd}$ third electrode 230-2 and the $4^{th}$ third electrode 230-1 among the plurality of third electrodes 230, and the second signal SG2 is provided to the $2^{nd}$ first charging electrode SE-2 and the $4^{th}$ first charging electrode SE-1 among the plurality of first charging electrodes SE. In other words, the first graph D1 may be a graph depicting the magnetic field strength depending on the pen height when the display panel DP is driven as described above with reference to FIG. 23.

The second graph D2 depicts the magnetic field strength depending on the pen height when the first signal SG1 is provided to the 2nd third electrode 230-2 and the 4th third electrode 230-1 among the plurality of third electrodes 230, and the second signal SG2 is provided to the 3rd first charging electrode and the 5th first charging electrode among the plurality of first charging electrodes SE.

The third graph D3 depicts the magnetic field strength depending on the pen height when the first signal SG1 is provided to the 2nd third electrode 230-2 and the 4th third electrode 230-1 among the plurality of third electrodes 230, and the second signal SG2 is provided to the 4th first charging electrode and the 6th first charging electrode among the plurality of first charging electrodes SE.

The fourth graph D4 depicts the magnetic field strength depending on the pen height when the first signal SG1 is provided to the 2nd third electrode 230-2 and the 4th third electrode 230-1 among the plurality of third electrodes 230, and the second signal SG2 is provided to the 5th first charging electrode and the 7th first charging electrode among the plurality of first charging electrodes SE.

The fifth graph S depicts the magnetic field strength depending on the pen height according to a comparative example.

The second to fourth graphs D2, D3, and D4 depict the magnetic field strength depending on the pen height when the first signal SG1 is provided to the 2nd third electrode 230-2 and the 4th third electrode 230-1 among the plurality of third electrodes 230, and the first charging electrodes receiving the second signal SG2 among the plurality of first charging electrodes SE are staggered with respect to the third electrodes 230-1 and 230-2.

The magnetic field strengths in the first and second graphs D1 and D2 may be greater than that in the fifth graph S. When, as in the first and second graphs D1 and D2, the first charging electrodes receiving the second signal SG2 among the plurality of first charging electrodes SE have positions corresponding to the third electrodes receiving the first signal SG1 among the plurality of third electrodes 230, or are spaced apart from the third electrodes receiving the first signal SG1 by a suitable gap (e.g., a certain or predetermined gap) in the first direction DR1 when viewed from above the plane (e.g., in a plan view), the magnetic field strength may be enhanced by a constructive interference phenomenon, as compared with when a display panel operates in a single charging manner as in the fifth graph S according to the comparative example.

When, as in the third and fourth graphs D3 and D4, the first charging electrodes receiving the second signal SG2 among the plurality of first charging electrodes SE are spaced apart from the third electrodes receiving the first signal SG1 among the plurality of third electrodes 230 by more than the gap (e.g., the certain or predetermined gap) in the first direction DR1 when viewed from above the plane (e.g., in a plan view), the magnetic field strength may be relatively low due to a destructive interference phenomenon, as compared with when the display panel operates in the single charging manner as in the fifth graph S according to the comparative example.

Figure 28:
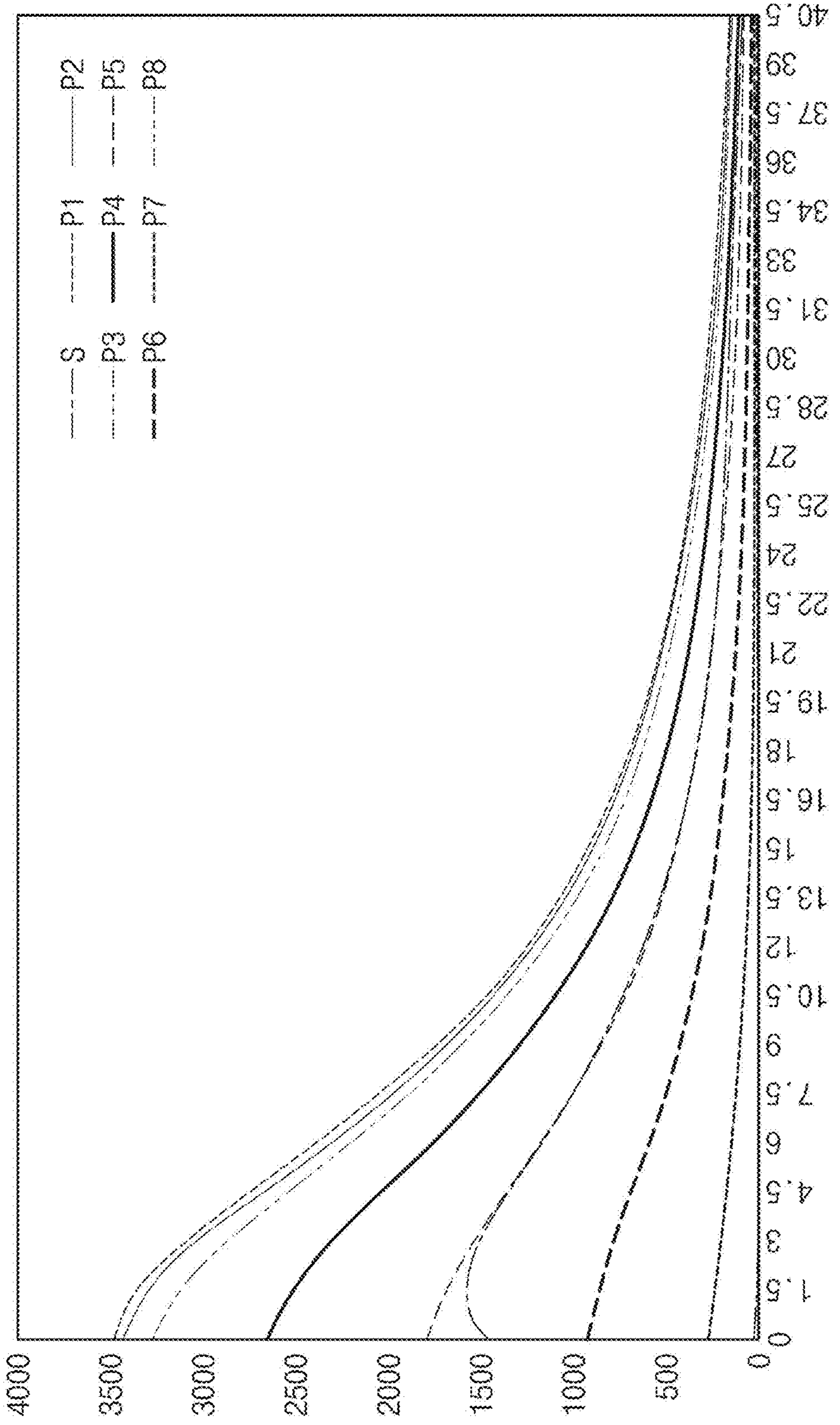
FIG. 28 is a graph depicting magnetic field strength versus pen height depending on a difference in phase between the first signal and the second signal according to an embodiment of the present disclosure.

FIG. 28 is a graph depicting magnetic field strength versus pen height depending on a difference in phase between the first signal and the second signal according to an embodiment of the present disclosure.

Referring to FIGS. 20 and 28, the magnetic field strength depending on the phase difference between the first signal SG1' measured at the plurality of third electrodes 230 and the second signal SG2' measured at the plurality of first charging electrodes SE is illustrated.

The horizontal axis represents the distance between the display panel DP and the pen PN (e.g., refer to FIG. 5). The unit of the horizontal axis may be millimeter (mm).

The vertical axis represents the magnetic field strength. The unit of the vertical axis may be nanotesla (nT).

A first graph P1 depicts the magnetic field strength depending on the pen height when the phase difference between the first signal SG1' measured at the plurality of third electrodes 230 and the second signal SG2' measured at the plurality of first charging electrodes SE is 0 degrees, that is, when the amount of phase delay of the first signal SG1' is equal to the amount of phase delay of the second signal SG2'.

A second graph P2 depicts the magnetic field strength depending on the pen height when the phase difference between the first signal SG1' and the second signal SG2' is 15 degrees.

A third graph P3 depicts the magnetic field strength depending on the pen height when the phase difference between the first signal SG1' and the second signal SG2' is 30 degrees.

A fourth graph P4 depicts the magnetic field strength depending on the pen height when the phase difference between the first signal SG1' and the second signal SG2' is 60 degrees.

A fifth graph P5 depicts the magnetic field strength depending on the pen height when the phase difference between the first signal SG1' and the second signal SG2' is 90 degrees.

A sixth graph P6 depicts the magnetic field strength depending on the pen height when the phase difference between the first signal SG1' and the second signal SG2' is 120 degrees.

A seventh graph P7 depicts the magnetic field strength depending on the pen height when the phase difference between the first signal SG1' and the second signal SG2' is 150 degrees.

An eighth graph P8 depicts the magnetic field strength depending on the pen height when the phase difference between the first signal SG1' and the second signal SG2' is 180 degrees.

A ninth graph S depicts the magnetic field strength depending on the pen height according to a comparative example. The ninth graph S may be substantially the same as the fifth graph S (e.g., refer to FIG. 27).

The magnetic field strengths in the first to fifth graphs P1, P2, P3, P4, and P5 may be greater than that in the ninth graph S. In other words, the phase difference between the first signal SG1' and the second signal SG2' may range from 0 degrees to 90 degrees.

According to the present disclosure, the sensor driver 200C may output the first signal SG1 and the second signal SG2 differing from each other in terms of the amount of phase delay such that the phase difference between the charging signals SG1' and SG2' in the plurality of third electrodes 230 and the plurality of first charging electrodes SE ranges from 0 degrees to 90 degrees. A magnetic field may be formed through constructive interference of the charging signals SG1' and SG2'. The resonance circuit of the pen PN may be charged by the magnetic field. Accordingly, the electronic device 1000 (e.g., refer to FIG. 1A) with improved charging efficiency of the pen PN (e.g., refer to FIG. 5) may be provided.

Figure 29:
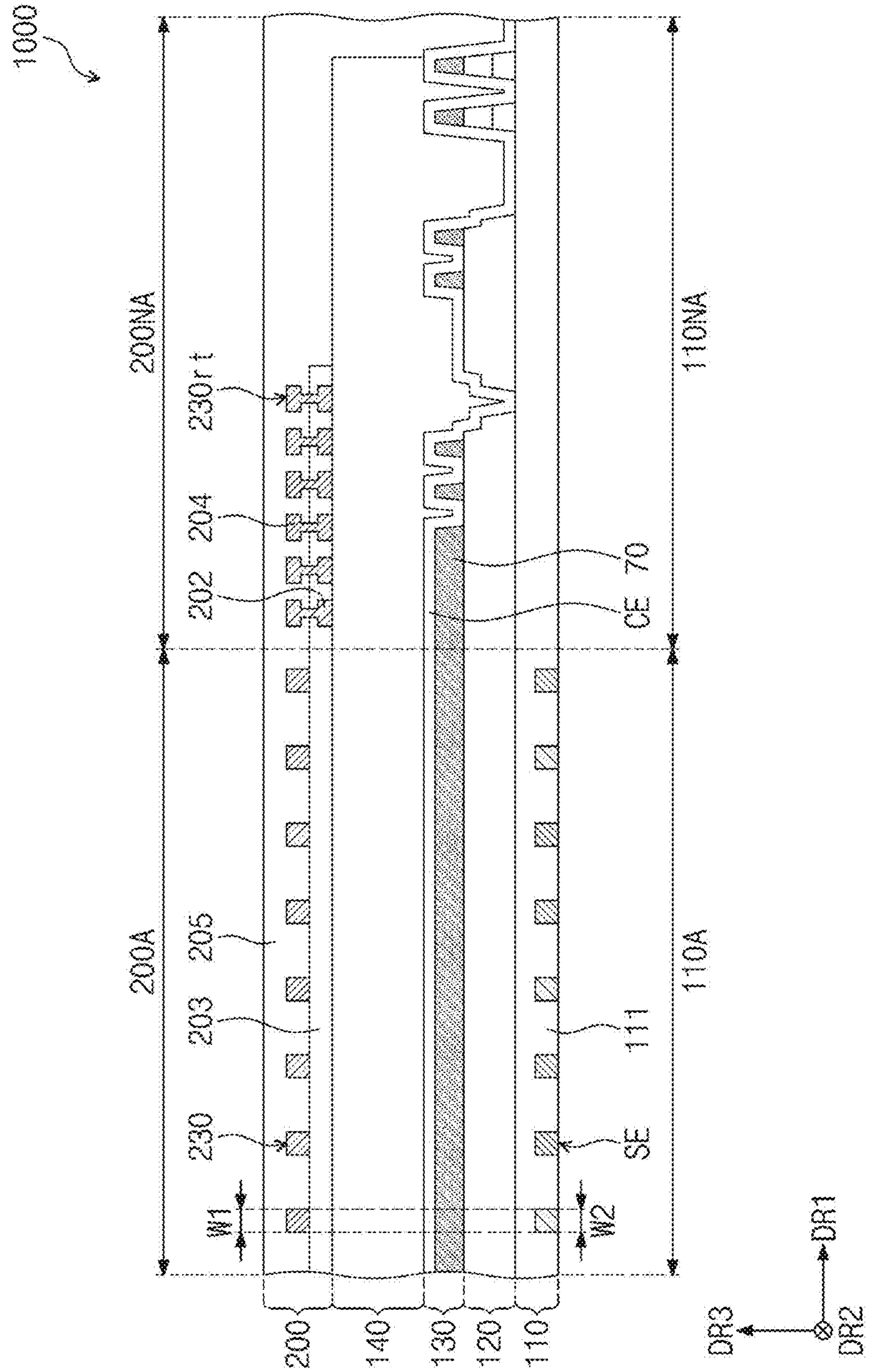
FIG. 29 is a sectional view of an electronic device according to an embodiment of the present disclosure.

FIG. 29 is a sectional view of the electronic device according to an embodiment of the present disclosure. Hereinafter with reference to FIG. 29, the components that are the same or substantially the same as those described above with reference to FIGS. 6, 7, 10, and 11A are denoted with the same reference symbols, and thus, redundant description thereof may not be repeated.

Referring to FIG. 29, in the electronic device 1000, the base layer 110 may be defined as the auxiliary layer 110.

The base layer 110 may include the insulating layer 111 and the plurality of first charging electrodes SE.

The plurality of first charging electrodes SE may be disposed on the lower surface of the base layer 110. The insulating layer 111 may cover the plurality of first charging electrodes SE.

Figure 30:
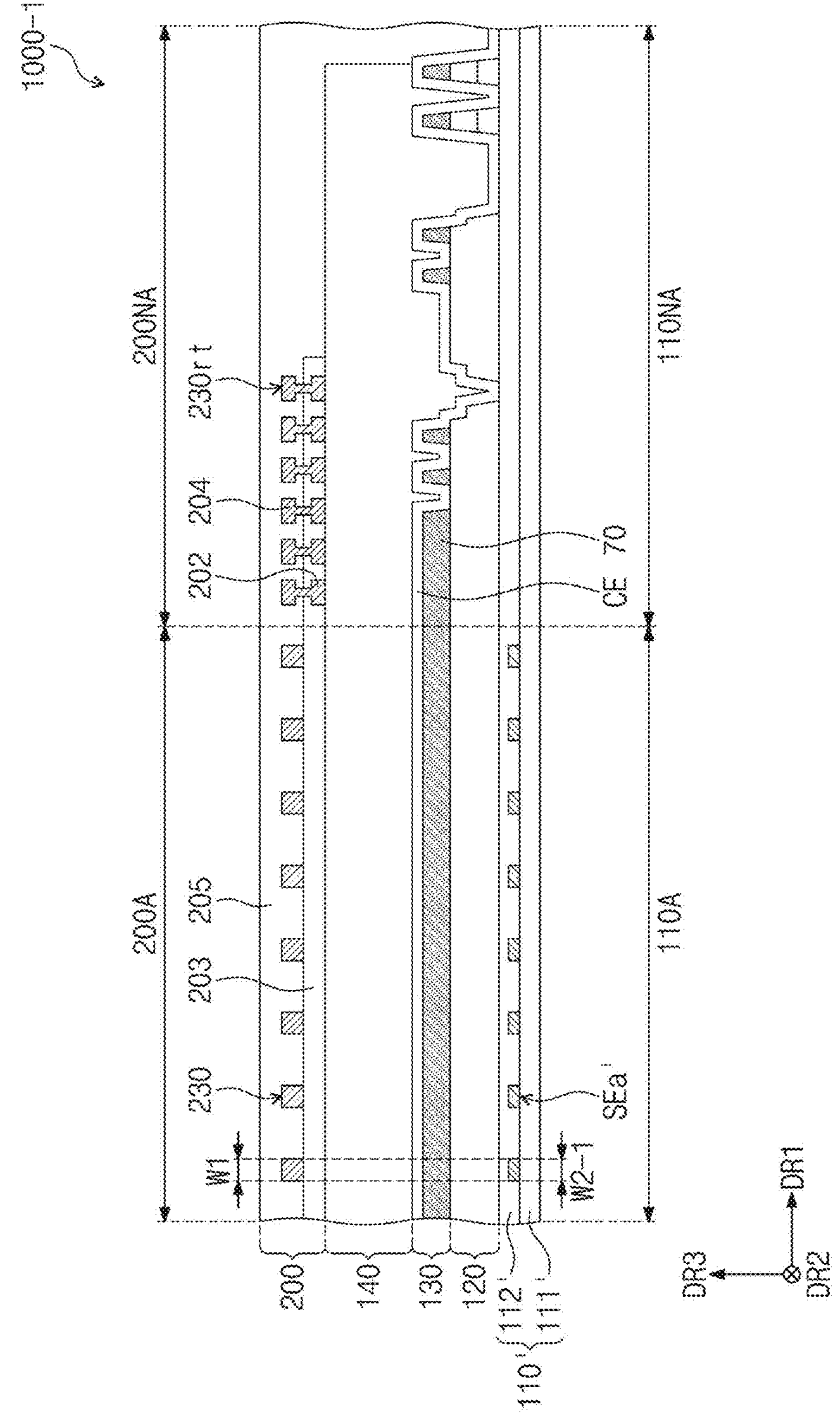
FIG. 30 is a sectional view of an electronic device according to an embodiment of the present disclosure.

FIG. 30 is a sectional view of an electronic device according to an embodiment of the present disclosure. Hereinafter with reference to FIG. 30, the components that are the same or substantially the same as those described above with reference to FIGS. 6, 7, 10, and 11A are denoted with the same reference symbols, and thus, redundant description thereof may not be repeated.

Referring to FIG. 30, in the electronic device 1000-1, a base layer 110' may be defined as an auxiliary layer 110'.

The base layer 110' may include a first sub-base layer 111', a second sub-base layer 112' disposed on the first sub-base layer 111', and a plurality of first charging electrodes SEa'.

The plurality of first charging electrodes SEa' may be disposed on the first sub-base layer 111'. The second sub-base layer 112' may cover the plurality of first charging electrodes SEa'.

The plurality of first charging electrodes SEa' may overlap with the plurality of third electrodes 230 when viewed from above the plane (e.g., in a plan view). The width W2-1 of each of the plurality of first charging electrodes SEa' may be determined by the width W1 of each of the plurality of third electrodes 230. For example, the width W2-1 of each of the plurality of first charging electrodes SEa' may be equal to or substantially equal to the width W1 of each of the plurality of third electrodes 230.

Each of the first sub-base layer 111' and the second sub-base layer 112' may include polyimide.

Figure 31:
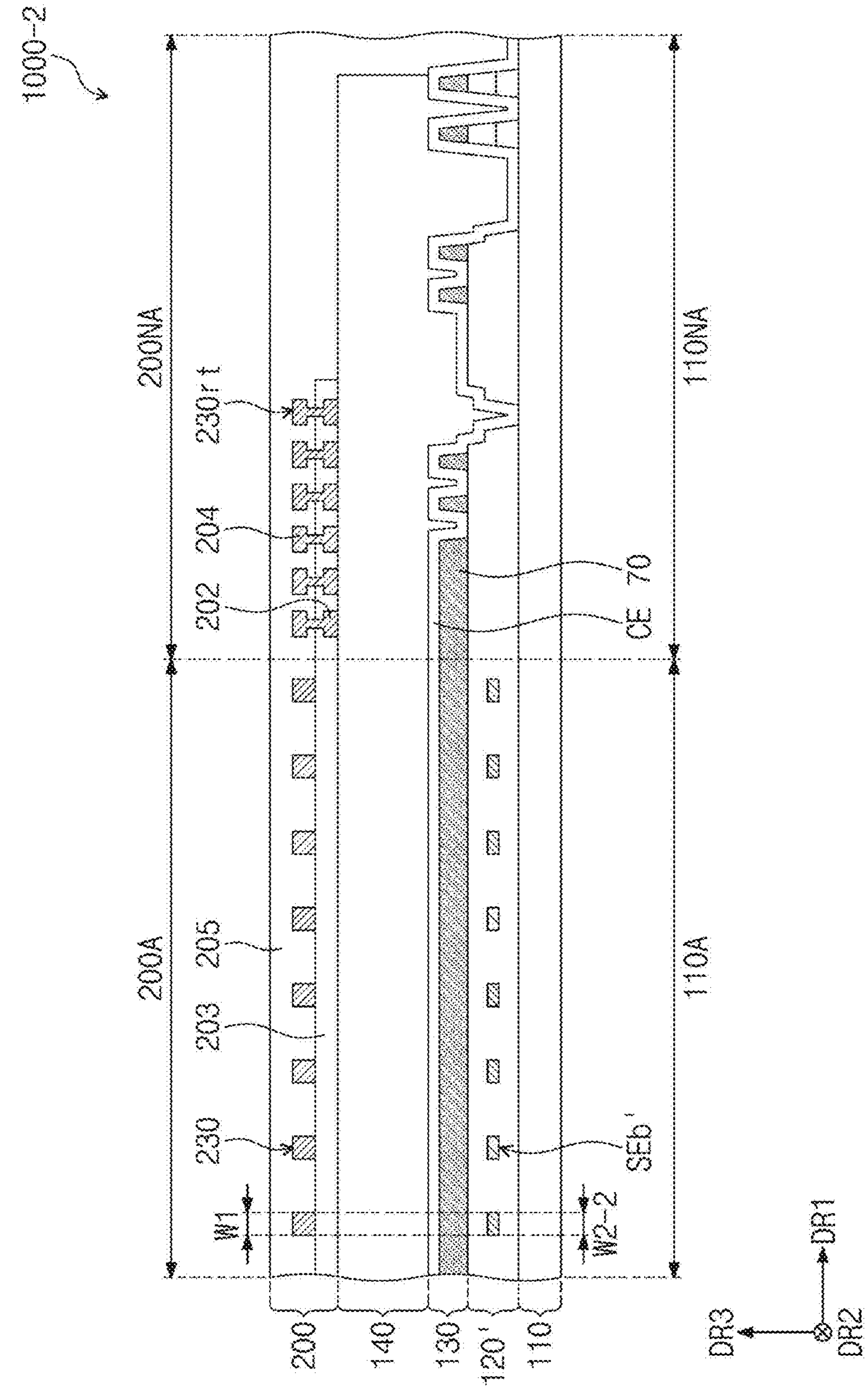
FIG. 31 is a sectional view of an electronic device according to an embodiment of the present disclosure.

FIG. 31 is a sectional view of an electronic device according to an embodiment of the present disclosure. Hereinafter with reference to FIG. 31, the components that are the same or substantially the same as those described above with reference to FIGS. 6, 7, 10, and 11A are denoted with the same reference symbols, and thus, redundant description thereof may not be repeated.

Referring to FIG. 31, in the electronic device 1000-2, a circuit layer 120' may be defined as an auxiliary layer 120'.

The circuit layer 120' may be disposed under the light emitting element layer 130. The circuit layer 120' may include a transistor 100PC that drives the light emitting element layer 130 and a plurality of first charging electrodes SEb'.

The plurality of first charging electrodes SEb' may overlap with the plurality of third electrodes 230 when viewed from above the plane (e.g., in a plan view). The width W2-2 of each of the plurality of first charging electrodes SEb' may be determined by the width W1 of each of the plurality of third electrodes 230. For example, the width W2-2 of each of the plurality of first charging electrodes SEb' may be equal to or substantially equal to the width W1 of each of the plurality of third electrodes 230.

Figure 32:
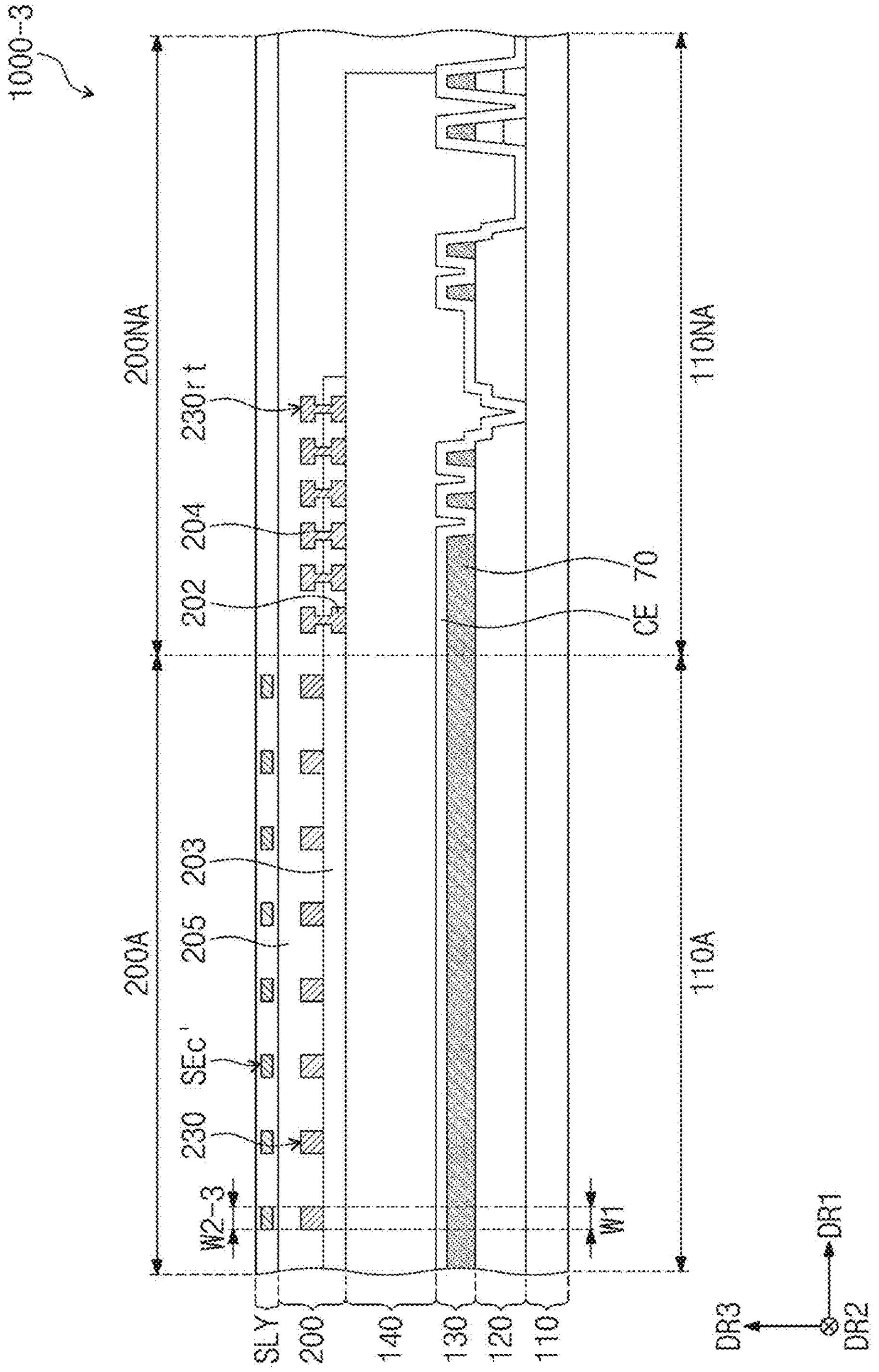
FIG. 32 is a sectional view of an electronic device according to an embodiment of the present disclosure.

FIG. 32 is a sectional view of an electronic device according to an embodiment of the present disclosure. Hereinafter with reference to FIG. 32, the components that are the same or substantially the same as those described above with reference to FIGS. 6, 7, 10, and 11A are denoted with the same reference symbols, and thus, redundant description thereof may not be repeated.

Referring to FIG. 32, the electronic device 1000-3 may further include an auxiliary layer SLY. The auxiliary layer SLY may be disposed on the sensor layer 200. The auxiliary layer SLY may include a plurality of first charging electrodes SEc'.

The plurality of first charging electrodes SEc' may overlap with the plurality of third electrodes 230 when viewed from above the plane (e.g., in a plan view). The width W2-3 of each of the plurality of first charging electrodes SEc' may be determined by the width W1 of each of the plurality of third electrodes 230. For example, the width W2-3 of each of the plurality of first charging electrodes SEc' may be equal to or substantially equal to the width W1 of each of the plurality of third electrodes 230.

The plurality of first charging electrodes SEc' may include a transparent conductive material.

Figure 33A:
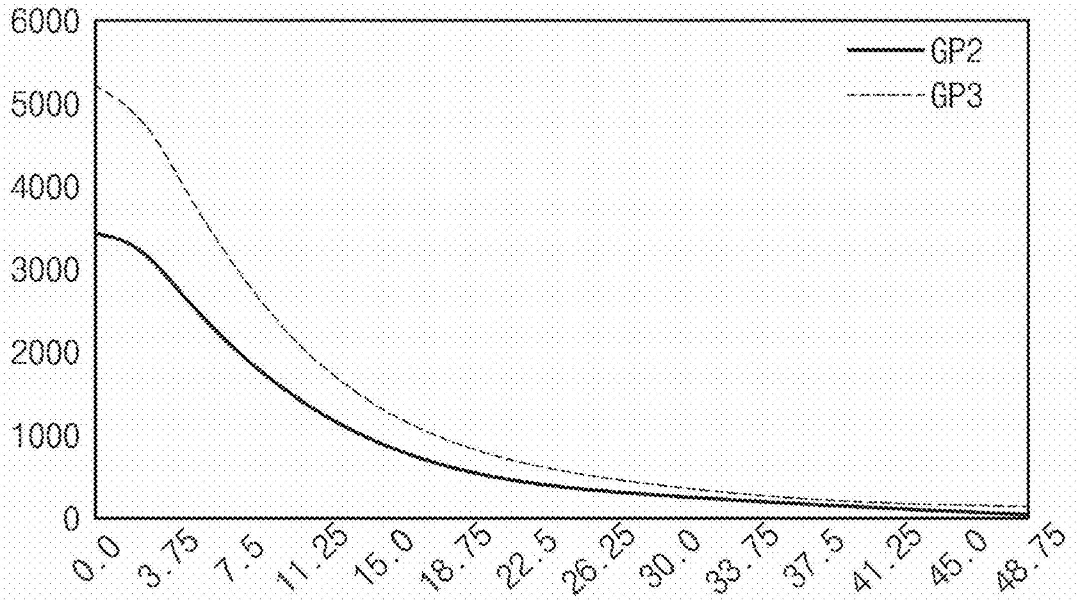
FIG. 33A is a graph depicting magnetic field strength versus pen height according to an embodiment of the present disclosure.

FIG. 33A is a graph depicting magnetic field strength versus pen height according to an embodiment of the present disclosure. Hereinafter with reference to FIG. 33A, the components that are the same or substantially the same as those described above with reference to FIG. 24A are denoted with the same reference symbols, and thus, redundant description thereof may not be repeated.

Referring to FIGS. 23 and 33A, a second graph GP2 depicts the magnetic field strength depending on the height of the pen PN according to an embodiment of the present disclosure. The first current RFS1 (e.g., refer to FIG. 18A) provided to the plurality of third electrodes 230 may be 25 mA, and the second current RFS2 (e.g., refer to FIG. 19A) provided to the plurality of first charging electrodes SE may be 25 mA.

A third graph GP3 depicts the magnetic field strength depending on the height of the pen PN according to an embodiment of the present disclosure. The first current RFS1 may be different from the second current RFS2.

The plurality of first charging electrodes SE may have a lower resistance than that of the plurality of third electrodes 230. As such, a current higher than that provided to the plurality of third electrodes 230 may be provided to the plurality of first charging electrodes SE.

The first current RFS1 provided to the plurality of third electrodes 230 may be 25 mA, and the second current RFS2 provided to the plurality of first charging electrodes SE may be 50 mA. However, the present disclosure is not limited thereto, and considering the resistance of the plurality of first charging electrodes SE, the second current RFS2 may be ten times greater than the first current RFS1.

According to some embodiments of the present disclosure, the third graph GP3 may be higher than the second graph GP2. In the charging drive mode of the second mode, a magnetic field may be strengthened due to the first current RFS1 and the second current RFS2. The resonance circuit of the pen PN may be charged by the magnetic field. The electronic device 1000 may be easily charged by the magnetic field strengthened by the first charging electrodes SE of the auxiliary layer 110. Accordingly, the electronic device 1000 having an improved pen sensing reliability may be provided.

Figure 33B:
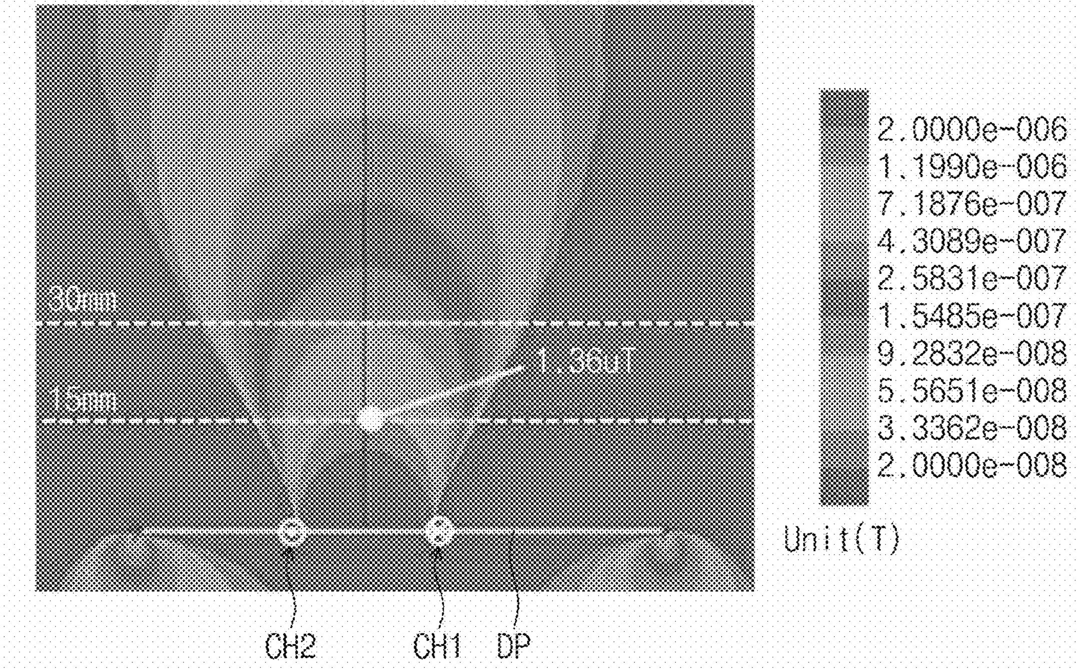
FIG. 33B is a view obtained by measuring the strength of a magnetic field on a cross-section of a display panel according to an embodiment of the present disclosure.

FIG. 33B is a view obtained by measuring the strength of a magnetic field on a cross-section of a display panel according to an embodiment of the present disclosure.

Referring to FIGS. 23 and 33B, in the first channel CH1 of the display panel DP, the first current RFS1 may be provided in the second direction DR2, and in the second channel CH2, the first current RFS1 may be provided in the direction opposite to the second direction DR2. The first current RFS1 may be 25 mA.

In the first channel CH1 of the display panel DP, the second current RFS2 may be provided in the second direction DR2, and in the second channel CH2, the second current RFS2 may be provided in the direction opposite to the second direction DR2. The second current RFS2 may be different from the first current RFS1. The second current RFS2 may be 50 mA.

The plurality of first charging electrodes SE may have a lower resistance than that of the plurality of third electrodes 230. When a voltage is applied up to the upper limit of voltage that the sensor driver 200C is able to apply according to Ohm's law, an available current applied to the plurality of first charging electrodes SE having a relatively low resistance may be increased. Accordingly, the power efficiency and sensing sensitivity of the electronic device 1000 may be improved.

The sensor driver 200C may apply a signal having a higher current than that of the signal applied to the plurality of third electrodes 230 to the plurality of first charging electrodes SE. The second current RFS2 of the second signal SG2 may be higher than the first current RFS1 of the first signal SG1.

The display panel DP may be referred to as operating in a dual charging manner, because a magnetic field is formed by the first current RFS1 and the second current RFS2.

When the pen PN hovers over the display panel DP by a distance of about 15 mm, the magnetic field strength may be 1.36 microtesla (μT).

According to some embodiments of the present disclosure, in the charging drive mode of the second mode, a magnetic field may be strengthened due to the first current RFS1 and the second current RFS2. The resonance circuit of the pen PN may be charged by the magnetic field. The electronic device 1000 may be easily charged by the magnetic field strengthened by the first charging electrodes SE of the auxiliary layer 110. Accordingly, the electronic device 1000 having an improved pen sensing reliability may be provided.

As described above, to equalize the amount of phase delay of the charging signal in the plurality of third electrodes and the amount of phase delay of the charging signal in the plurality of first charging electrodes, the sensor driver may output the first signal and the second signal differing from each other in terms of the amount of phase delay in consideration of the RC difference. A magnetic field may be formed through a constructive interference of the charging signals. The resonance circuit of the pen may be charged by the magnetic field. Accordingly, the electronic device having an improved pen charging efficiency may be provided.

In addition, as described above, a magnetic field may be strengthened due to the first current of the first signal provided to the plurality of third electrodes and the second current of the second signal provided to the plurality of first charging electrodes. The resonance circuit of the pen may be charged by the magnetic field. The electronic device may be easily charged by the magnetic field strengthened by the first charging electrodes of the auxiliary layer. Accordingly, the electronic device having an improved pen sensing reliability may be provided.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:

a light emitting element layer comprising a light emitting element;

a sensor layer on the light emitting element layer;

a sensor driver configured to drive the sensor layer; and an auxiliary layer in a layer different from that of the sensor layer, the auxiliary layer comprising a plurality of first charging electrodes, wherein the sensor layer comprises:

a plurality of first electrodes along a first direction;

a plurality of second electrodes along a second direction crossing the first direction, and crossing the plurality of first electrodes; and a plurality of third electrodes along the first direction, and adjacent to the plurality of first electrodes, wherein the sensor driver is configured to output a first signal having a first phase to the plurality of third electrodes, and output a second signal to the plurality of first charging electrodes, the second signal having a second phase having a phase difference from that of the first phase, and wherein, in a plan view, at least one of the plurality of first charging electrodes extends in the second direction and has a portion overlapping with one of the plurality of third electrodes extending in the second direction, and in a side view, the portion of the at least one of the plurality of first charging electrodes has a central axis that is aligned with a central axis of the one of the plurality of third electrodes overlapping therewith.

2. The electronic device of claim 1, wherein, in a plan view, the plurality of first charging electrodes overlap with the plurality of third electrodes, respectively.

3. The electronic device of claim 1, wherein a number of the plurality of first charging electrodes is equal to a number of the plurality of third electrodes.

4. The electronic device of claim 1, wherein a number of the plurality of first charging electrodes is less than a number of the plurality of third electrodes.

5. The electronic device of claim 4, wherein, in a side view, each of the plurality of first charging electrodes has a width smaller than a gap between central axes of two adjacent third electrodes from among the plurality of third electrodes.

6. The electronic device of claim 1, wherein a width of each of the plurality of first charging electrodes is equal to a width of each of the plurality of third electrodes.

7. The electronic device of claim 1, wherein, in a side view, central axes of the plurality of first charging electrodes are aligned with central axes of the plurality of third electrodes, respectively.

8. The electronic device of claim 1, wherein the first signal at the plurality of third electrodes and the second signal at the plurality of first charging electrodes have the same phase as each other.

9. The electronic device of claim 1, wherein the first signal comprises a first-first sub-signal, and a first-second sub-signal having an inverse phase relationship with the first-first sub-signal, and wherein the sensor driver is configured to transmit the first-first sub-signal to one of the plurality of third electrodes, and transmit the first-second sub-signal to another one of the plurality of third electrodes.

10. The electronic device of claim 9, wherein the second signal comprises a second-first sub-signal, and a second-second sub-signal having an inverse phase relationship with the second-first sub-signal, and wherein the sensor driver is configured to transmit the second-first sub-signal to one of the plurality of first charging electrodes overlapping with the one of the plurality of third electrodes, and transmit the second-second sub-signal to another one of the plurality of first charging electrodes overlapping with the other one of the plurality of third electrodes.

11. The electronic device of claim 1, wherein the first signal at the plurality of third electrodes and the second signal at the plurality of first charging electrodes have a phase difference of 0 degrees to 90 degrees.

12. The electronic device of claim 1, wherein the auxiliary layer is located under the light emitting element layer.

13. The electronic device of claim 12, wherein the auxiliary layer further comprises an insulating layer.

14. The electronic device of claim 12, wherein the auxiliary layer further comprises a transistor configured to drive the light emitting element layer.

15. The electronic device of claim 1, wherein the auxiliary layer is located on the sensor layer.

16. The electronic device of claim 15, wherein the plurality of first charging electrodes comprises a transparent material.

17. The electronic device of claim 1, wherein the plurality of third electrodes are electrically connected with one another.

18. The electronic device of claim 1, wherein the plurality of first charging electrodes are electrically connected with one another.

19. The electronic device of claim 1, wherein the auxiliary layer further comprises a plurality of second charging electrodes electrically insulated from the plurality of first charging electrodes, wherein, in a plan view, the plurality of first charging electrodes overlap with some of the plurality of third electrodes, respectively, and wherein the plurality of second charging electrodes overlap with others of the plurality of third electrodes, respectively.

20. The electronic device of claim 1, wherein a direction of a first current flowing through one of the plurality of third electrodes based on the first signal is the same as a direction of a second current flowing through one of the plurality of first charging electrodes overlapping with the one of the plurality of third electrodes based on the second signal.

21. The electronic device of claim 1, wherein a current of the second signal is higher than a current of the first signal.

22. An electronic device comprising:

a light emitting element layer comprising a light emitting element;

a sensor layer on the light emitting element layer;

a sensor driver configured to drive the sensor layer; and an auxiliary layer in a layer different from that of the sensor layer, the auxiliary layer comprising a plurality of charging electrodes, wherein the sensor layer comprises:

a plurality of first electrodes along a first direction;

a plurality of second electrodes along a second direction crossing the first direction, and crossing the plurality of first electrodes; and a plurality of third electrodes along the first direction, and adjacent to the plurality of first electrodes, and wherein, in a side view, central axes of the plurality of charging electrodes are aligned with central axes of the plurality of third electrodes, respectively.

23. The electronic device of claim 22, wherein, in a plan view, the plurality of charging electrodes overlap with the plurality of third electrodes, respectively.

24. The electronic device of claim 22, wherein the sensor driver is configured to transmit a first signal having a first phase to the plurality of third electrodes, and output a second signal to the plurality of charging electrodes, the second signal having a second phase having a phase difference from the first phase.

25. The electronic device of claim 24, wherein the first signal at the plurality of third electrodes and the second signal at the plurality of charging electrodes have the same phase as each other.

26. The electronic device of claim 22, wherein the auxiliary layer is located under the light emitting element layer, and further comprises a plurality of insulating layers, and wherein the plurality of charging electrodes are located between the plurality of insulating layers.

27. The electronic device of claim 22, wherein the auxiliary layer is located under the light emitting element layer, and further comprises a transistor configured to drive the light emitting element layer.

28. The electronic device of claim 22, wherein the auxiliary layer is located on the sensor layer.

29. An electronic device comprising:

a first display device configured to display an image on a first surface; and a second display device configured to display an image on a second surface opposite the first surface, wherein at least one of the first display device or the second display device comprises:

a light emitting element layer comprising a light emitting element;

a sensor layer on the light emitting element layer;

a sensor driver configured to drive the sensor layer; and an auxiliary layer in a layer different from that of the sensor layer, the auxiliary layer comprising a plurality of first charging electrodes, wherein the sensor layer comprises:

a plurality of first electrodes along a first direction;

a plurality of second electrodes along a second direction crossing the first direction, and crossing the plurality of first electrodes; and a plurality of third electrodes along the first direction, and adjacent to the plurality of first electrodes, wherein the sensor driver is configured to output a first signal having a first phase to the plurality of third electrodes, and output a second signal to the plurality of first charging electrodes, the second signal having a second phase having a phase difference from that of the first phase, wherein a width of each of the plurality of first charging electrodes is equal to a width of each of the plurality of third electrodes, and wherein the electronic device is one of a television, a mobile phone, a tablet computer, a notebook computer, a car navigation device, or a game machine.

* * * * *